United States Patent
Hesla

(10) Patent No.: US 11,252,852 B2
(45) Date of Patent: Feb. 22, 2022

(54) GAUGE WHEEL AND UNIVERSAL SCRAPER FOR USE WITH A CONVENTIONAL ROW PLANTER ASSEMBLY

(71) Applicant: Pro Mags LLC, Wakonda, SD (US)

(72) Inventor: Ron Hesla, Wakonda, SD (US)

(73) Assignee: Pro Mags LLC, Wakonda, SD (US)

( * ) Notice: Subject to any disclaimer, the term of this patent is extended or adjusted under 35 U.S.C. 154(b) by 467 days.

(21) Appl. No.: 16/105,737

(22) Filed: Aug. 20, 2018

(65) Prior Publication Data

US 2018/0368306 A1    Dec. 27, 2018

Related U.S. Application Data

(63) Continuation-in-part of application No. 16/040,881, filed on Jul. 20, 2018, now abandoned, which is a continuation of application No. 15/715,627, filed on Sep. 26, 2017, now abandoned, which is a continuation of application No. 14/986,173, filed on Dec. 31, 2015, now Pat. No. 9,769,971, and a continuation-in-part of application No. 14/962,038, filed on Dec. 8, 2015, now abandoned, which is a continuation of application No. 13/344,531, filed on Jan. 5, 2012, now Pat. No. 9,204,591, which is a continuation-in-part of application No. 11/803,447, filed on May 15, 2007, now Pat. No. 8,104,543.

(Continued)

(51) Int. Cl.
| | |
|---|---|
| *A01B 15/16* | (2006.01) |
| *A01C 7/20* | (2006.01) |
| *A01C 5/06* | (2006.01) |
| *A01B 23/06* | (2006.01) |

(52) U.S. Cl.
CPC .............. *A01B 15/16* (2013.01); *A01C 5/064* (2013.01); *A01C 5/068* (2013.01); *A01C 7/203* (2013.01); *A01B 23/06* (2013.01)

(58) Field of Classification Search
CPC ......... A01B 15/16; A01B 23/06; A01C 5/064; A01C 5/068; A01C 7/203
See application file for complete search history.

(56) References Cited

U.S. PATENT DOCUMENTS

| | | |
|---|---|---|
| 184 A | 4/1837 | Becksmith |
| 687,953 A | 12/1901 | Desjardins |

(Continued)

FOREIGN PATENT DOCUMENTS

| | | |
|---|---|---|
| CA | 169891 | 6/2017 |
| CN | 202610653 | 12/2012 |

(Continued)

OTHER PUBLICATIONS https://www.furrowbrow.com/,2019.

*Primary Examiner* — Jamie L McGowan
(74) *Attorney, Agent, or Firm* — Pandiscio & Pandiscio

(57) ABSTRACT

A scraper for removing soil or debris from at least one of an opening disk and a gauge wheel on a planter assembly, the scraper comprising:
  a scraper blade formed from a first material, wherein the scraper blade comprises a scraping edge; and
  a wear-resistant surface disposed on the scraper blade, wherein the wear-resistant surface is disposed on the scraper blade in a position spaced from the scraping edge of the scraper blade.

21 Claims, 80 Drawing Sheets

Related U.S. Application Data

(60) Provisional application No. 60/800,550, filed on May 15, 2006, provisional application No. 60/922,867, filed on Apr. 11, 2007, provisional application No. 61/429,948, filed on Jan. 5, 2011, provisional application No. 62/098,947, filed on Dec. 13, 2014, provisional application No. 62/547,346, filed on Aug. 18, 2017.

(56) References Cited

U.S. PATENT DOCUMENTS

| | | | |
|---|---|---|---|
| 717,698 A | 1/1903 | Miller | |
| 742,908 A | 11/1903 | Sanders | |
| 832,225 A | 10/1906 | Wright | |
| 841,768 A | 1/1907 | Davis | |
| 935,297 A | 9/1909 | Clevenger | |
| 975,499 A | 11/1910 | Beeman | |
| 1,142,185 A | 6/1915 | Lee | |
| 1,163,200 A | 12/1915 | Baldwin | |
| 1,203,156 A | 10/1916 | Sturrock | |
| 1,474,906 A | 11/1923 | Lindgren | |
| 1,512,258 A | 10/1924 | White | |
| 1,545,895 A * | 7/1925 | Hamilton | A01B 15/18 172/561 |
| 1,641,688 A | 9/1927 | Paul | |
| 1,651,673 A | 12/1927 | Clary | |
| 1,721,876 A | 7/1929 | Rommy et al. | |
| 1,723,705 A * | 8/1929 | Packer | A01B 23/06 172/558 |
| 1,834,485 A | 12/1931 | Bissell | |
| 2,045,762 A * | 6/1936 | Elliott | A01B 23/06 172/558 |
| 2,489,385 A | 11/1949 | Paul | |
| 2,805,486 A | 9/1957 | Barrett | |
| 2,901,049 A | 8/1959 | De Haai | |
| 3,115,192 A | 12/1963 | Bushmeyer | |
| 3,261,411 A | 7/1966 | Youngberg et al. | |
| 3,437,155 A | 4/1969 | Honrud | |
| 3,442,336 A * | 5/1969 | Morkoski | A01B 21/08 172/572 |
| 3,599,729 A | 8/1971 | Greenmore | |
| 3,629,814 A * | 12/1971 | Klein | F16D 65/0037 340/454 |
| 3,833,067 A | 9/1974 | Peterson, Jr. et al. | |
| 4,113,030 A | 9/1978 | Walker | |
| 4,127,179 A * | 11/1978 | Heersink | A01B 23/06 172/565 |
| 4,294,181 A | 10/1981 | Smith | |
| 4,330,041 A * | 5/1982 | Ankenman | A01B 23/06 172/566 |
| 4,333,535 A | 6/1982 | Hentrich, Sr. | |
| 4,337,835 A * | 7/1982 | Steilen | A01C 5/064 172/560 |
| 4,412,587 A * | 11/1983 | Lely | A01B 33/021 172/123 |
| 4,760,806 A | 8/1988 | Bigbee et al. | |
| 4,783,875 A * | 11/1988 | Cottam | A47L 13/08 15/236.01 |
| 4,882,957 A | 11/1989 | Wright et al. | |
| 5,060,586 A * | 10/1991 | Hoyt | A01C 5/064 111/164 |
| 5,078,528 A | 1/1992 | Schmidt | |
| 5,129,437 A * | 7/1992 | Nettles | B27L 11/005 144/162.1 |
| 5,269,237 A | 12/1993 | Baker et al. | |
| 5,269,380 A | 12/1993 | Lofquist et al. | |
| 5,297,637 A * | 3/1994 | Rowlett | A01B 15/18 172/555 |
| 5,427,038 A | 6/1995 | Ege | |
| 5,431,233 A | 7/1995 | Schmidt | |
| 5,483,907 A | 1/1996 | Gaalswyk | |
| 5,507,351 A | 4/1996 | Martin | |
| 5,802,995 A | 9/1998 | Baugher et al. | |
| 5,884,711 A | 3/1999 | Shoup | |
| 5,904,107 A | 5/1999 | Kester | |
| 5,970,891 A | 10/1999 | Schlagel | |
| D440,985 S | 4/2001 | Noonan et al. | |
| 6,260,632 B1 | 7/2001 | Bourgault et al. | |
| 6,321,667 B1 | 11/2001 | Shoup | |
| 6,386,127 B1 | 5/2002 | Prairie et al. | |
| D477,194 S * | 7/2003 | Markley | D8/10 |
| 7,357,193 B2 * | 4/2008 | Harmon | A01B 23/06 172/566 |
| 7,360,495 B1 | 4/2008 | Martin | |
| 7,481,279 B2 * | 1/2009 | Blunier | A01B 23/06 172/509 |
| D594,478 S | 6/2009 | Greuel et al. | |
| D596,203 S | 7/2009 | Schaffert | |
| 7,584,706 B1 | 9/2009 | Smith | |
| 7,673,571 B2 | 3/2010 | Medernach | |
| 7,721,815 B2 * | 5/2010 | Hoffman | A01B 23/06 172/558 |
| 7,730,962 B1 | 6/2010 | Kester | |
| 7,753,134 B1 | 7/2010 | Anderson et al. | |
| 7,823,521 B1 | 11/2010 | Smith | |
| 8,104,543 B2 | 1/2012 | Hesla | |
| 8,186,287 B2 | 5/2012 | Schilling et al. | |
| 8,196,671 B2 | 6/2012 | Friestad | |
| 9,113,587 B2 | 8/2015 | Hesla | |
| 9,204,590 B2 | 12/2015 | Schaffert et al. | |
| 9,204,591 B2 | 12/2015 | Hesla | |
| 9,232,689 B2 | 1/2016 | Trevino et al. | |
| 9,456,542 B2 | 10/2016 | Schaffert | |
| D812,110 S | 3/2018 | Hesla | |
| 2003/0221338 A1 * | 12/2003 | Verseef | E01H 5/062 37/266 |
| 2005/0072344 A1 | 4/2005 | Kester | |
| 2006/0283609 A1 * | 12/2006 | Hansen | A01B 35/28 172/604 |
| 2007/0062714 A1 | 3/2007 | Harmon et al. | |
| 2008/0011208 A1 | 1/2008 | Martin | |
| 2008/0066662 A1 | 3/2008 | Hesla | |
| 2008/0229986 A1 * | 9/2008 | Arksey | A01C 5/064 111/12 |
| 2008/0264657 A1 * | 10/2008 | Kromminga | A01B 23/06 172/508 |
| 2009/0000796 A1 * | 1/2009 | Cooper | A01B 23/06 172/563 |
| 2013/0186658 A1 | 7/2013 | Kester | |
| 2013/0319702 A1 | 12/2013 | Baker et al. | |
| 2016/0120092 A1 * | 5/2016 | Bianchi | A01B 23/06 172/558 |
| 2018/0223435 A1 * | 8/2018 | Johnson | B23K 26/144 |
| 2018/0288930 A1 * | 10/2018 | Arksey | A01C 5/064 |
| 2019/0246553 A1 * | 8/2019 | Fels | A01C 5/064 |

FOREIGN PATENT DOCUMENTS

| | | |
|---|---|---|
| JP | 70026300 | 8/1970 |
| JP | 59140149 | 8/1984 |

* cited by examiner

Individual Axle Opening Disc

Multi-Disc Blade, Common Axle

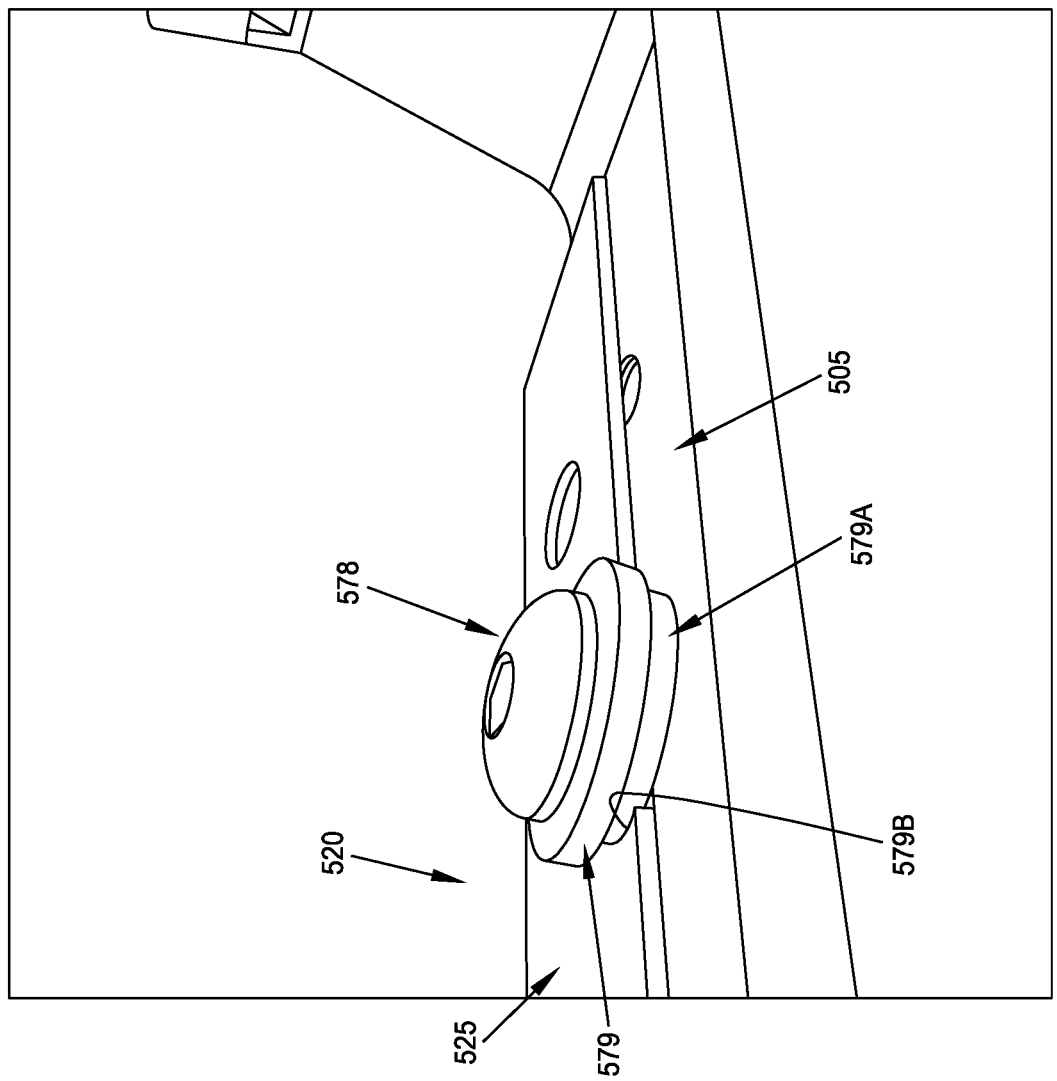

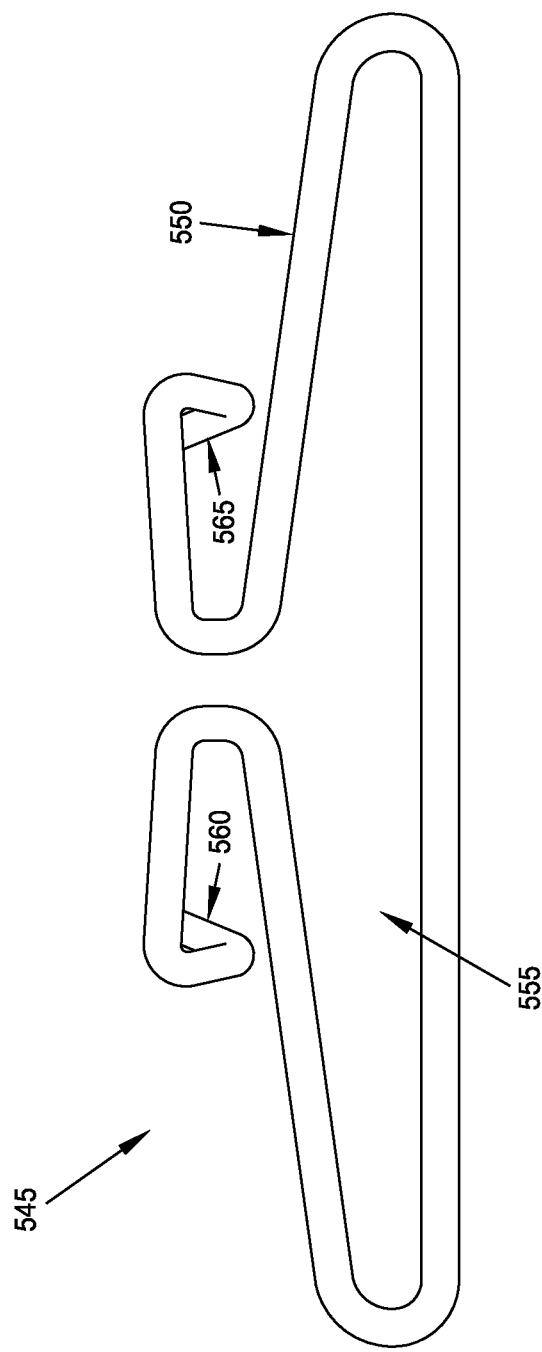

Blade can mount under the arm for additional blade wear life with the same tensioning effect.

Bottom View of Blade Below Arm - Blade will stay in position against the same resilient tensioning clip below the arm.

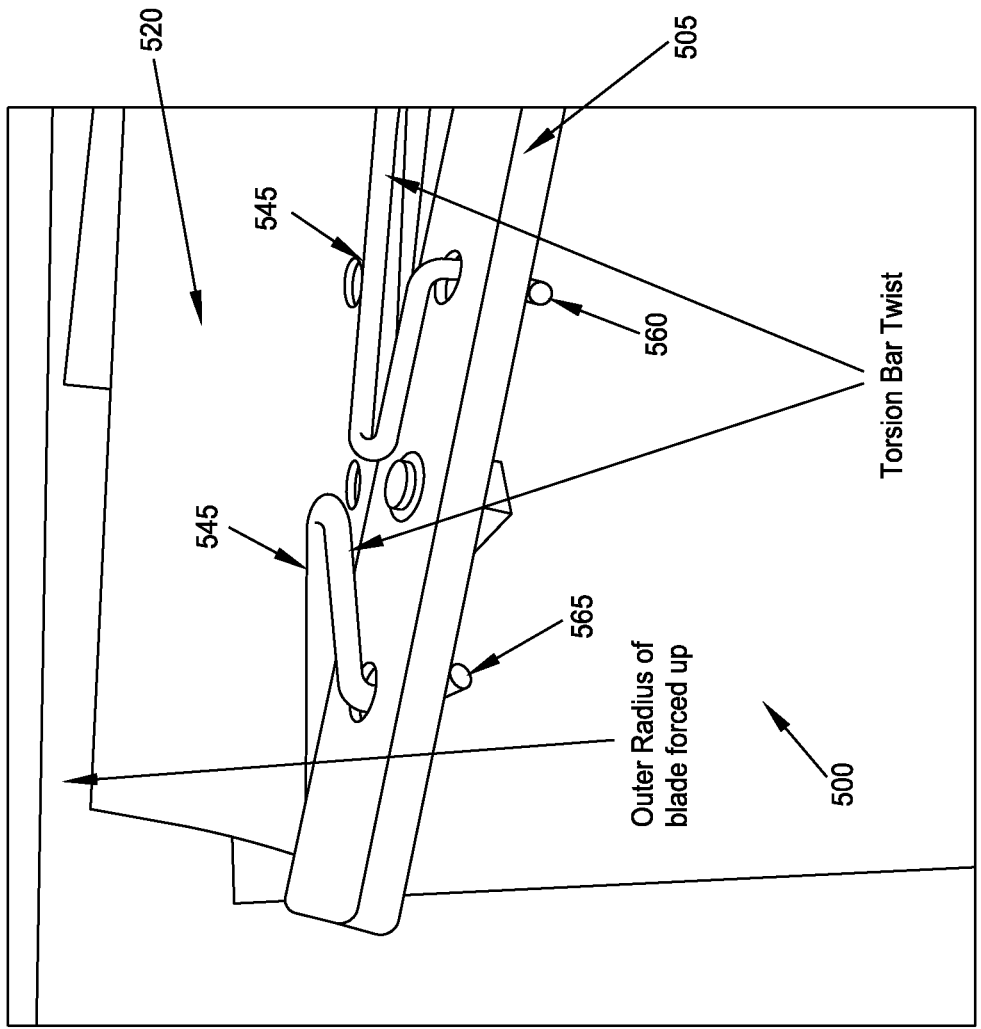

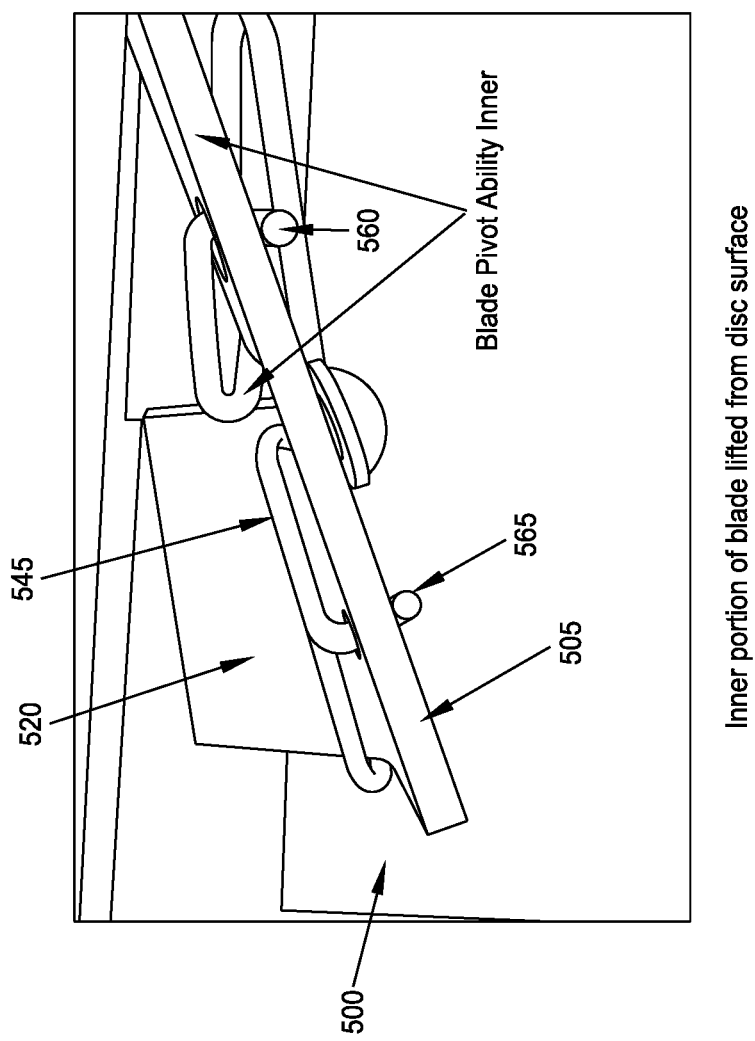

FIG. 68 Frame Mount Configuration

FIG. 69 (Frame mounted example) - long lever arm (length from blade contact to frame fastening point)

GAUGE WHEEL AND UNIVERSAL SCRAPER FOR USE WITH A CONVENTIONAL ROW PLANTER ASSEMBLY

REFERENCE TO PENDING PRIOR PATENT APPLICATIONS

This patent application is:
(i) a continuation-in-part of prior U.S. patent application Ser. No. 16/040,881, filed Jul. 20, 2018 by Pro Mags LLC and Ron Hesla for GAUGE WHEEL AND UNIVERSAL SCRAPER FOR USE WITH A CONVENTIONAL ROW PLANTER ASSEMBLY, which in turn is a continuation of prior U.S. patent application Ser. No. 15/715,627, filed Sep. 26, 2017 by Pro Mags LLC and Ron Hesla for GAUGE WHEEL AND UNIVERSAL SCRAPER FOR USE WITH A CONVENTIONAL ROW PLANTER ASSEMBLY, which in turn is a continuation of prior U.S. patent application Ser. No. 14/986,173, filed Dec. 31, 2015 by Pro Mags LLC and Ron Hesla for GAUGE WHEEL AND UNIVERSAL SCRAPER FOR USE WITH A CONVENTIONAL ROW PLANTER ASSEMBLY, which in turn:
(1) is a continuation-in-part of prior U.S. patent application Ser. No. 14/962,038, filed Dec. 8, 2015 by Ron Hesla for GAUGE WHEEL AND UNIVERSAL SCRAPER FOR USE WITH A CONVENTIONAL ROW PLANTER ASSEMBLY, which patent application:
  (A) is a continuation of prior U.S. patent application Ser. No. 13/344,531, filed Jan. 5, 2012 by Ron Hesla for GAUGE WHEEL AND UNIVERSAL SCRAPER FOR USE WITH A CONVENTIONAL ROW PLANTER ASSEMBLY, which patent application:
    (i) is a continuation-in-part of prior U.S. patent application Ser. No. 11/803,447, filed May 15, 2007 by Ron Hesla for NOVEL GAUGE WHEEL FOR USE WITH A CONVENTIONAL ROW PLANTER ASSEMBLY, which patent application:
      (a) claims benefit of prior U.S. Provisional Patent Application Ser. No. 60/800,550, filed May 15, 2006 by Ron Hesla for GAUGE WHEEL FOR USE WITH A CONVENTIONAL ROW PLANTER ASSEMBLY; and
      (b) claims benefit of prior U.S. Provisional Patent Application Ser. No. 60/922,867, filed Apr. 11, 2007 by Ron Hesla for GAUGE WHEEL FOR USE WITH A CONVENTIONAL ROW PLANTER ASSEMBLY; and
    (ii) claims benefit of prior U.S. Provisional Patent Application Ser. No. 61/429,948, filed Jan. 5, 2011 by Ron Hesla for SCRAPER ARM; and
  (2) claims benefit of prior U.S. Provisional Patent Application Ser. No. 62/098,947, filed Dec. 31, 2014 by Pro Mags LLC and Ron Hesla for GROUND OPENING DISC SCRAPER; and
(ii) claims benefit of prior U.S. Provisional Patent Application Ser. No. 62/547,346, filed Aug. 18, 2017 by Pro Mags LLC and Ron Hesla for GAUGE WHEEL AND UNIVERSAL SCRAPER FOR USE WITH A CONVENTIONAL ROW PLANTER ASSEMBLY.

The eleven (11) above-identified patent applications are hereby incorporated herein by reference.

FIELD OF THE INVENTION

This invention relates to agricultural machinery in general, and more particularly to a novel gauge wheel and a novel universal scraper for use with a conventional row planter assembly to facilitate planting in adverse conditions.

BACKGROUND OF THE INVENTION

Row planter assemblies are designed to plant rows in an agricultural field, with a plurality of parallel rows being planted with each pass of the row planter assembly. More particularly, with the row planter assembly, for each row, a row unit opens a furrow in the soil, distributes the seed into the furrow, and then closes the furrow by pushing soil back over the seed.

The row planter assemblies have a plurality of the aforementioned row units, one for each row being planted. Each row unit has four main components: (i) a pair of gauge wheels which support the row unit on the soil being planted and which regulate the depth of the seed furrow; (ii) a pair of opening discs (sometimes referred to as a "double disc opener") set at an angle to one another for opening the furrow in the soil, with the depth of the opening discs being set relative to the gauge wheels; (iii) a planter for distributing seeds in the open furrow; and (iv) a pair of closing wheels set at an angle to one another for pushing the soil back over the seeds.

More particularly, and looking now at FIGS. 1-5, there is shown a row planter assembly 1. Row planter assembly 1 generally comprises a plurality of row units 7. Each row unit 7 comprises a pair of gauge wheels 5 and a pair of opening discs 10. Gauge wheels 5 support the frame 15 of the row planter assembly 1 on the soil. The two opening discs 10 of the double disc opener are carried by frame 15 of row planter assembly 1, with the two opening discs 10 of the double disk opener being configured in the shape of a V. The depth of the two opening discs 10 protrude below the depth of the gauge wheels 5 and, as a result, when the row unit is moved across the soil 20, the opening discs 10 form a furrow 25 in the soil. The gauge wheels 5 are positioned on either side of the opening discs 10, in close lateral proximity to the opening discs, and by virtue of their adjustable connection to frame 15, set the depth of the opening discs 10 (i.e., the depth of penetration of the opening discs 10 into the soil 20). A planter 30 (e.g., a seed tube) is spaced just back from the opening discs 10 of the double disc opener and serves to deposit seeds into the opened furrow 25. The closing wheels 35 are positioned at the back end of the row unit, and comprise a pair of angled wheels which close the soil 20 back over the deposited seeds.

As noted above, in order to properly set the depth of the opening discs 10 (i.e., the depth of penetration of the opening discs 10 into the soil 20), it is important for the gauge wheels 5 to be set in close lateral proximity to the opening discs 10. In relatively dry soil conditions, this does not present a significant problem, since the dry soil can move easily through the gap (i.e., the intervening space) between the opening discs 10 and the gauge wheels 5. However, in wet soil conditions, the soil is "sticky" (in the sense that it tends to bind to itself) and there is a significant problem with soil building-up on the outsides of the opening discs 10 and the insides of the gauge wheels 5. To this end, a scraper 40 is typically provided to scrape dirt off the face of opening disc 10. However, when the soil is sticky, soil scraped off the face of opening disc 10 still builds up between the opening disc 10 and the inside of the gauge wheel 5. Thus, the gap between the opening discs 10 and the gauge wheels 5 can become clogged or plugged with mud, which prevents the opening discs 10 and gauge wheels 5 from rotating on their axles. When the gauge wheels 5 stop rotating on their axles, the gauge wheels 5 tend to "drag" across the soil, so that the gauge wheels 5 can no longer reliably set the depth of the furrow 25. Among other things, when the gauge wheels 5 get clogged or plugged with soil in the foregoing manner, the gauge wheels tend to skid across the top of the soil, destroying the seed furrow 25, so that seed is left on top of the ground rather than deposited into a furrow. In this respect it should be appreciated that the depth of the furrow 25 is generally important for proper crop growth. When the gauge wheels 5 stop rotating so that they can no longer accurately set furrow depth, the farmer must interrupt the planting operation, climb down from the tractor, manually remove the mud from the space between the opening discs 10 and the gauge wheels 5, climb back up onto the tractor and resume planting—until the machinery clogs once again, in which case the planting operation must be halted once more while the machinery is cleaned in the foregoing manner.

Planting in wet conditions, using conventional row planter assemblies, is extremely time-consuming and labor intensive. For example, if the operator of the planter assembly is required to stop the machinery approximately every ten minutes and spend approximately five minutes cleaning the gap between the opening discs 10 and the gauge wheels 5, productivity is reduced by 33%. Furthermore, operator fatigue is significantly increased, due to the additional exertion of climbing down from the tractor, manually cleaning the space between the opening discs 10 and the gauge wheels 5, and climbing back up into the tractor to resume planting. This loss of productivity and increase in operator fatigue are significant problems, particularly in certain climates and/or for certain crops, one or both of which may have very limited planting periods.

Various efforts have been made in an effort to keep the gauge wheel free of soil build-up. Many of these approaches incorporate the use of scrapers for scraping soil build-up off of the opening discs. However, this type of solution is not entirely satisfactory, since in many cases the scrapers merely push the wet soil off of the opening discs and onto the gauge wheel, and fail to prevent a build-up of soil in the gap between the opening discs and the gauge wheel. In addition, current scrapers are not entirely satisfactory. For one thing, current scrapers are generally attached to the frame 15 of the row planter assembly 1 using an attachment arm. See, for example, FIGS. 4, 6 and 7, where scraper 40 comprises an attachment arm 42 for mounting a scraper blade 43 to frame 15. This attachment arm can block soil from exiting the gap between the opening discs and the gauge wheels. Furthermore, current scrapers employ a wide variety of different attachment arms for mounting the scraper blade to the frame of the row planter assembly. This can present inventory issues for dealers, since it requires stocking a larger inventory of attachment arms. In addition, the lack of standardization in attachment arms can present serious issues for farmers, since it may complicate obtaining a replacement part if and when a scraper is damaged in the field. It will be appreciated that any delay in obtaining a replacement part can be disastrous if the delay occurs during a critical planting time.

SUMMARY OF THE INVENTION

It is, therefore, one object of the present invention to provide an improved gauge wheel for use with a conventional row planter assembly, wherein the improved gauge wheel facilitates the egress of soil (particularly sticky wet soil) from the gap located between the opening disc and the gauge wheel.

Another object of the present invention to provide a universal scraper for use with a conventional row planter assembly, wherein the universal scraper may be used with a wide range of conventional row planter assemblies.

And another object of the present invention is to provide an improved row planter assembly which utilizes the aforementioned improved gauge wheels and/or the aforementioned universal scrapers so as to avoid the problems associated with the prior art.

These and other objects are addressed by the present invention, which comprises the provision and use of a novel gauge wheel which prevents a build-up of soil in the gap between the opening disc and the gauge wheel. More particularly, the novel gauge wheel comprises at least one opening formed in the face of the gauge wheel which permits soil to exit the gap between the opening disc and the gauge wheel. As a result of this construction, soil does not build up in the gap between the opening disk and the gauge wheel, the gauge wheels continue to rotate freely, and the depth of the opening discs is properly maintained, whereby planting may continue without interruption, even in wet soil conditions.

The present invention also comprises the provision and use of a novel universal scraper for use with a conventional row planter assembly, wherein the universal scraper may be used with a wide range of conventional row planter assemblies.

And the present invention provides an improved row planter assembly which utilizes the aforementioned improved gauge wheels and/or the aforementioned universal scrapers so as to avoid the problems associated with the prior art.

In one preferred form of the present invention, there is provided a universal scraper for use with an opening disc, the universal scraper comprising:
an elongated body having a first end and a second end, the first end being adapted to mount to an axle, and the second end being adapted to receive a scraper blade, wherein the elongated body is sized and shaped so that when the first end of the elongated body is attached to an axle and a scraper blade is mounted to the second end of the elongated body, the scraper blade is presented in scraping disposition to the opening disc.

In another preferred form of the present invention, there is provided apparatus for opening ground, the apparatus comprising:
a frame;
an opening disc rotatably mounted to the frame; and
a universal scraper for scraping the opening disc, the universal scraper comprising:
an elongated body having a first end and a second end, the first end being adapted to mount to an axle, and the second end being adapted to receive a scraper blade, wherein the elongated body is sized and shaped so that when the first end of the elongated body is attached to an axle and a scraper blade is mounted to the second end of the elongated body, the scraper blade is presented in scraping disposition to the opening disc.

In another preferred form of the present invention, there is provided a row planter assembly comprising:
a frame;
an opening disc rotatably mounted to the frame;

a gauge wheel rotatably mounted to the frame and disposed alongside, but spaced from, the opening disc so as to create a narrow gap therebetween;

wherein the gauge wheel comprises at least one opening in the side wall thereof so as to permit soil to pass from the gap located between the opening disk and the gauge wheel to the region outside of the gauge wheel; and a universal scraper mounted to an axle supporting one of the opening disc and the gauge wheel.

In another preferred form of the present invention, there is provided a method for opening ground, the method comprising:

providing a frame, an opening disc rotatably mounted to the frame, and a universal scraper for scraping the opening disc, the universal scraper comprising an elongated body having a first end and a second end, the first end being adapted to mount to an axle, and the second end being adapted to receive a scraper blade, wherein the elongated body is sized and shaped so that when the first end of the elongated body is attached to an axle and a scraper blade is mounted to the second end of the elongated body, the scraper blade is presented in scraping disposition to the opening disc; and moving the opening disc through the ground.

In another preferred form of the present invention, there is provided a ground opening disc scraper assembly comprising:

a scraper arm having a proximal end and a distal end, wherein the proximal end is configured for mounting to a support structure;

a scraper blade; and a tensioning clip for yieldably mounting the scraper blade to the distal end of the scraper arm.

In another preferred form of the present invention, there is provided a method for removing soil and debris from a ground opening disc, the method comprising:

providing a ground opening disc and a ground opening disc scraper assembly, the ground opening disc scraper assembly comprising:

a scraper arm having a proximal end and a distal end, wherein the proximal end is configured for mounting to a support structure;

a scraper blade; and.

a tensioning clip for yieldably mounting the scraper blade to the distal end of the scraper arm; and positioning the ground opening disc scraper assembly adjacent to the ground opening disc so that scraper blade yieldably engages the ground opening disc.

In another preferred form of the present invention, there is provided a ground opening disc scraper assembly comprising:

a scraper arm having a proximal end and a distal end, wherein the proximal end is configured for mounting to a support structure;

a hinged scraper blade mounted to the distal end of the scraper arm; and a tensioning clip for yieldably biasing the hinged scraper blade against the opening disc.

In another preferred form of the present invention, there is provided a method for removing soil and debris from a ground opening disc, the method comprising:

providing a ground opening disc and a ground opening disc scraper assembly, the ground opening disc scraper assembly comprising:

a scraper arm having a proximal end and a distal end, wherein the proximal end is configured for mounting to a support structure;

a hinged scraper blade mounted to the distal end of the scraper arm; and a tensioning clip for yieldably biasing the hinged scraper blade against the opening disc; and positioning the ground opening disc scraper assembly adjacent to the ground opening disc so that the scraper blade yieldably engages the ground opening disc.

In another form of the invention, there is provided a novel scraper blade assembly having improved performance.

In another form of the invention, there is provided a novel method for scraping ground opening equipment with improved performance.

In another form of the invention, there is provided another novel scraper blade assembly having improved performance.

In yet another form of the invention, there is provided a method for forming a novel scraper blade having improved performance.

In yet another form of the invention, there is provided a scraper for removing soil or debris from at least one of an opening disk and a gauge wheel on a planter assembly, the scraper comprising:

a scraper blade formed from a first material, wherein the scraper blade comprises a scraping edge; and a wear-resistant surface disposed on the scraper blade, wherein the wear-resistant surface is disposed on the scraper blade in a position spaced from the scraping edge of the scraper blade.

In still another form of the invention, there is provided a method for forming a sharp edge on a wear-resistant scraper blade, the method comprising:

providing a scraper comprising:

a scraper blade formed from a first material, wherein the scraper blade comprises a scraping edge; and a wear-resistant surface disposed on the scraper blade, wherein the wear-resistant surface is disposed on the scraper blade in a position spaced from the scraping edge of the scraper blade; and wearing down the first material to produce a sharp edge on the first material.

In yet another form of the invention, there is provided a scraper for removing soil or debris from at least one of an opening disk and a gauge wheel on a planter assembly, the scraper comprising:

a scraper blade formed from a first material, wherein the scraper blade comprises a scraping edge, wherein the scraper blade comprises a uniform thickness of less than or equal to approximately 0.09 inches; and a wear-resistant surface disposed on the scraping edge of the scraper blade.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts and further wherein:

FIGS. 59, 59A, 59B, 60 and 61 are schematic views showing a novel hub-mounted scraper formed in accordance with the present invention, wherein the scraper blade is mounted to the scraper arm by means of a novel resilient tensioning clip;

FIG. 62 is a schematic view showing further details of a novel resilient tensioning clip formed in accordance with the present invention;

FIGS. 66B and 66C are schematic views showing twisting of the scraper blade relative to the scraper arm, wherein torsional force is accommodated by the resilient tensioning clip;

DETAILED DESCRIPTION OF THE PREFERRED EMBODIMENTS

Figure 8:
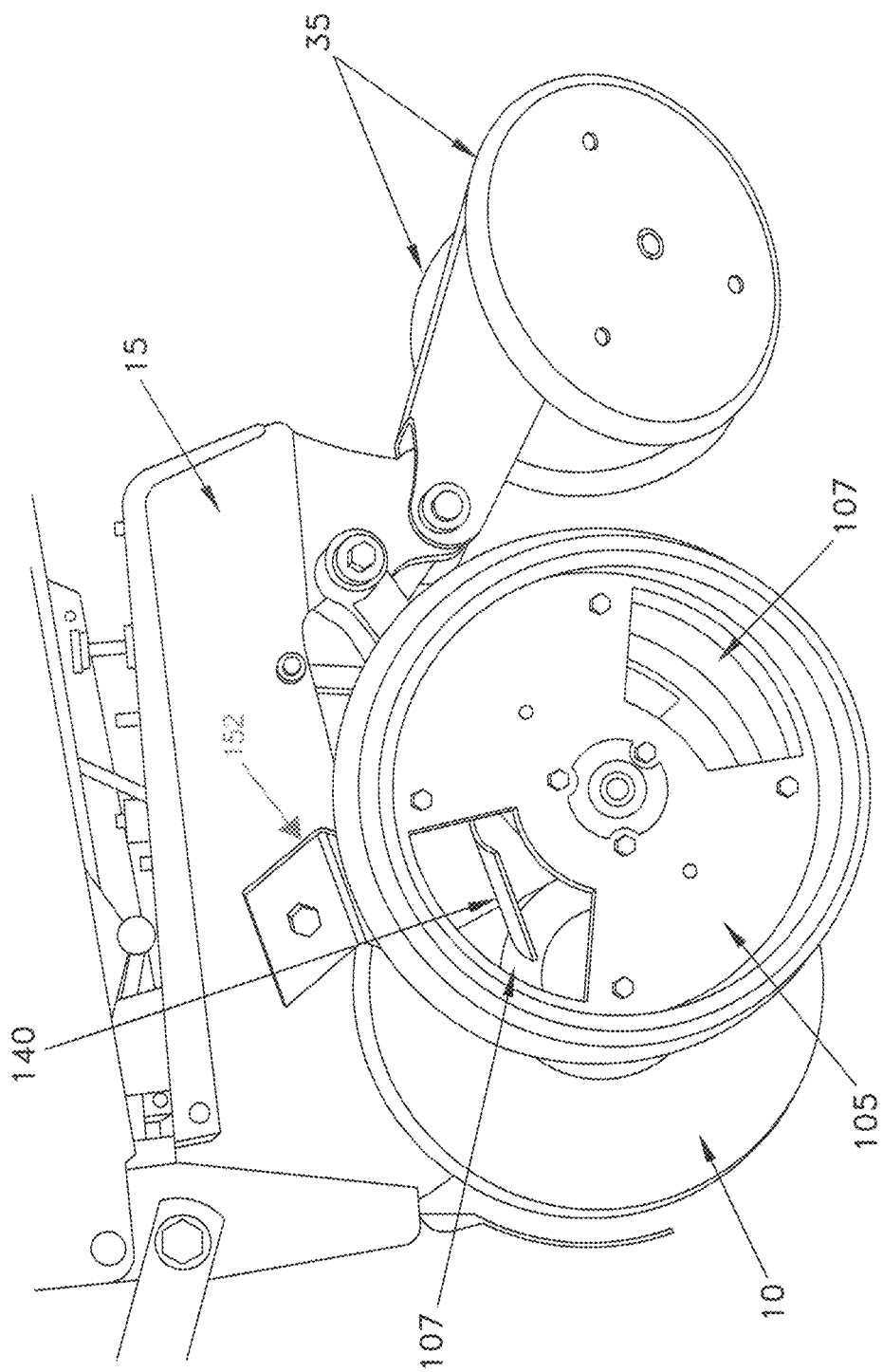
FIG. 8 is a perspective view showing a novel gauge wheel formed in accordance with the present invention, and also showing an opening disc, scraper and closing wheels.
Figure 9:
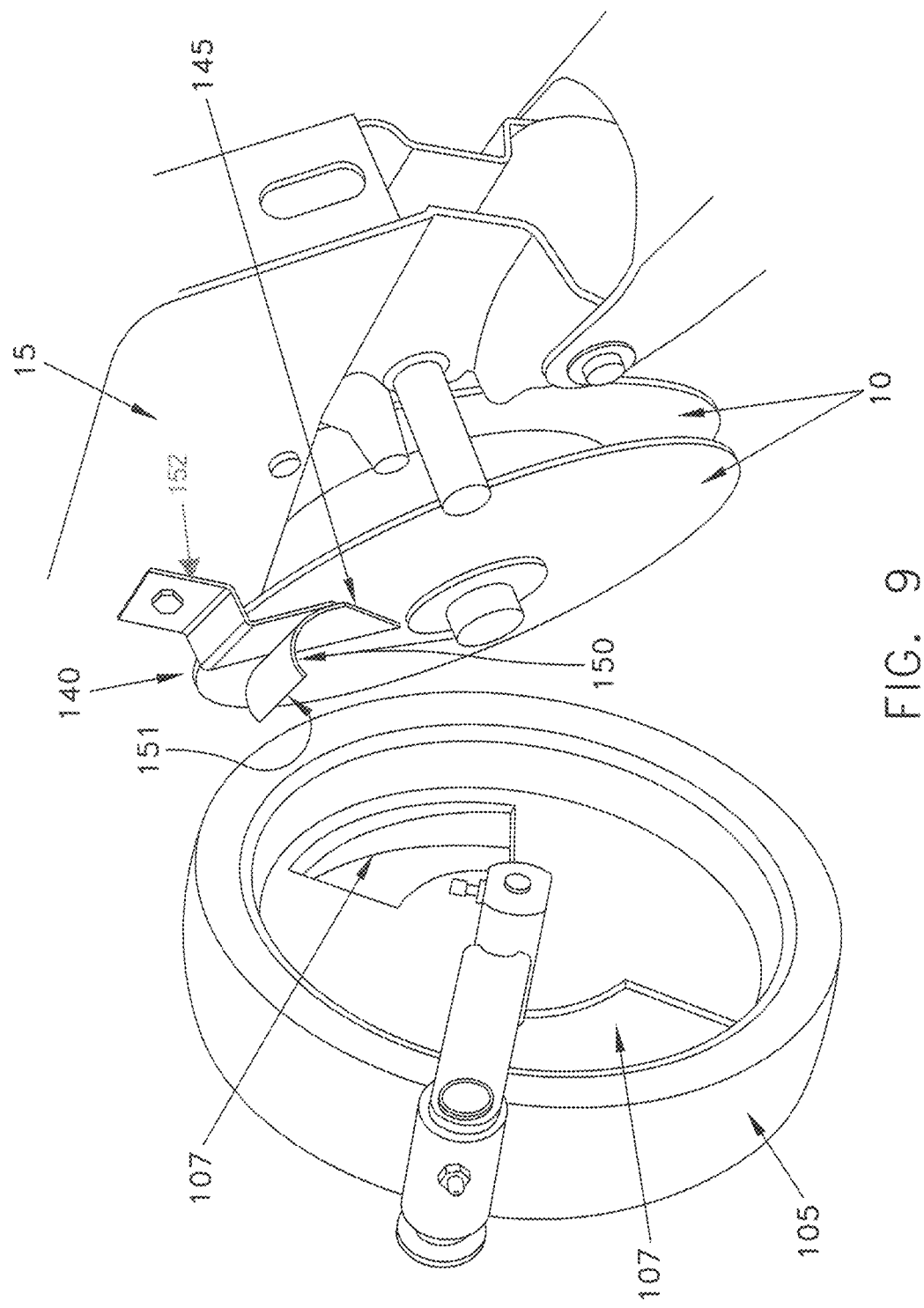
FIG. 9 is an exploded view showing a novel gauge wheel formed in accordance with the present invention, and also showing opening discs and a scraper.
Figure 10:
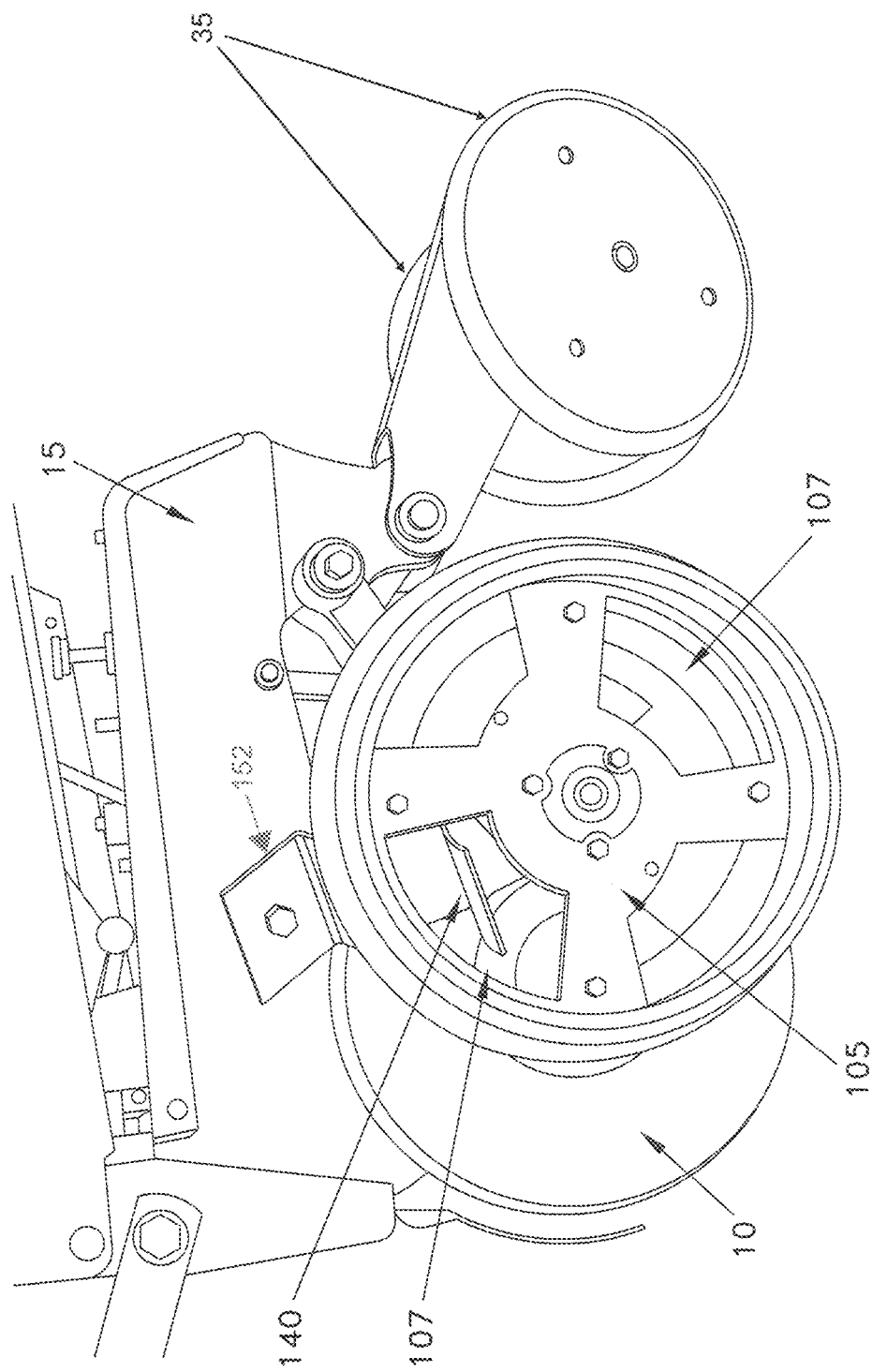
FIG. 10 is a perspective view showing an alternative form of a gauge wheel also formed in accordance with the present invention.
Figure 11:
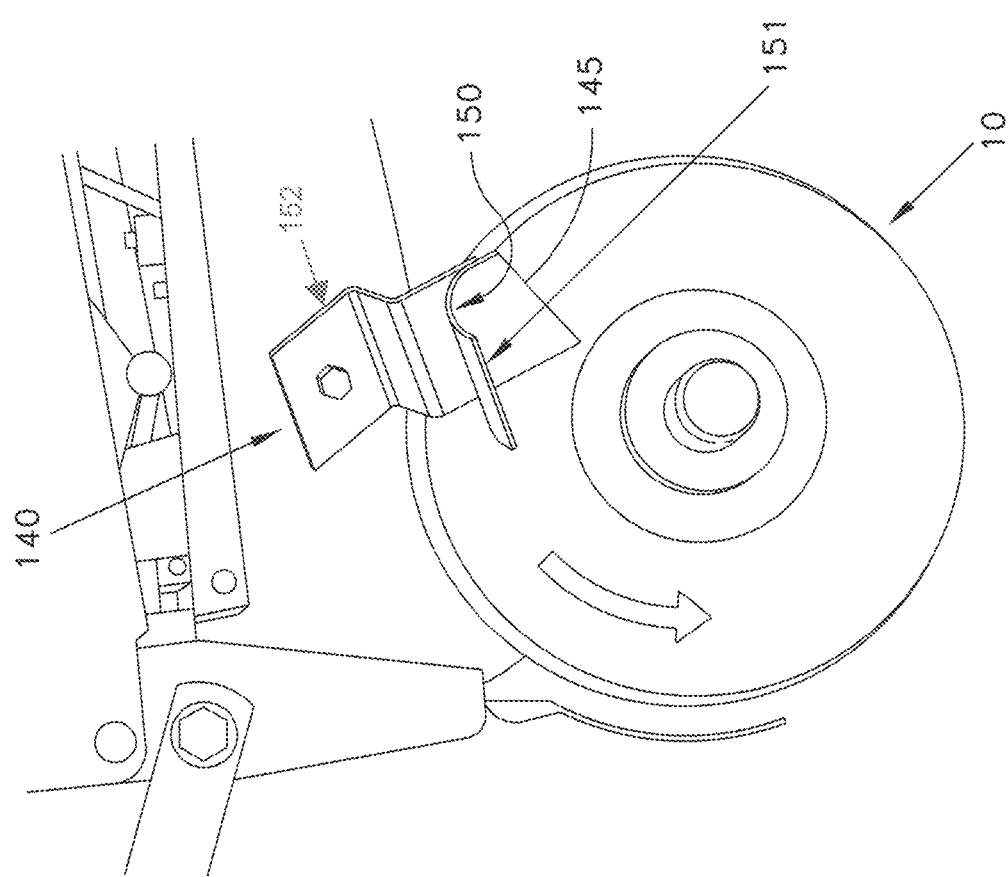
FIG. 11 is a perspective view showing a novel form of scraper also formed in accordance with the present invention.
Figure 12:
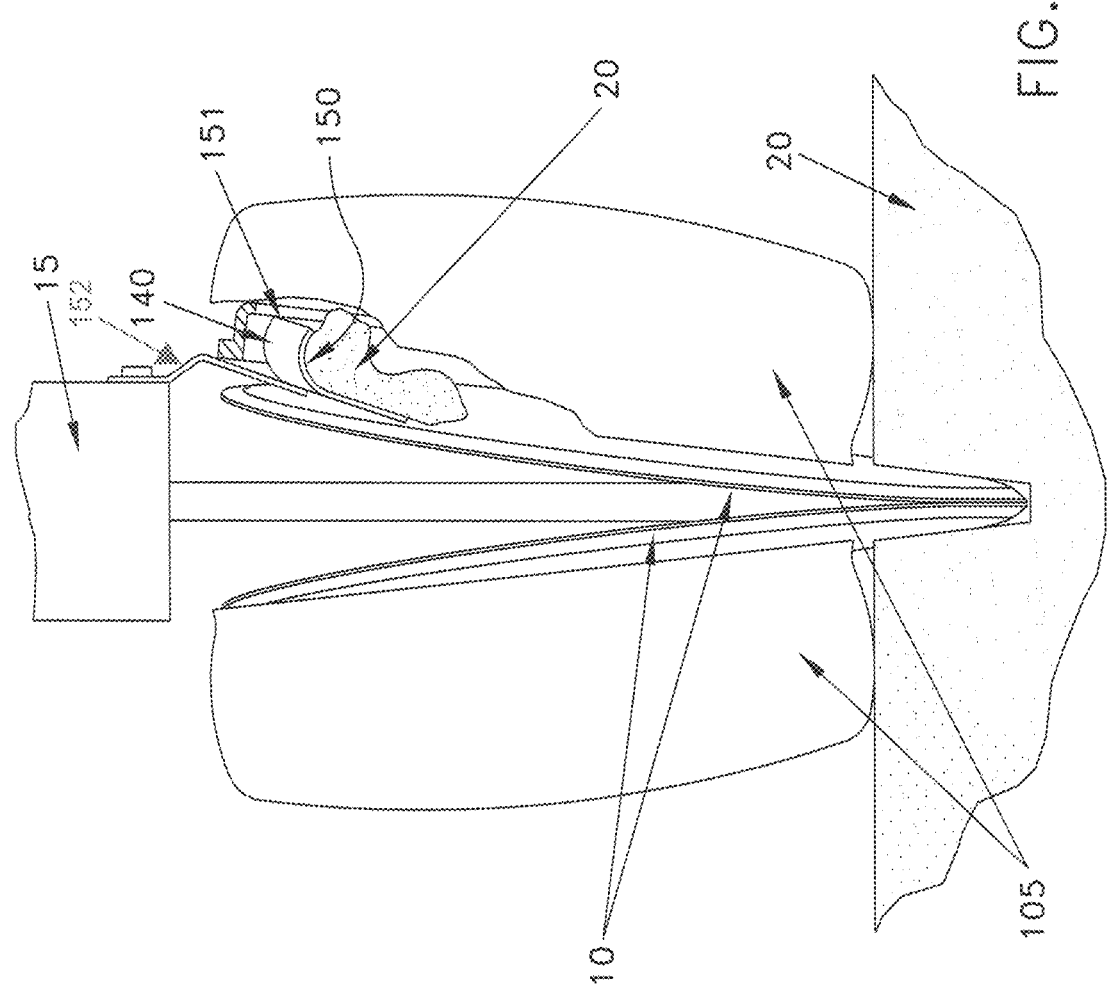
FIG. 12 is a front view showing the scraper of FIG. 11 removing soil from the outside face of the opening disc.
Figure 13:
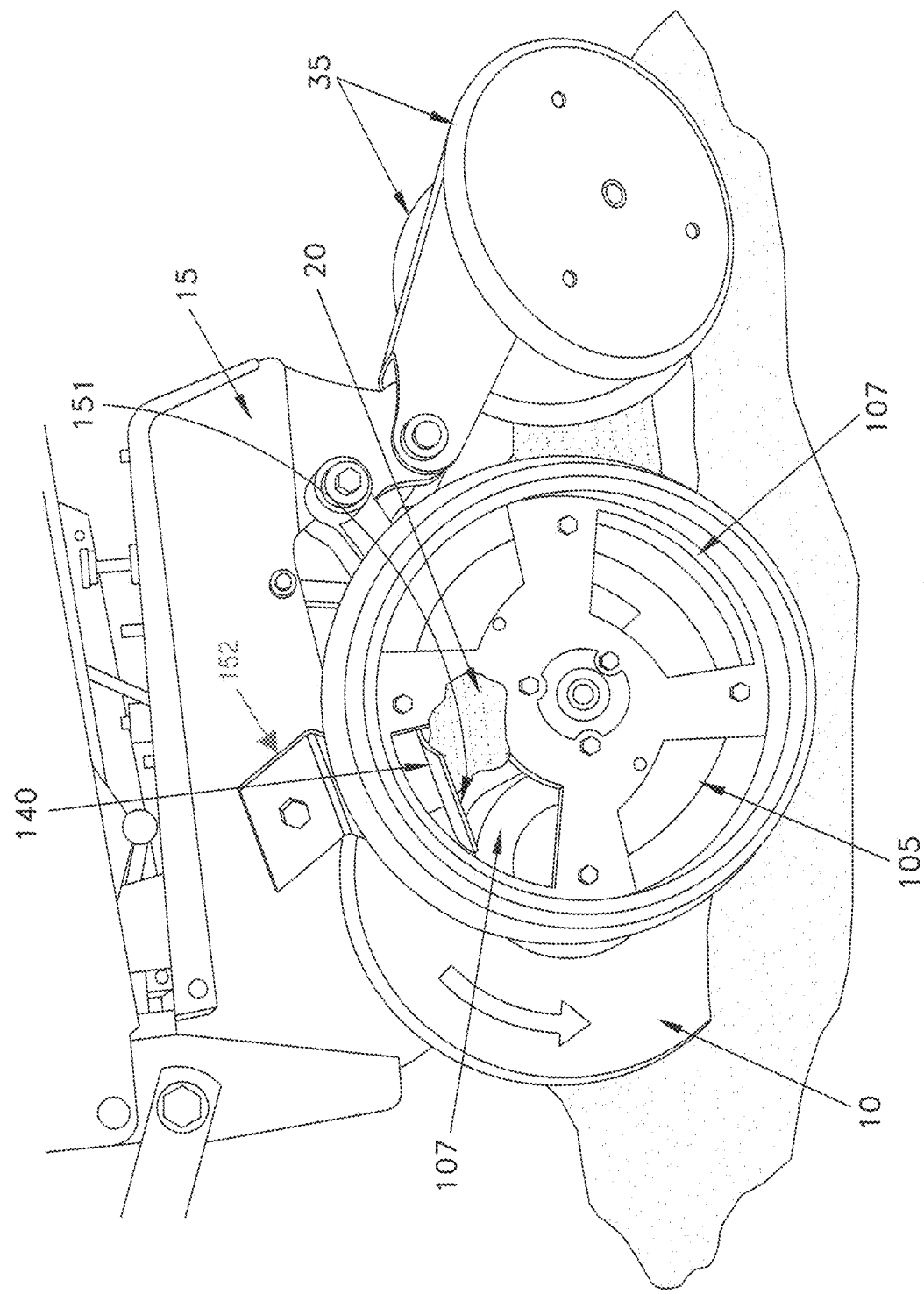
FIG. 13 is a perspective view showing soil exiting an opening in a gauge wheel formed in accordance with the present invention.

Looking first at FIGS. 8 and 9, the present invention generally comprises the provision and use of a novel gauge wheel 105 which prevents a build-up of soil in the gap between the opening disc 10 and the gauge wheel. More particularly, the novel gauge wheel 105 comprises at least one opening 107 formed in the face of the gauge wheel which permits soil to exit the gap between the opening disc 10 and the gauge wheel 105. As a result of this construction, soil does not build up in the gap between the opening disc 10 and the gauge wheel 105, the gauge wheels 105 continue to rotate freely, and the depth of the opening discs 10 are properly maintained, whereby planting may continue without interruption, even in wet soil conditions.

In one preferred construction, and still looking now at FIGS. 8 and 9, gauge wheel 105 comprises a pair of diametrically-opposed openings 107, with the openings extending along a substantial portion (e.g., greater than about 30%) of the radius of the gauge wheel.

And in a preferred construction, each of the openings 107 extends along a substantial arc (e.g., greater than about 50 degrees) of the circumference of the gauge wheel.

Of course, it will be appreciated that the number, size and disposition of the openings 107 may vary. In general, openings 107 are sufficient in number, size and disposition to permit soil to exit the gap located between the opening disc 10 and the gauge wheel 105, so as to keep soil from building up in this region and causing gauge wheel 105 to bind. However, it will also be appreciated that sufficient material must be maintained within the face of gauge wheel 105 so as to ensure sufficient wheel integrity to support the weight of the row planter assembly.

In addition to the foregoing, the portions of gauge wheel 105 forming the perimeters of the opening 107 may have various configurations, e.g., the surface edges of the openings may be tapered to facilitate egress of soil through the openings, the corners of openings 107 may be radiused, etc.

Furthermore, it will be appreciated that gauge wheel 105 may be formed out of any suitable material or materials, e.g., the entire gauge wheel 105 may be formed out of a suitable metal, a suitable plastic, etc.; or the gauge wheel 105 may be formed out of two or more materials, e.g., a metal inner rim and a plastic outer rim, etc.

Preferably, a scraper (e.g., the scraper 40 shown in FIGS. 4, 6 and 7, or the scraper 140 shown in FIGS. 8-13, etc.) is used in conjunction with the novel gauge wheel 105. In this situation, the scraper may assist, or may be modified to further assist, in directing the loosened soil through the at least one opening 107 in the face of the gauge wheel 105 as the gauge wheel turns.

It will be appreciated that numerous benefits are obtained by using the novel gauge wheel design of the present invention. First and foremost, the one or more openings 107 formed in gauge wheel 105 facilitate egress of soil from the gap between the opening discs 10 and the gauge wheels 105. As a result, productivity is increased by allowing more time to be spent planting and less time unplugging clogged row units of the row planter assemblies. This in turn permits the farmer to plant more acres in less time, with less fatigue, thereby increasing planting efficiency, particularly in wet soil conditions.

In addition to the foregoing, the one or more openings 107 in gauge wheel 105:
(i) provide an easy way to examine the row planter assembly's opening discs (particularly their hubs and bearings), scrapers, seed deployment tubes, etc.;
(ii) provide a visual cue of gauge wheel rotation;
(iii) reduce the total amount of material used to produce the gauge wheel; and
(iv) provide increased tolerance for the gap between the opening discs and the gauge wheels, thereby minimizing the time spent adjusting gauge wheel position.

Significantly, the present invention may be retroactively installed on existing row planter assemblies as well as used in new row planter assemblies.

And the present invention may be used on other farm equipment such as planting drills, etc.

And the present invention may be used with virtually any type of seed planting.

Novel Scraper

Figure 1:
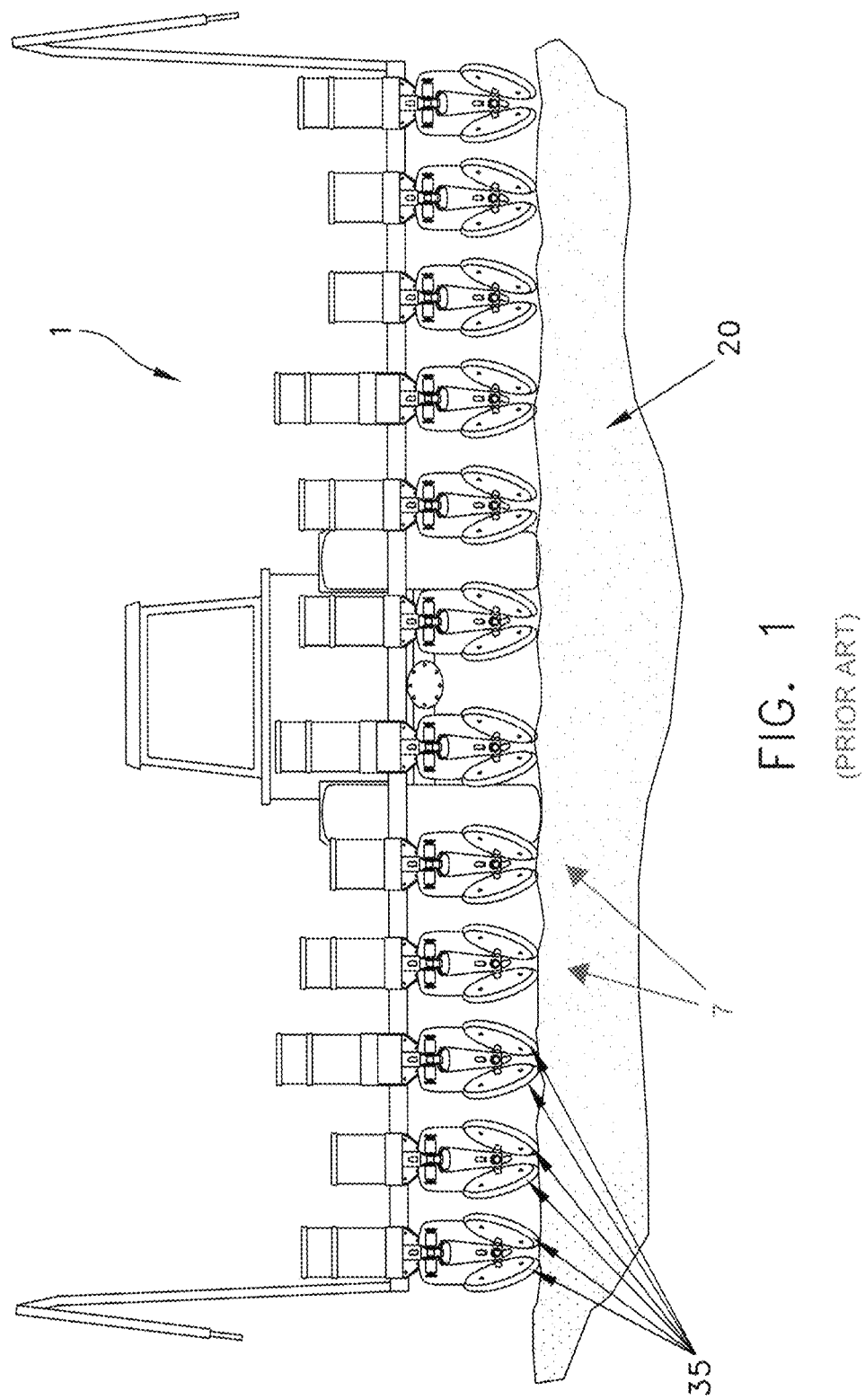
FIG. 1 is a rear view showing a prior art row planter assembly.
Figure 2:
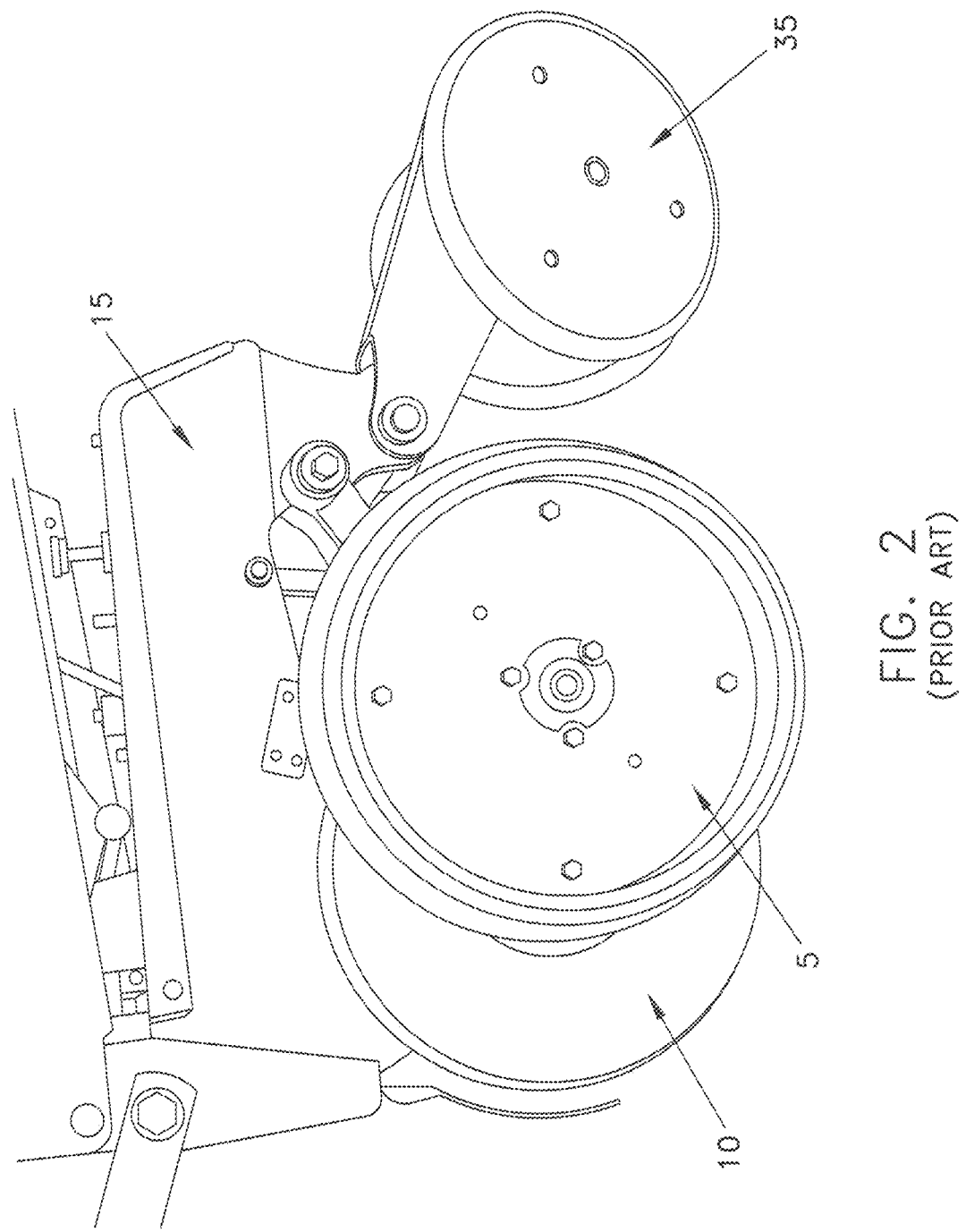
FIG. 2 is a perspective view showing a prior art opening disc, gauge wheel and closing wheels of a row unit of a planter assembly.
Figure 3:
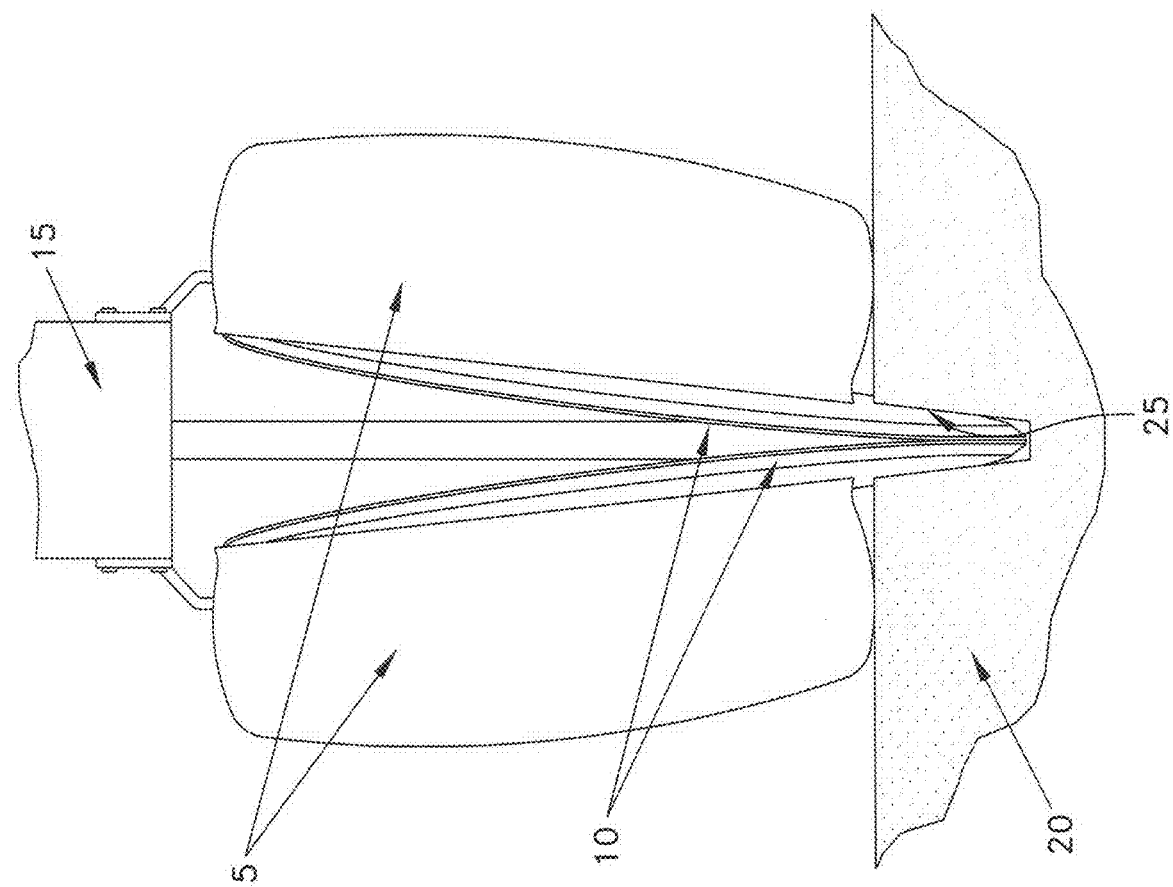
FIG. 3 is a front view showing prior art opening discs and gauge wheels of a row planter assembly.
Figure 4:
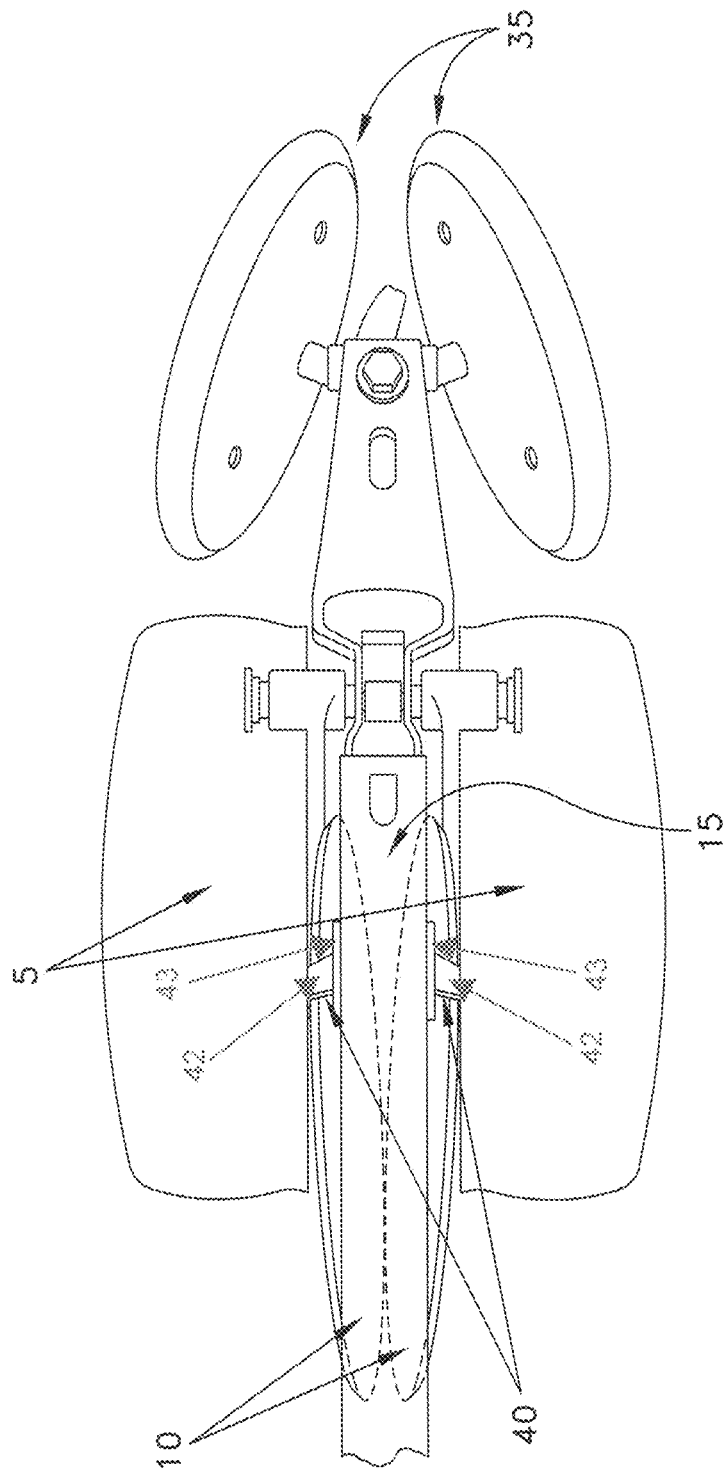
FIG. 4 is a top view showing prior art opening discs, scrapers, gauge wheels and closing wheels of a row planter assembly.
Figure 5:
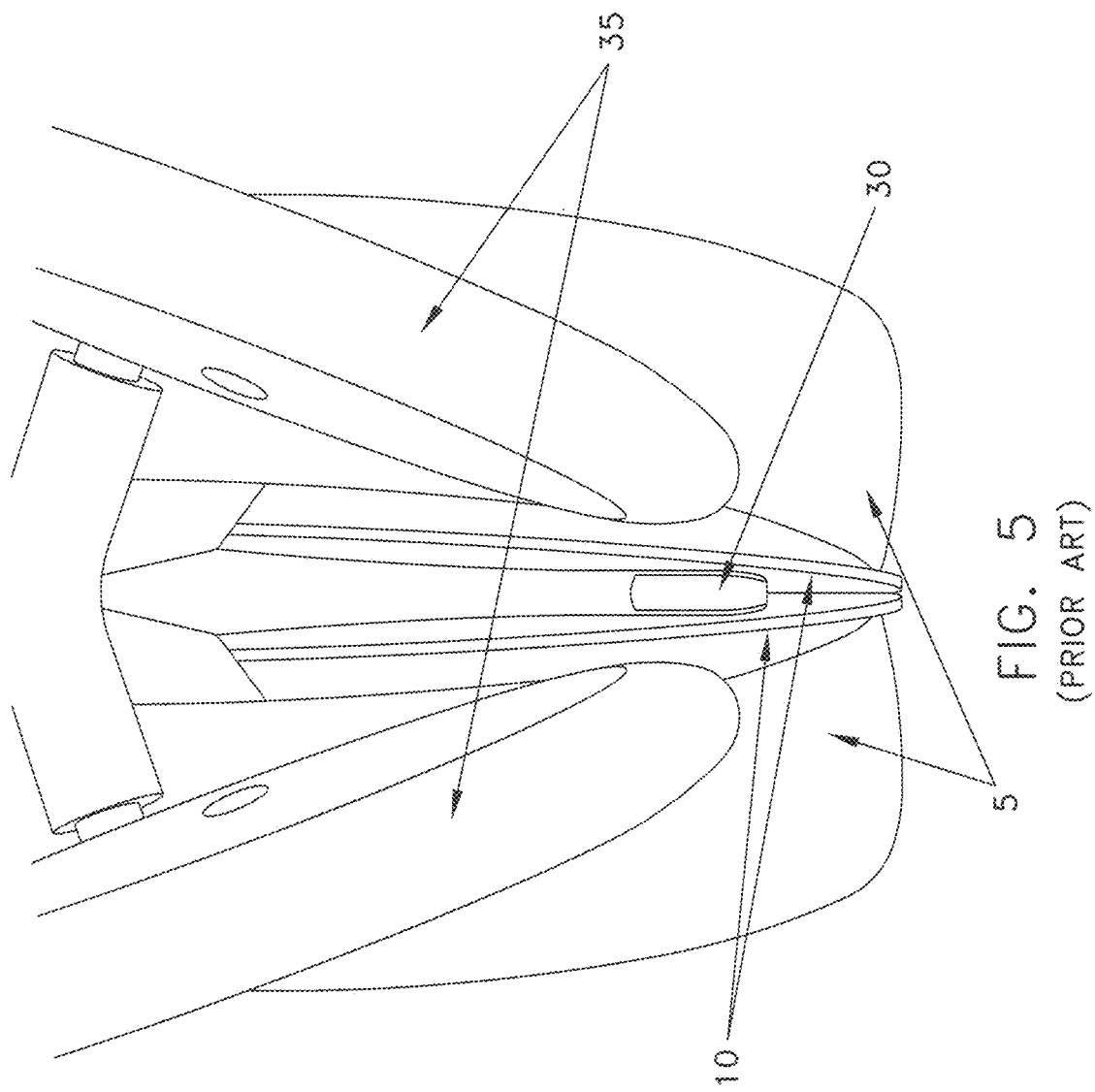
FIG. 5 is a rear view showing prior art opening discs, gauge wheels, seed tube and closing wheels of a row unit of a row planter assembly.
Figure 6:
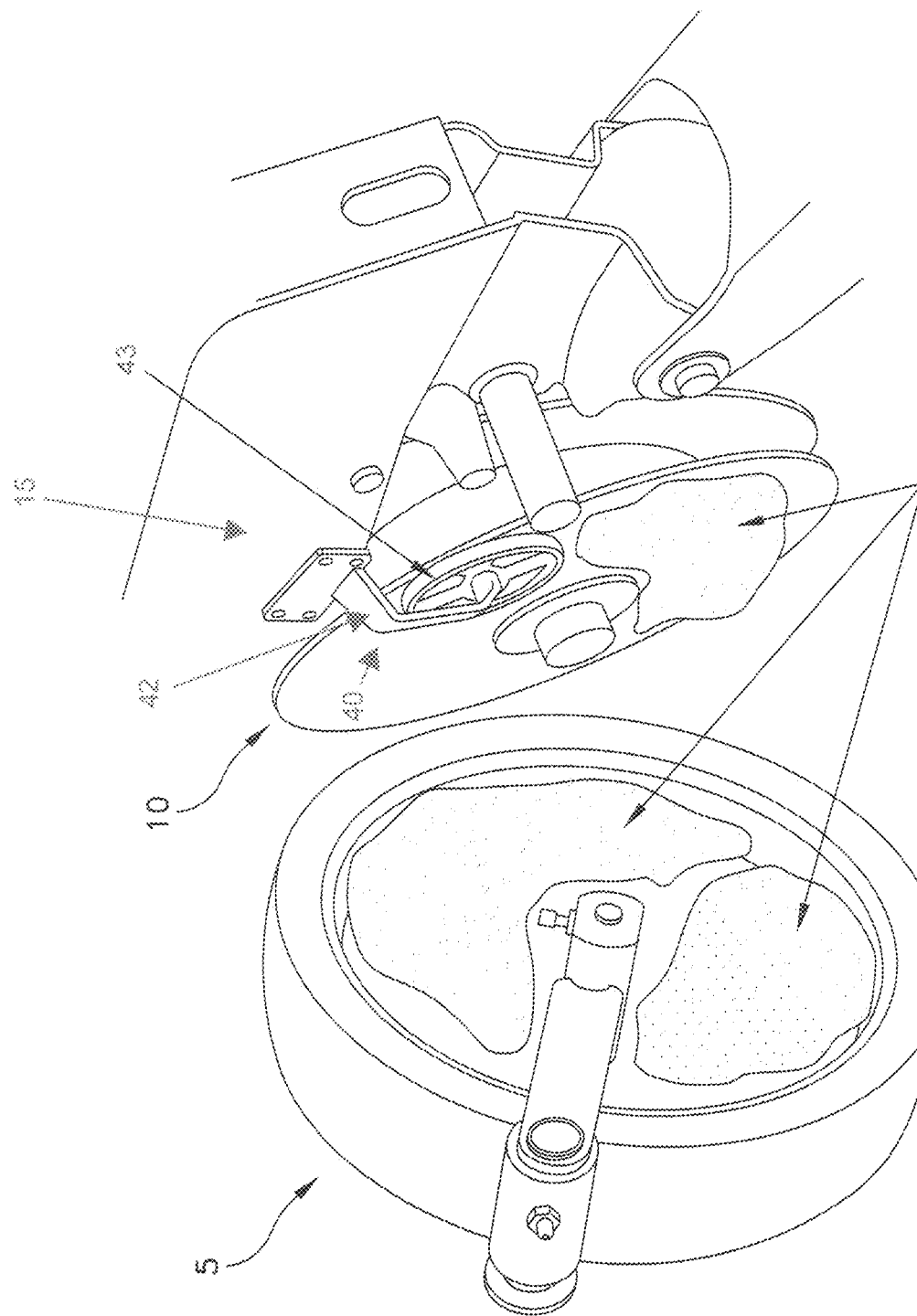
FIG. 6 is an exploded view of a prior art gauge wheel, scraper and opening discs of a row unit of a row planter assembly, with soil shown adhering to the outside face of the opening disc and the inside face of the gauge wheel.
Figure 7:
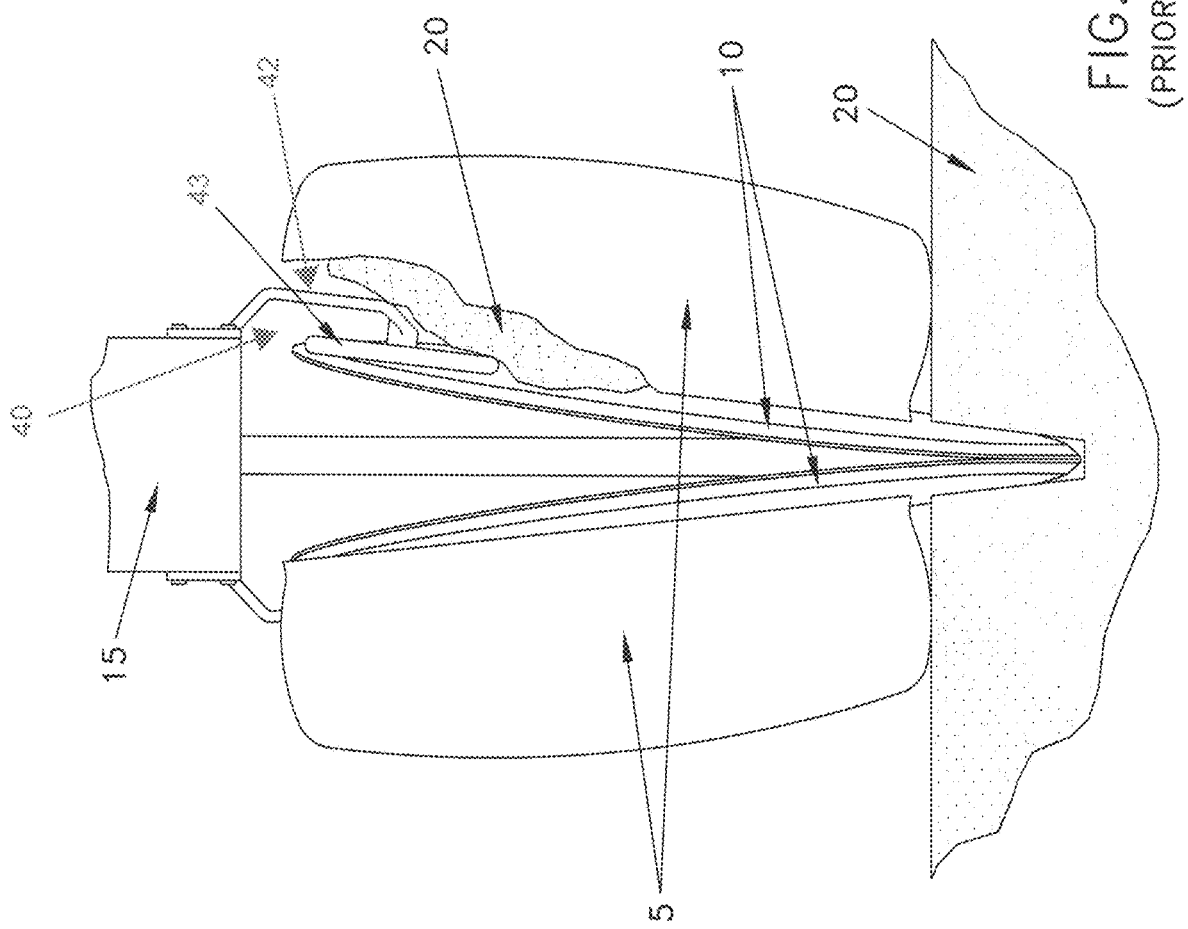
FIG. 7 illustrates prior art opening discs, scraper and gauge wheels of a row unit of a row planter assembly, with soil shown lodged in the gap between the opening disc and the gauge wheel.

The prior art scraper 40 shown in FIGS. 4, 6 and 7 essentially comprises a wheel which contacts the face of opening disc 10, i.e., a wheel-shaped scraper blade 43 is mounted to frame 15 by means of an attachment arm 42.

While the prior art scraper 40 works well with the novel gauge wheel 105, with the loosened soil being free to exit the gap located between opening disc 10 and gauge wheel 105 via openings 107, the present invention generally performs better with the provision of a novel scraper which is configured to direct the loosened soil out through openings 107.

Thus, for example, and looking now at FIGS. 8-13, there is shown a novel scraper 140. Novel scraper 140 serves to remove accumulated soil from the face of opening disc 10 and/or the rim of gauge wheel 105 and direct that loosened soil out of openings 107 of the gauge wheel 105. To this end, novel scraper 140 comprises (i) a flat leading edge 145 for engaging the side wall of the opening disc 10 and freeing the built-up soil from the opening disc, and (ii) a curved body 150 for channeling the scraped-off soil toward the openings 107 in gauge wheel 105, so as to facilitate egress of soil from the space between the opening disc and gauge wheel. Curved body 150 also includes a trailing edge 151 for removing any accumulated soil from the rim of gauge wheel 105 and channel that loosened soil out openings 107. In one form of the invention, novel scraper 140 comprises an attachment arm 152 for securing the scraper to frame 15 of the row planter assembly.

Thus it will be seen that novel scraper 140 provides one edge 145 for removing accumulated soil from opening disc 10, another edge 151 for removing accumulated soil from gauge wheel 105, and a curved body 150 located between edges 145 and 151 for guiding loosened soil out openings 107.

Universal Scraper Arm

In the construction shown in FIGS. 8-13, scraper 140 is shown mounted to the frame 15 of the row planter assembly 1, i.e., via an attachment arm 152. This is analogous to the manner in which the prior art scraper 40 is mounted to the frame 15 of the row planter assembly, i.e., via attachment arm 42 (FIGS. 4, 6 and 7).

In an alternative form of the present invention, the scraper comprises a universal scraper arm for supporting the scraper blade adjacent to the opening disc 10. This universal scraper arm is mounted to an adjacent axle and permits the scraper blade to be properly positioned against the opening disc when using any of the commercially-available opening discs. This universal scraper arm may be mounted to the axle of the opening disc 10, or the universal scraper arm may be mounted to the axle of gauge wheel 105. In one preferred form of the invention, the universal scraper arm is mounted to the axle of opening disc 10. The universal scraper arm may be used to support substantially any scraper blade, e.g., it may be used to support the wheel-shaped scraper blade 43 shown in FIGS. 4, 6 and 7, or the scraper 140 shown in FIGS. 8-13, etc.

Figure 14:
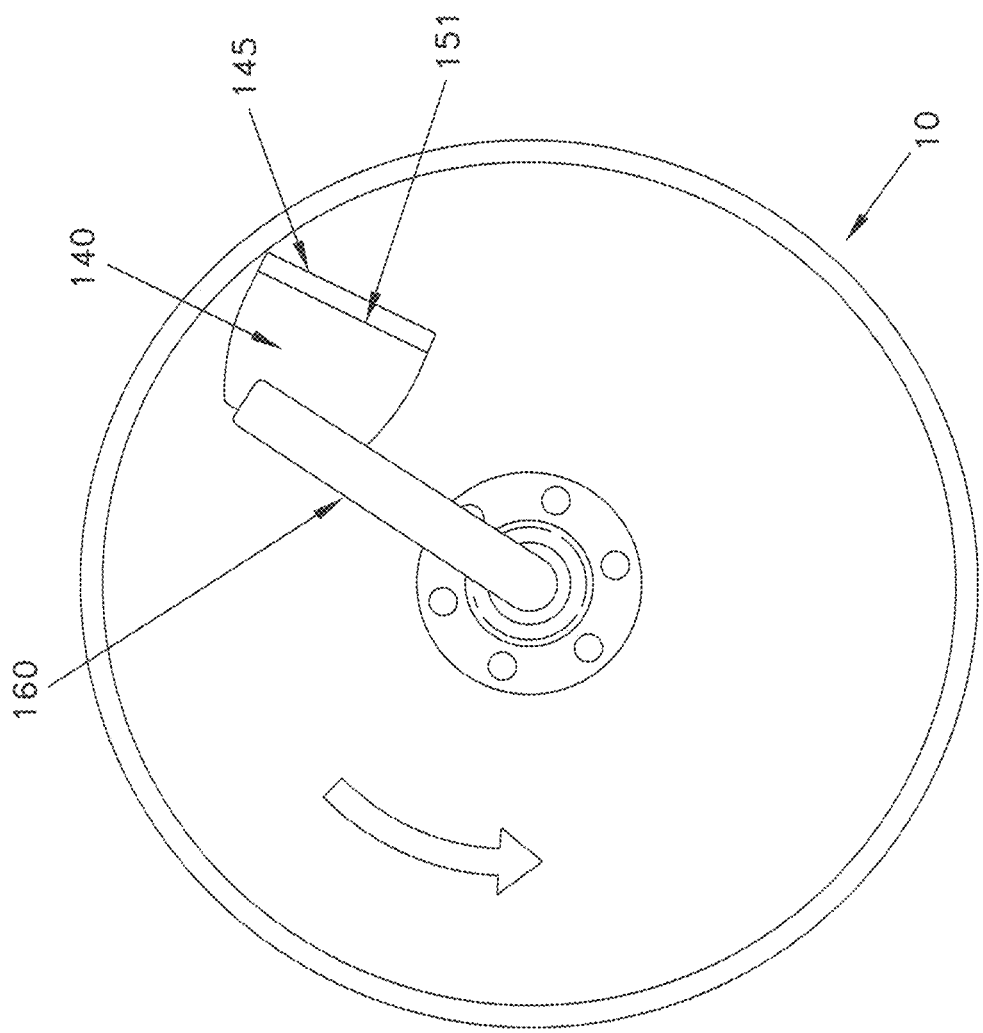
FIG. 14 is a side view showing an alternative approach for mounting the scraper adjacent the opening disc.
Figure 15:
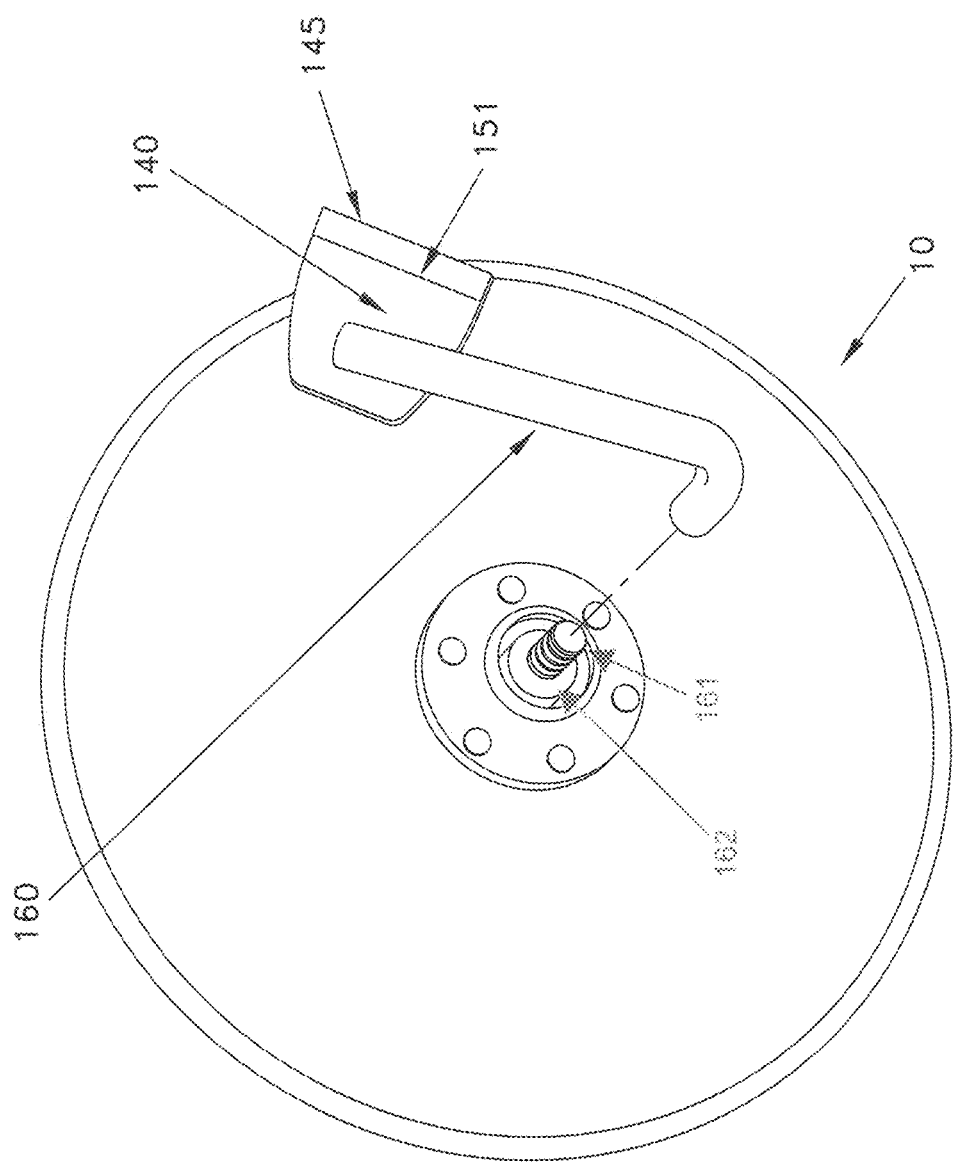
FIG. 15 is a side view showing one way of effecting the construction shown in FIG. 14.
Figure 16:
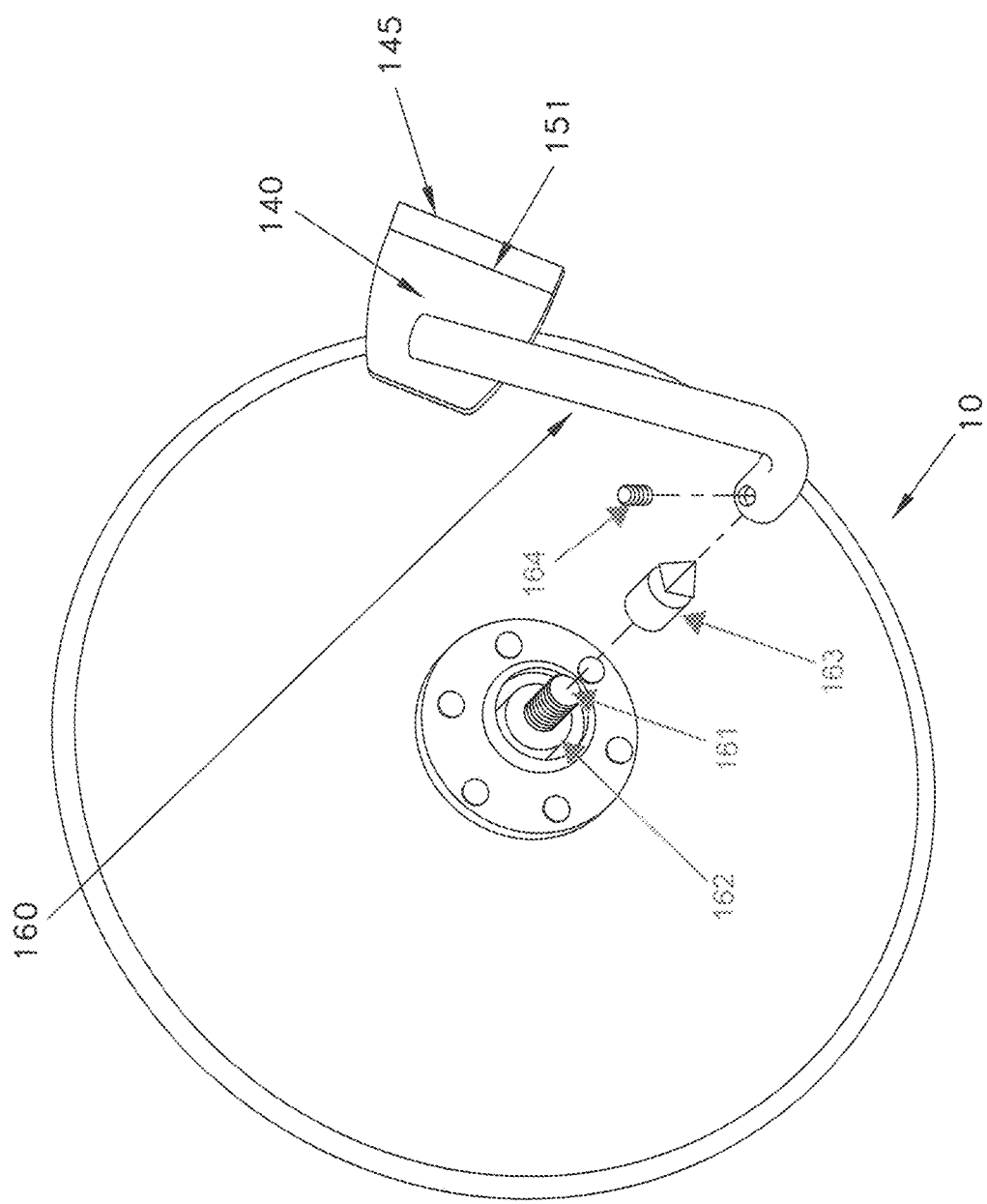
FIG. 16 is a side view showing another way of effecting the construction shown in FIG. 14.
Figure 17:
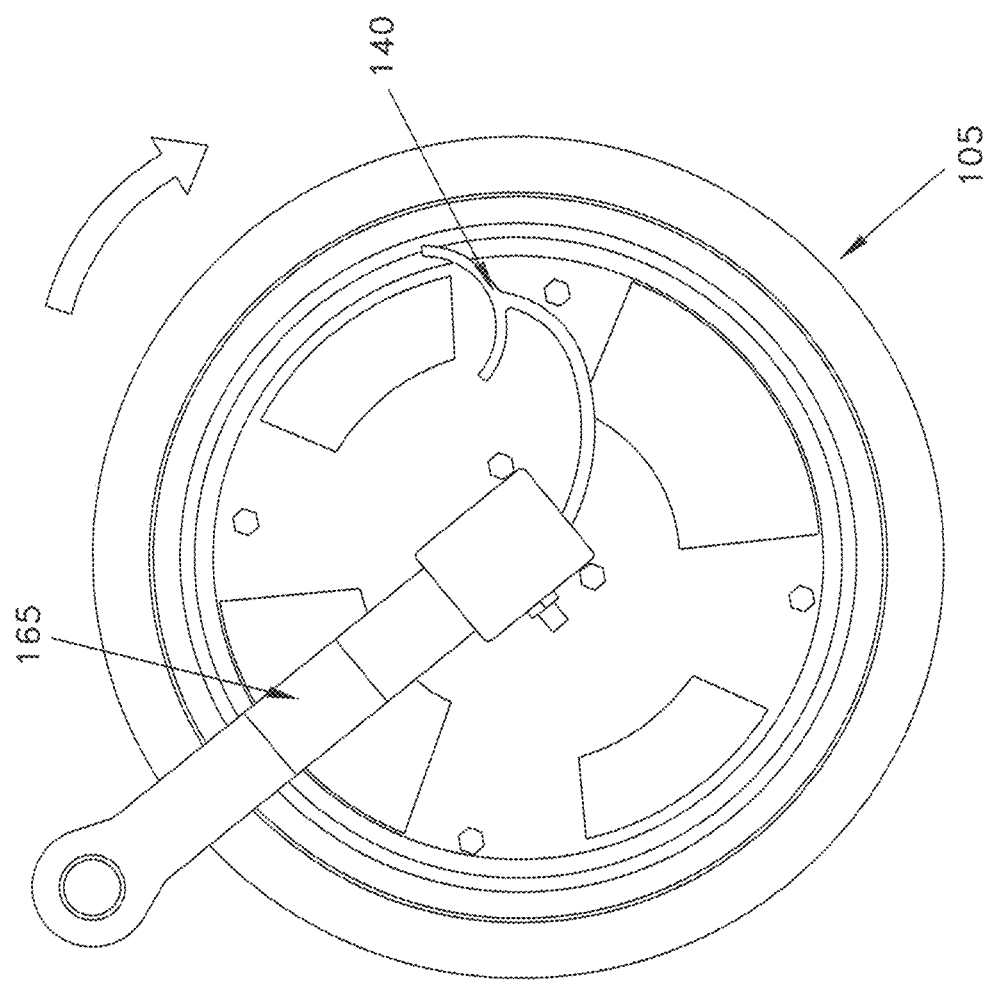
FIG. 17 is a side view showing another form of scraper, with another mounting arrangement.
Figure 18:
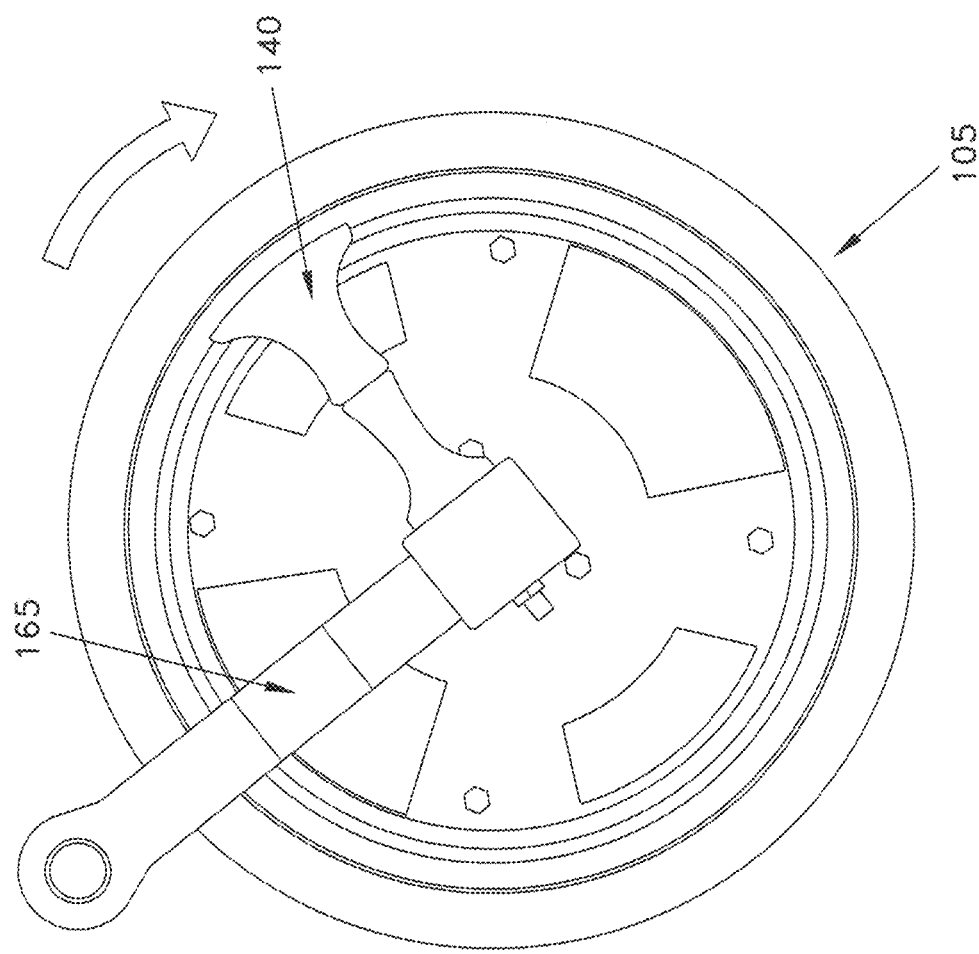
FIG. 18 is a side view showing another form of scraper, with another mounting arrangement.
Figure 19:
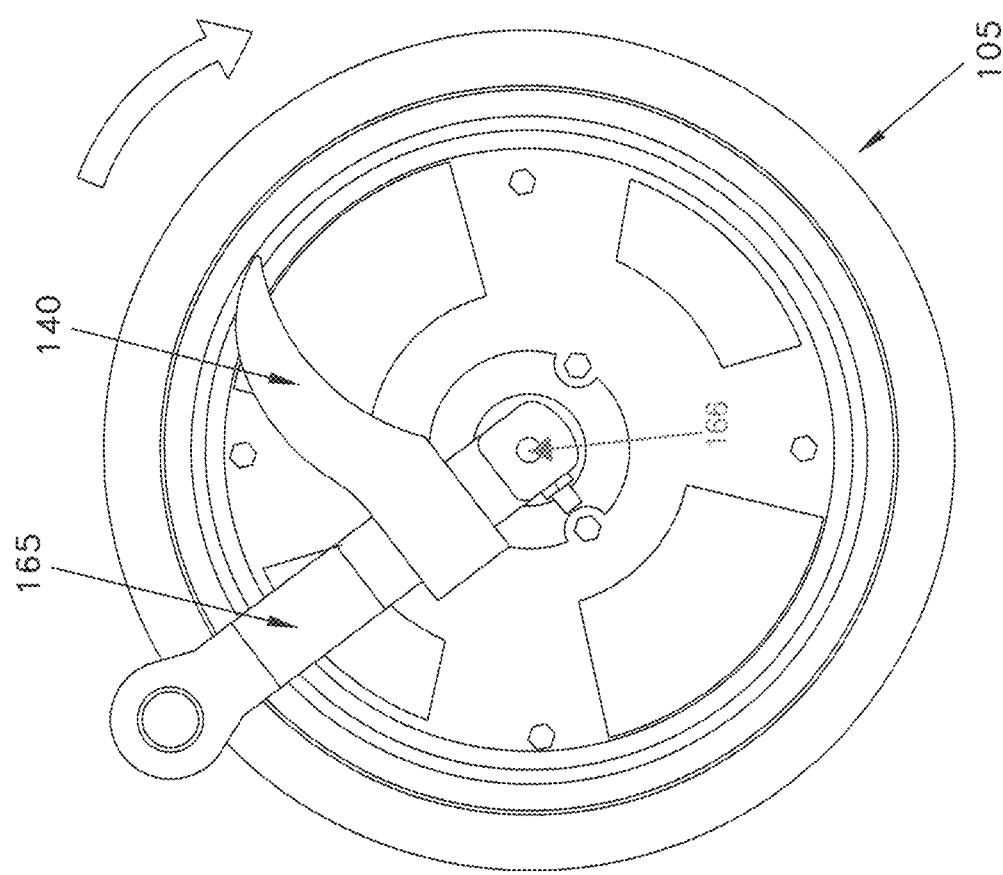
FIG. 19 is a side view showing another form of scraper, with another mounting arrangement.
Figure 20:
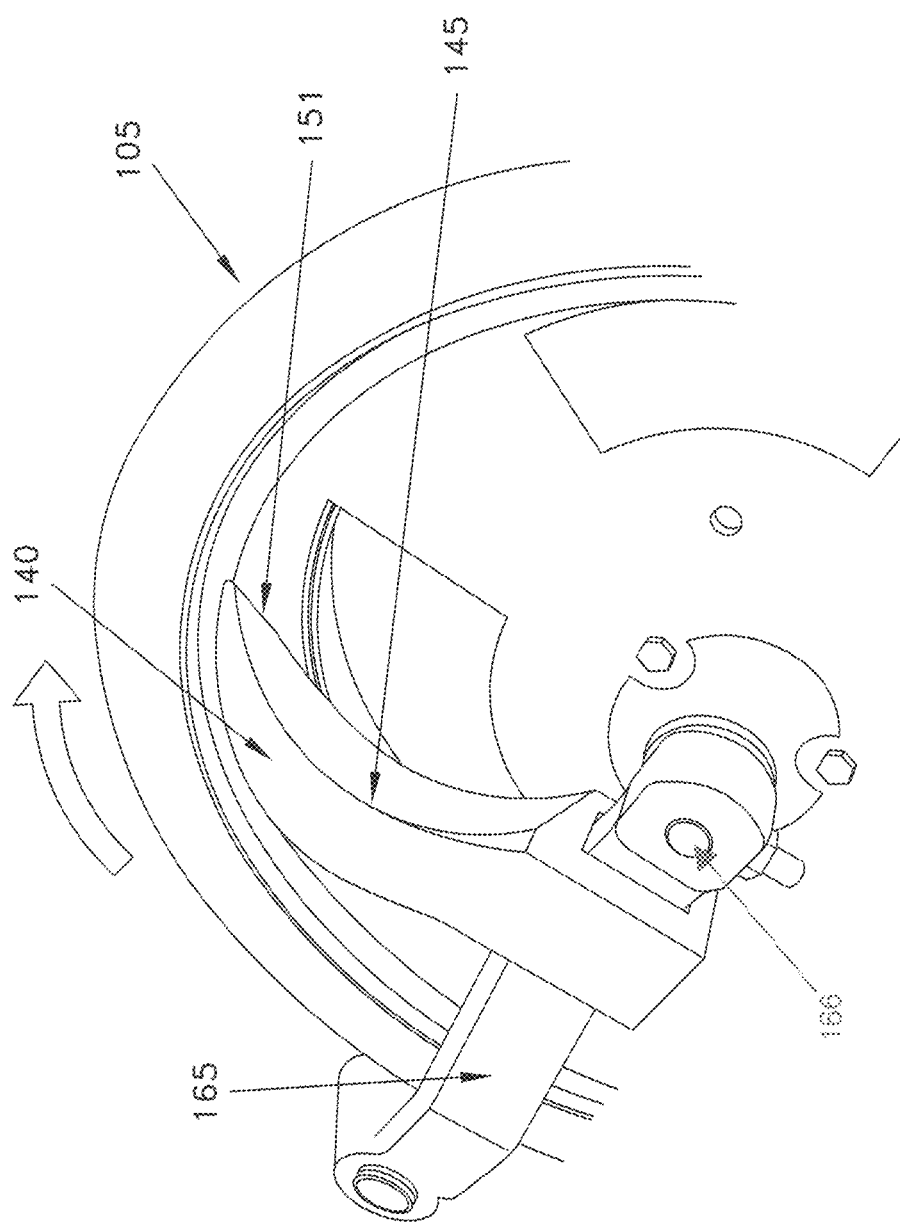
FIG. 20 is a perspective view showing further details of the construction shown in FIG. 19.

Thus, for example, and looking now at FIGS. 14-16, it will be seen that a scraper (e.g., scraper 140) may be mounted to the axle of the opening disc 10 via universal scraper arm 160. In FIG. 15, universal scraper arm 160 is shown screwed directly onto the threaded stud 161 of opening disc axle 162. In FIG. 16, universal scraper arm 160 is shown attached to axle 162 by means of an intermediate adapter 163, with intermediate adapter 163 being screwed onto threaded stud 161 of opening disc axle 162, and with universal scraper arm 160 mounting to intermediate adapter 163, e.g., via a set screws 164. Intermediate adapter 163 allows universal scraper arm 160 to be set at substantially any radial position, and intermediate adapter 163 allows a single universal arm 160 to be used with threaded studs 161 of various sizes.

Alternatively, and looking now at FIGS. 17-20, a scraper (e.g., scraper 140) may be mounted to the axle 166 of gauge wheel 105 via universal scraper arm 165.

Wheel Liner

Figure 21:
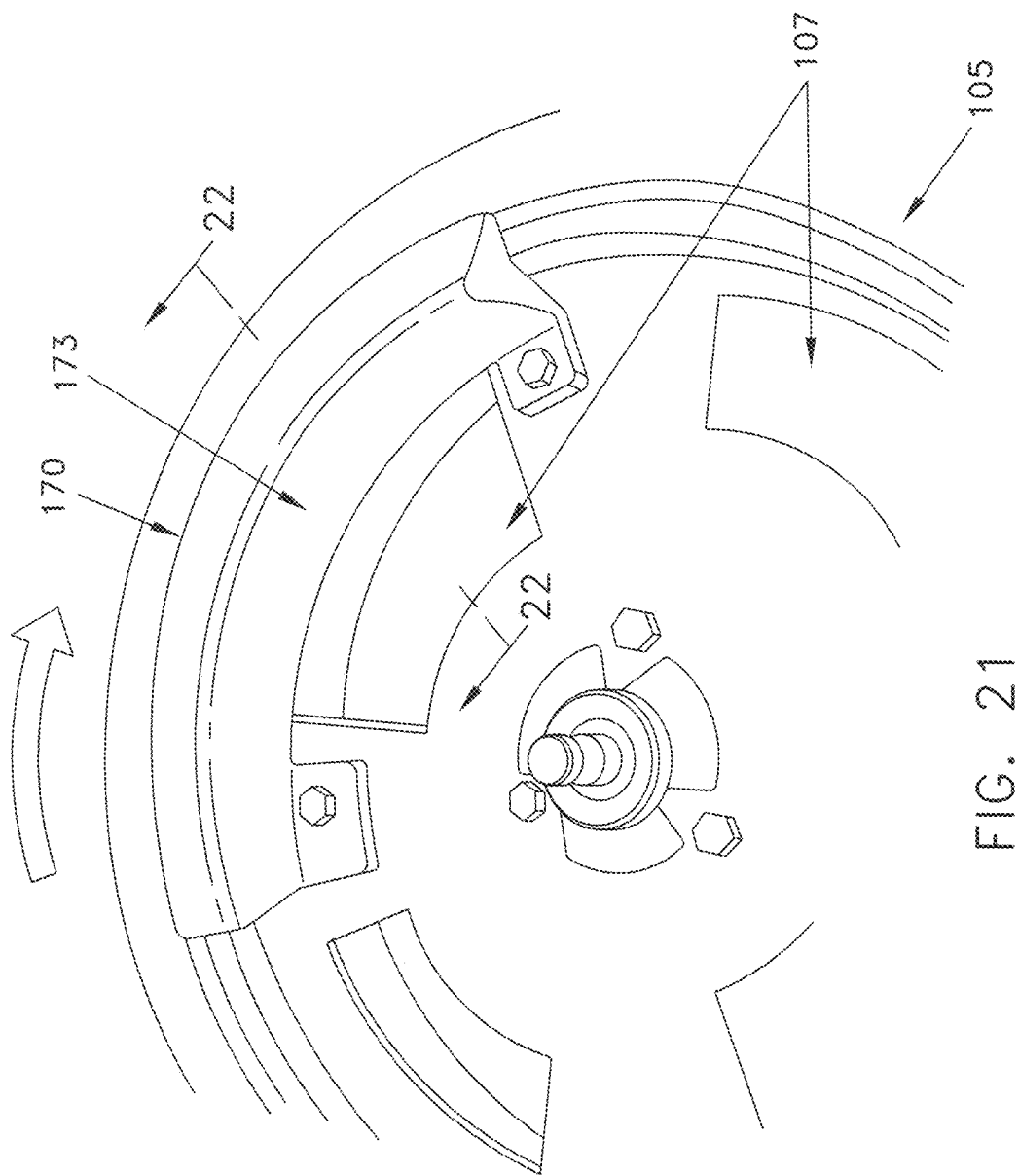
FIG. 21 is a perspective view showing a gauge wheel liner formed in accordance with the present invention.
Figure 22:
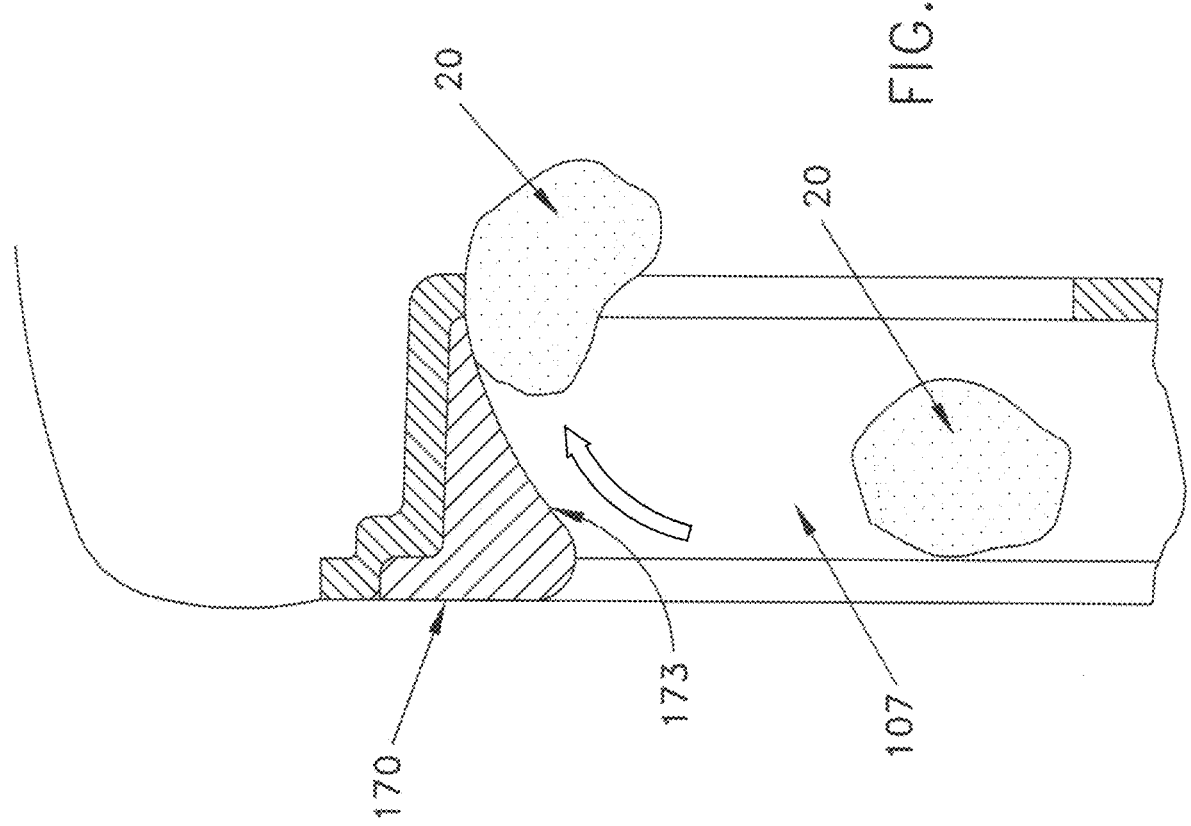
FIG. 22 is a side view in section taken along line 22-22 of FIG. 21.

In an alternate form of the present invention, and looking now at FIGS. 21 and 22, the gauge wheel 105 can be formed with a gauge wheel liner 170. The gauge wheel liner 170 is formed so as to generally follow the shape of the gauge wheel rim at its base, forming an inner rim. The gauge wheel liner 170 is formed so that its inner rim surface 173 gradually slopes downward and outward from the adjacent opening disc, towards the exit openings 107 formed in the gauge wheel rim. This sloping of the inner rim surface 173 of gauge wheel liner 170 serves to facilitate egress of soil from the space between the opening disc and the gauge wheel. In other words, the varying slope along the inner rim surface 173 of gauge wheel liner 170 is formed so as to create a higher bevel at the inner rim surface furthest from the openings in the gauge wheel, and a lower bevel at the inner rim surface adjacent to the openings in the gauge wheel, whereby to help channel loosened soil out openings 107. Furthermore, the body of gauge wheel liner 170 also acts as a block to prevent the build-up of soil adjacent to openings 107.

In one preferred form of the invention, gauge wheel liner 170 is formed so that its inner rim surface 173 is set at an angle of approximately 70 degrees or less to the plane of gauge wheel 105.

The gauge wheel liner 170 may be formed with tabs positioned so as to align with existing bolts on the gauge wheel, whereby to facilitate affixing the gauge wheel liner to the gauge wheel.

Alternatively, the gauge wheel liner may be provided with a face plate. The face plate is formed with a perimeter slope molding that matches the rim face, thus covering the inner rim face and aligning with all holes formed in the rim face. The face plate includes openings which would align with the soil egress openings of the gauge wheel.

Soil Deflector

Figure 23:
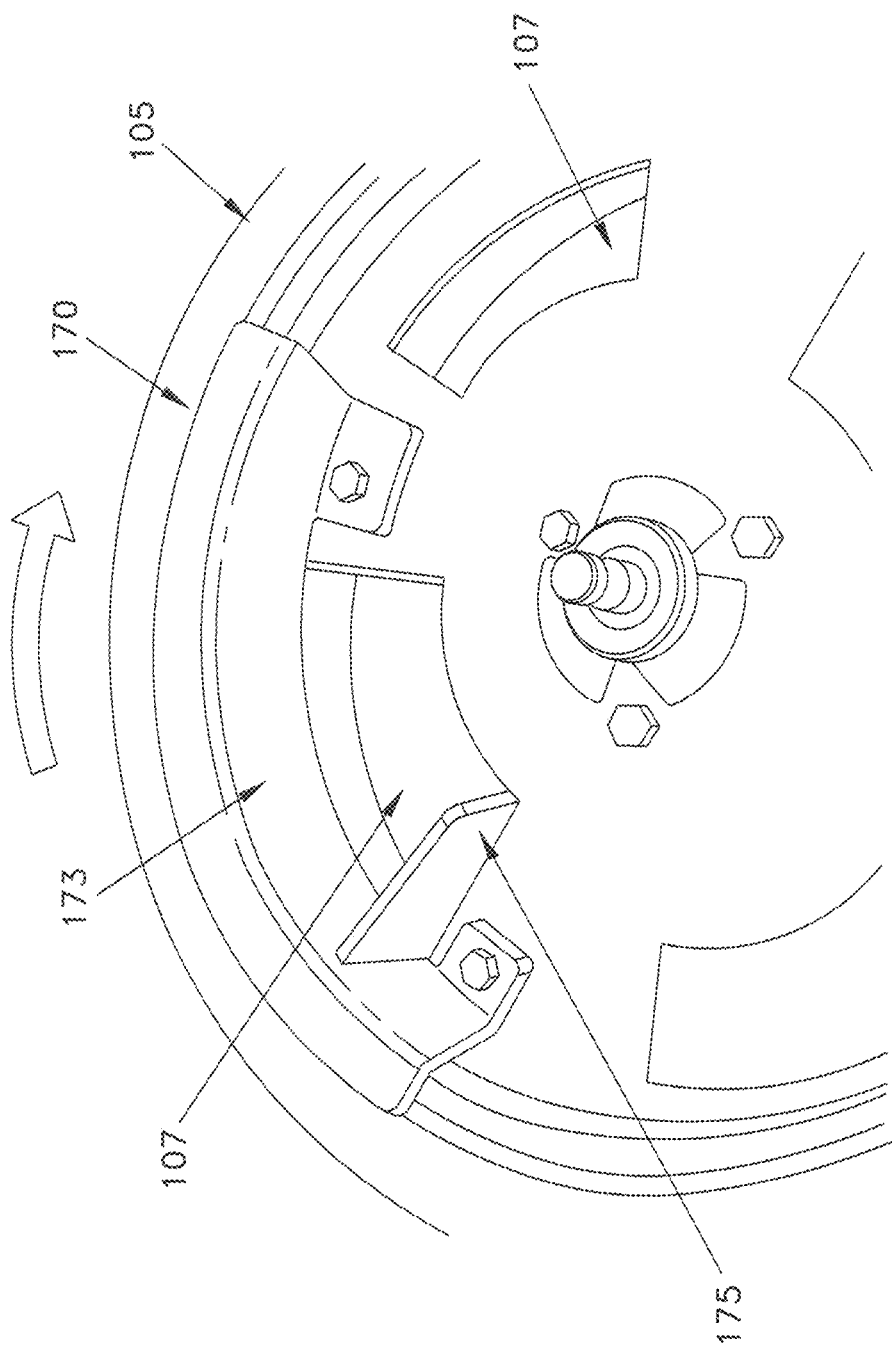
FIG. 23 is a perspective view showing a gauge wheel deflector formed in accordance with the present invention.

In another preferred form of the present invention, and looking now at FIG. 23, when the gauge wheel liner or face plate is used, a soil deflector 175 may also be provided. The soil deflector 175 is positioned along the inner rim of the gauge wheel, along the vertical trailing edge of the opening in the gauge wheel. The soil deflector 175 serves as an additional means to facilitate egress of soil from the space between the opening disc and the gauge wheel. Additionally, the soil deflector 175 serves to prevent wet soil from sticking to the flat edges of the openings in the gauge wheel. The soil deflector 175 is positioned at an angle of deflection toward the gauge wheel opening 107, and may be formed out of a non-stick material. The soil deflector 175 is preferably attached to the gauge wheel using an adjacent existing bolt on the gauge wheel.

Soil Exit Chute

Figure 24:
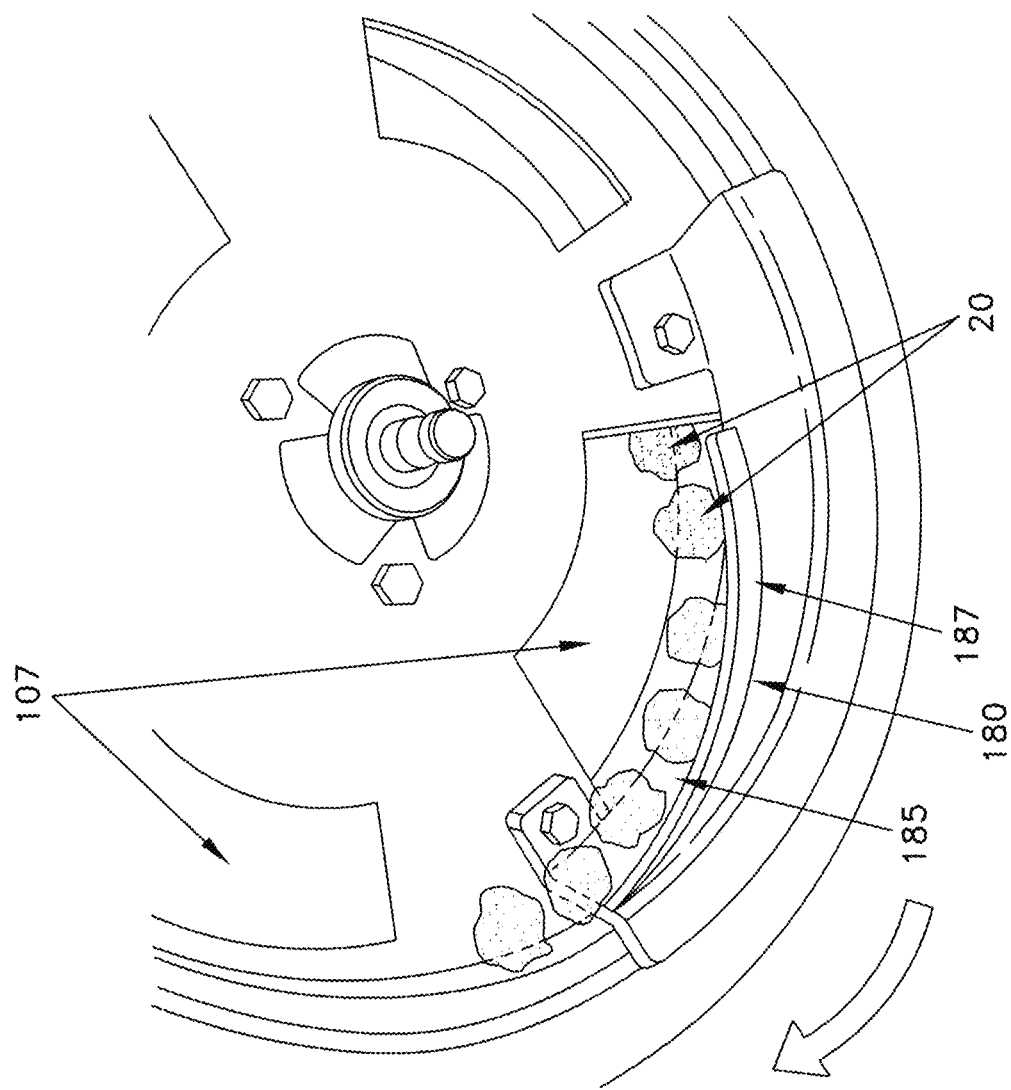
FIG. 24 is a perspective view showing another form of gauge wheel liner formed in accordance with the present invention.

In yet another preferred construction, and looking now at FIG. 24, there is shown a soil exit chute 180 which is positioned adjacent to gauge wheel openings 107, whereby to facilitate egress of soil from the gap located between opening disc 10 and gauge wheel 105. More particularly, FIG. 24 shows how wet soil removed from the opening disc 10 and/or gauge wheel 105 by a scraper (e.g., scraper 40 or scraper 140) tends to roll along the perimeter of the gauge wheel rim and, as additional soil is scraped from the opening disk and/or gauge wheel, the newly scraped soil also falls to the perimeter of the gauge wheel rim, sticking to the previously scraped soil. In other words, these soil scrapings have a tendency to stick to each other as well as to the rim of the gauge wheel (and opening disc), effectively forming soil "balls". Accordingly, the soil exit chute 180 takes advantage of this particle attraction, by providing a soil egress for guiding the soil balls out openings 107 in the gauge wheels. In one preferred form of the invention, soil exit chute 180 comprises a floor 185 and a side wall 187, where floor 185 and side wall 187 are configured to direct the soil balls outboard as they emerge from openings 107 in the gauge wheels. The soil exit chute 180 may be manufactured out of a non-stick plastic, or a coated metal, or a combination of the two.

Preferred Construction For Universal Scraper

The present invention also provides a novel universal scraper which may be used with ground opening equipment, including ground opening equipment using furrow opener discs used on seed planters, fertilizer attachment ground opening discs, and so-called "no till" ground opening discs.

As noted above, scrapers have long been used to remove soil that adheres to the surface of an opening disc. This is especially important in wet or sticky soil conditions. Prior art scrapers have generally been attached to the frame that the opening disc is mounted to, e.g., the frame of a row planter assembly. Some prior art scrapers are provided with a circular scraper contact surface (see, for example, scraper 40 of FIGS. 4, 6 and 7, which comprise a wheel-shaped scraper blade 43), while other prior art scrapers are provided with a flat edge scraper contact surface.

Scrapers used in the prior art for row planter assemblies comprising double disc furrow openers have been mounted to the frame of the row planter assembly and disposed so as to scrape in an area at the trailing edge of the opening discs. See, for example, the scraper 40 shown in FIGS. 4, 6 and 7, where scraper 40 comprises an attachment arm 42 for mounting scraper blade 43 to frame 15. This scraper contact area scrapes soil and refuse from the opening disc, propelling the soil and refuse generally upward, where it then falls downward due to gravity, toward the trailing portion of the rotating gauge wheel. Scraped material falling to the trailing portions of the gauge wheels tends to tumble around the rim perimeter of the gauge wheels, often resulting in a rapidly enlarging mass of material. However, there is only a narrow rear opening between the gauge wheels and the opening discs on double disc opener-type planters. The mass of revolving soil and refuse often becomes too large to exit the gap between the opening discs and the gauge wheels, causing the opening discs and the gauge wheels to clog up. At this point the gauge wheels typically start to skid and tear the furrow. Seed is then left atop the ground, or in a poorly formed furrow, with poor seed-to-soil contact.

Figure 25:
FIGS. 25 and 26 are schematic views showing how dirt may build up between a frame-mounted scraper and force the scraper away from the opening disc.

Another problem with frame-mounted scrapers (e.g., scrapers such as scraper 40 shown in FIGS. 4, 6 and 7) is that the attachment arm (e.g., the attachment arm 42 of scraper 40) can be a barrier or obstruction which holds back soil and refuse on the trailing edge of the attachment arm. See, for example, FIG. 25, where the attachment arm 42 supporting scraper blade 43 acts as a barrier to soil and refuse, causing an aggregation 188 of soil and debris on the attachment arm.

Figure 26:
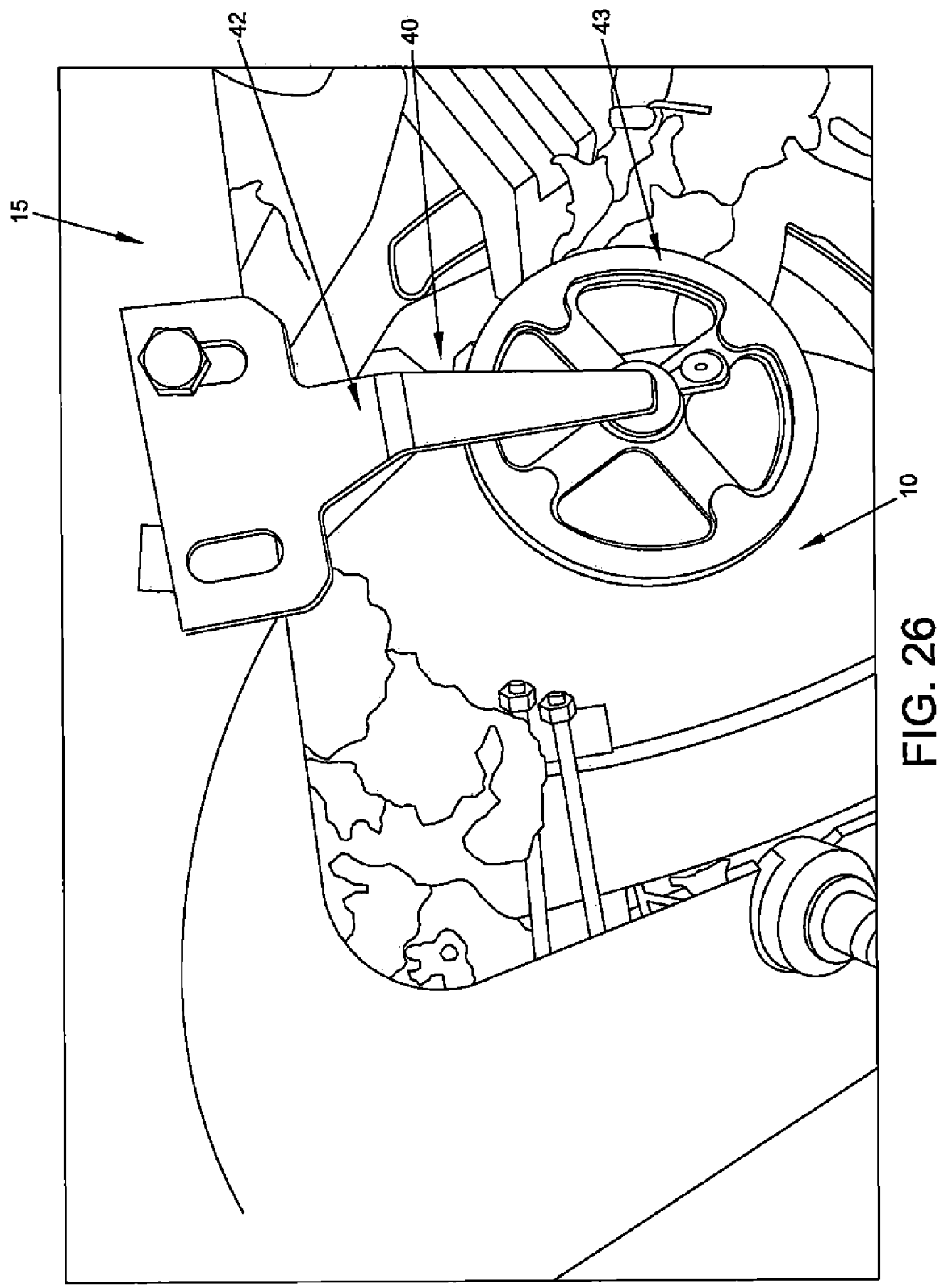
Figure 27:
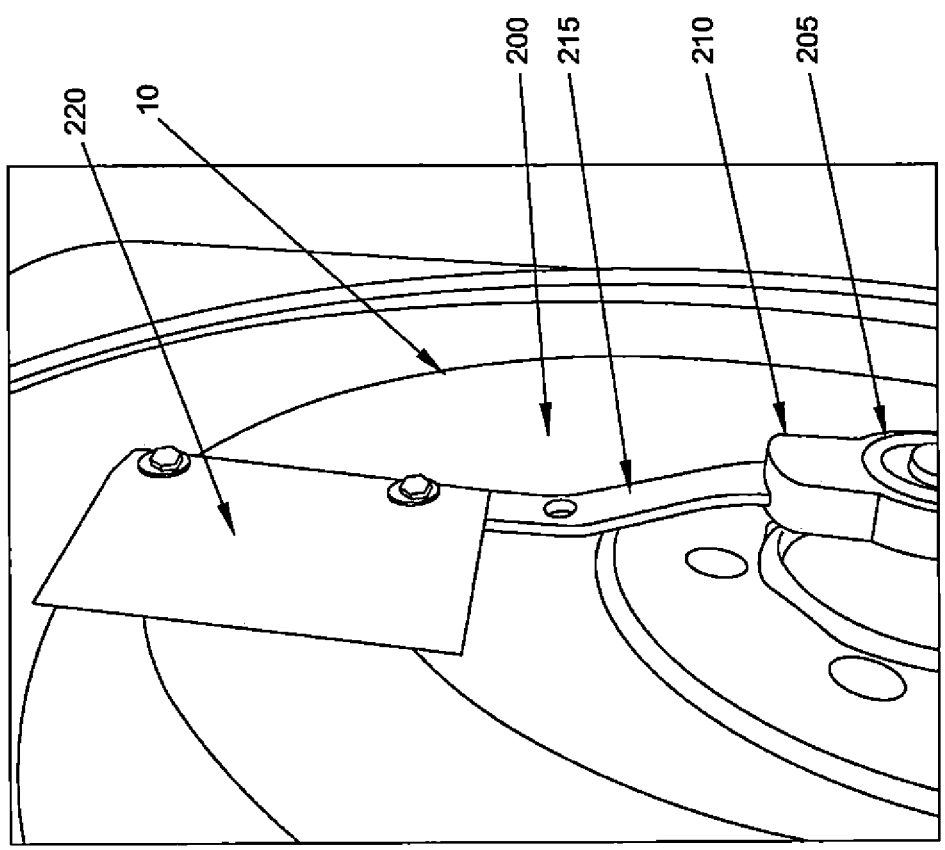
FIGS. 27 and 28 are schematic views showing a novel universal scraper formed in accordance with the present invention.

This soil and debris can be forced under the attachment arm, thereby pushing the scraper blade away from the disc surface (FIG. 26). When this occurs, the scraper blade and entrapped soil and refuse can begin to have a braking effect on the opening disc, which will prevent the desired seed trench from being formed. Also, some soil and material stopped by the trailing edge of frame-mounted attachment arms will fall into the area between the opening discs, where disc rotation causes the soil and refuse to move to the outer circumference of the opening discs. Once this soil and refuse migrates to the outer disc perimeter, it often forms a wedge between the two opposing opening disc blades (where they are set to substantially contact each other, as seen in FIG. 7). When the two opposing opening disc blades become wedged, the opening discs will no longer rotate and the wedged opening discs can no longer create a proper furrow for the seed.

In accordance with the present invention, there is provided a novel universal scraper which addresses the deficiencies of prior art scrapers.

More particularly, and looking now at FIGS. 27-50, there is provided a novel universal scraper 200. Universal scraper 200 comprises four major components, an axle hub adapter 205 (FIGS. 27-42, 45 and 47), a hub adapter clamp 210 (FIGS. 27, 28 and 43-47), a scraper arm 215 (FIGS. 27, 28 and 48) and a scraper blade 220 (FIGS. 27, 28, 49 and 50). In essence, and as will hereinafter be discussed, axle hub adapter 205 is intended to be secured to the axle of an opening disc (or, alternatively, the axle of a gauge wheel), hub adapter clamp 210 is intended to be secured to axle hub adapter 205, scraper arm 215 is intended to be secured to hub adapter clamp 210, and scraper blade 220 is intended to be secured to scraper arm 215.

Axle hub adapter 205 has a base diameter 225 (FIG. 29) sized to tighten against the bearing race 230 of a bearing 232 so as to hold the bearing 232 in proper position against opening disc 10. No additional parts are necessary inasmuch as axle hub adapter 205 accepts a nut 235 of either SAE or metric size.

Figure 28:
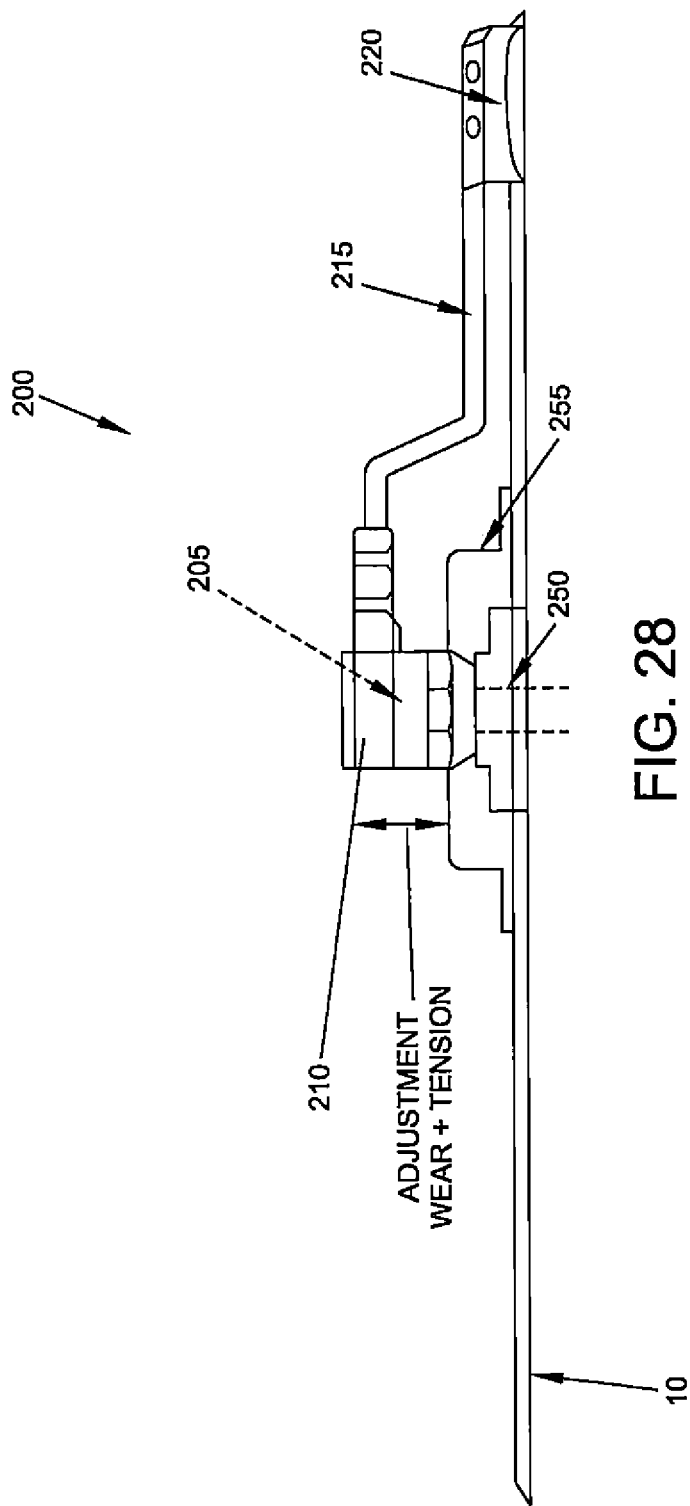
Figure 29:
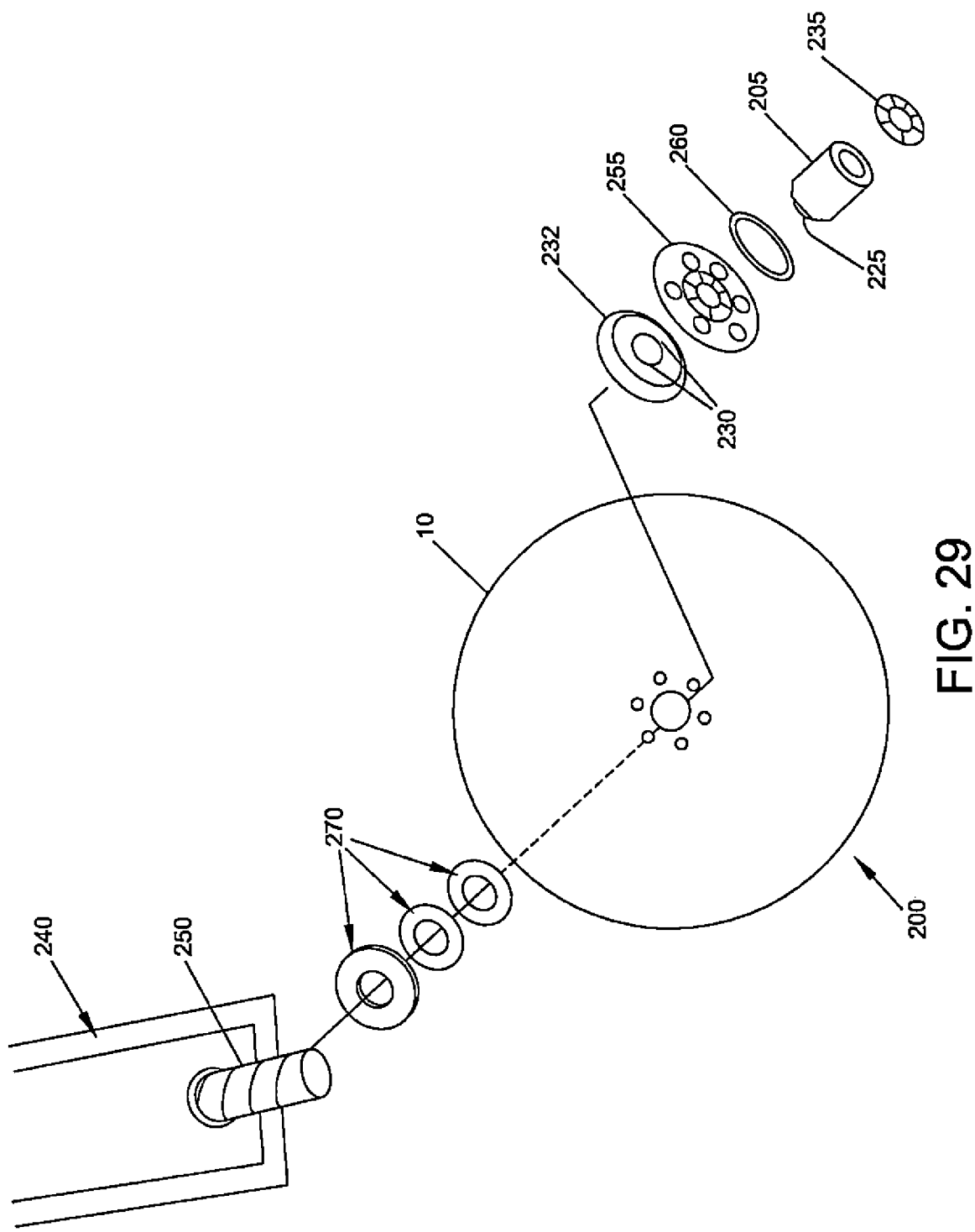
FIGS. 29-50 are schematic views showing various components of the novel universal scraper shown in FIGS. 27 and 28.
Figure 30:
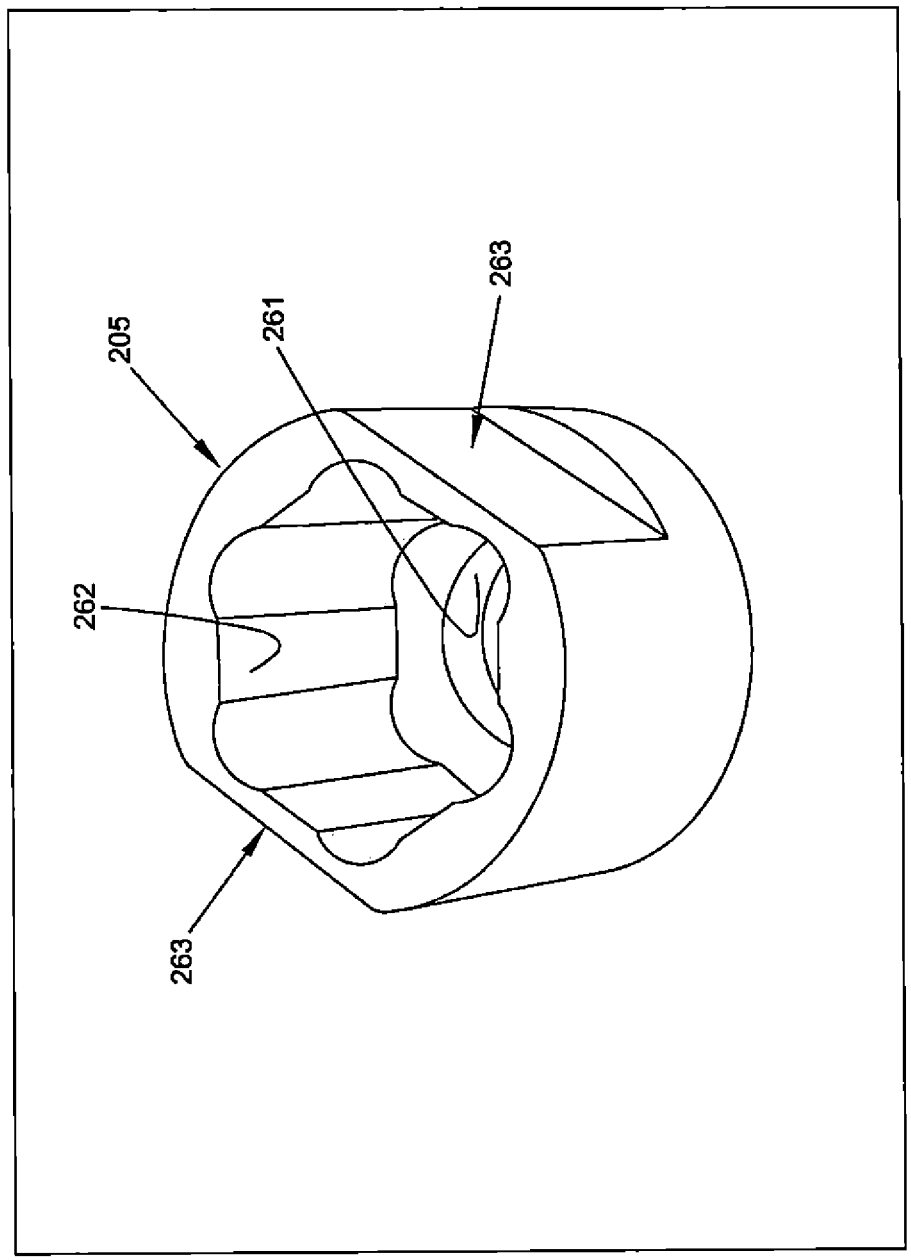
Figure 31:
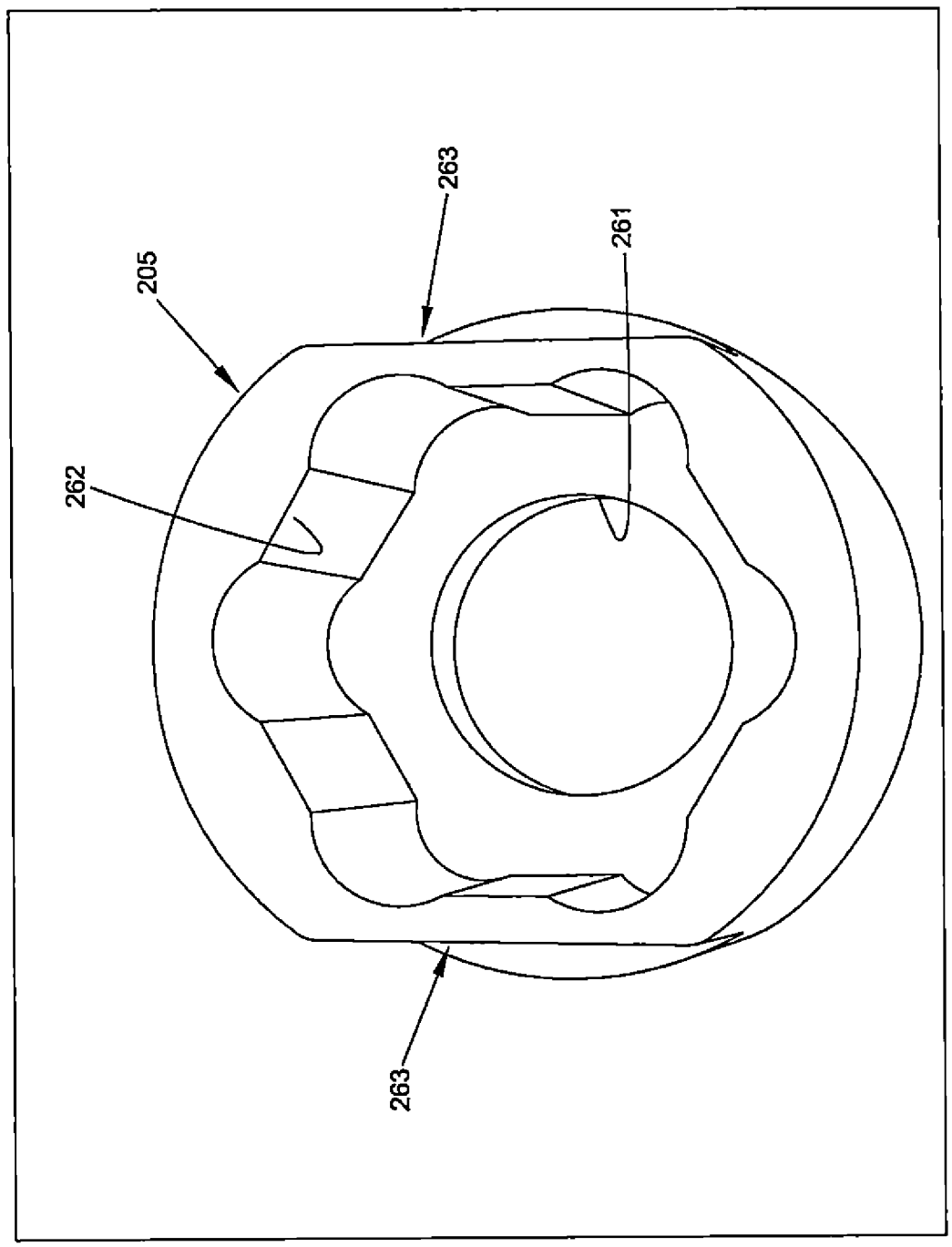
Figure 32:
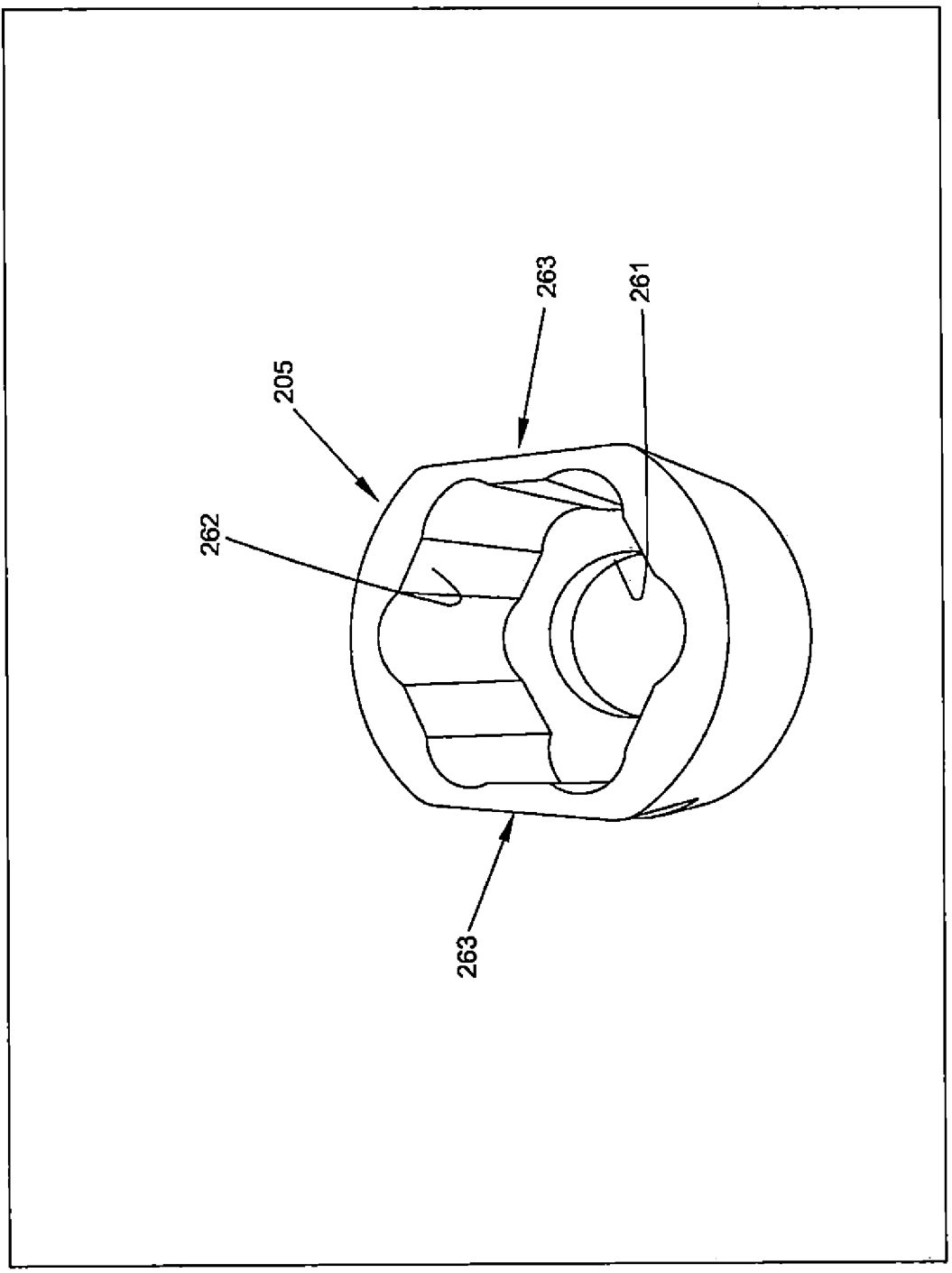
Figure 33:
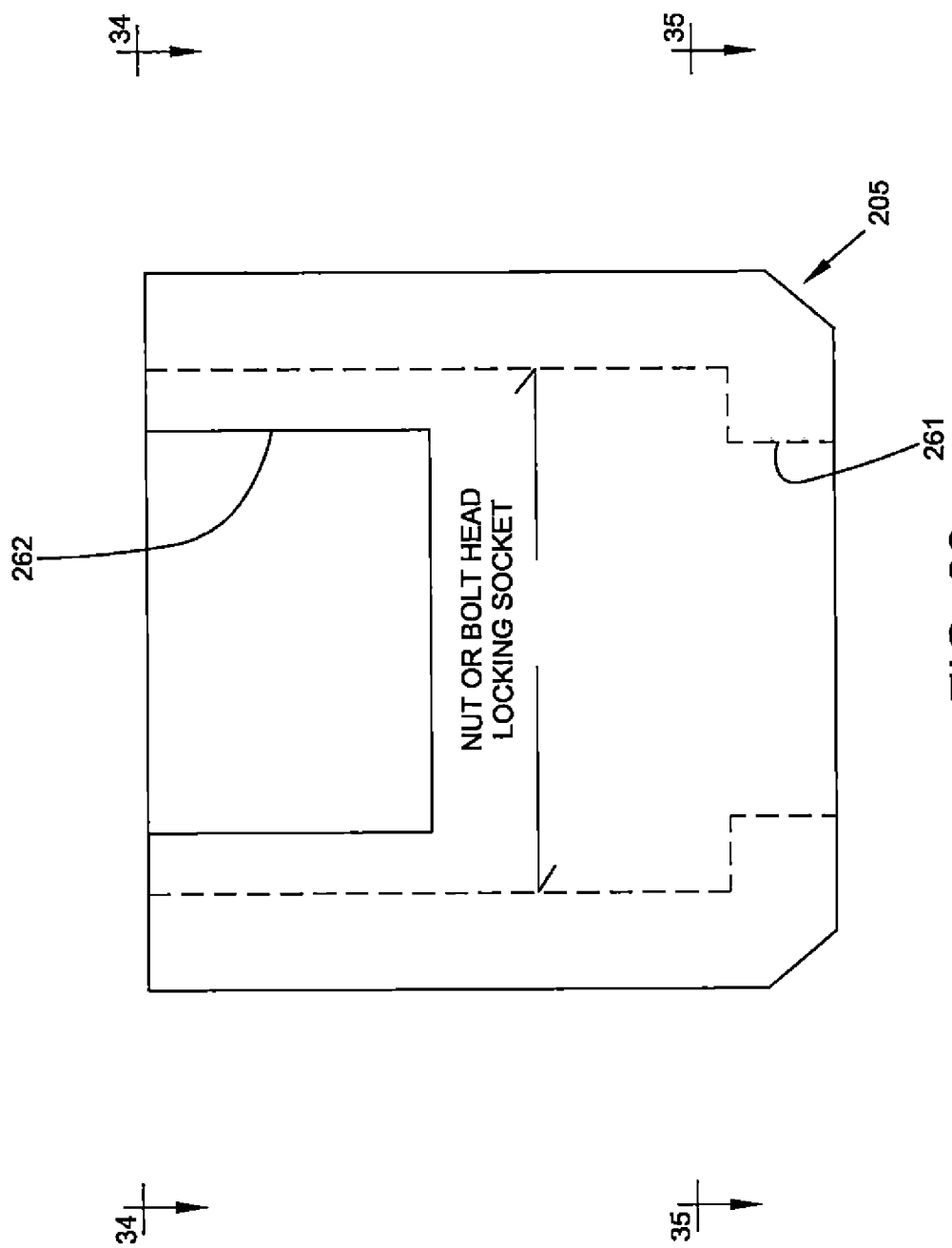
Figure 34:
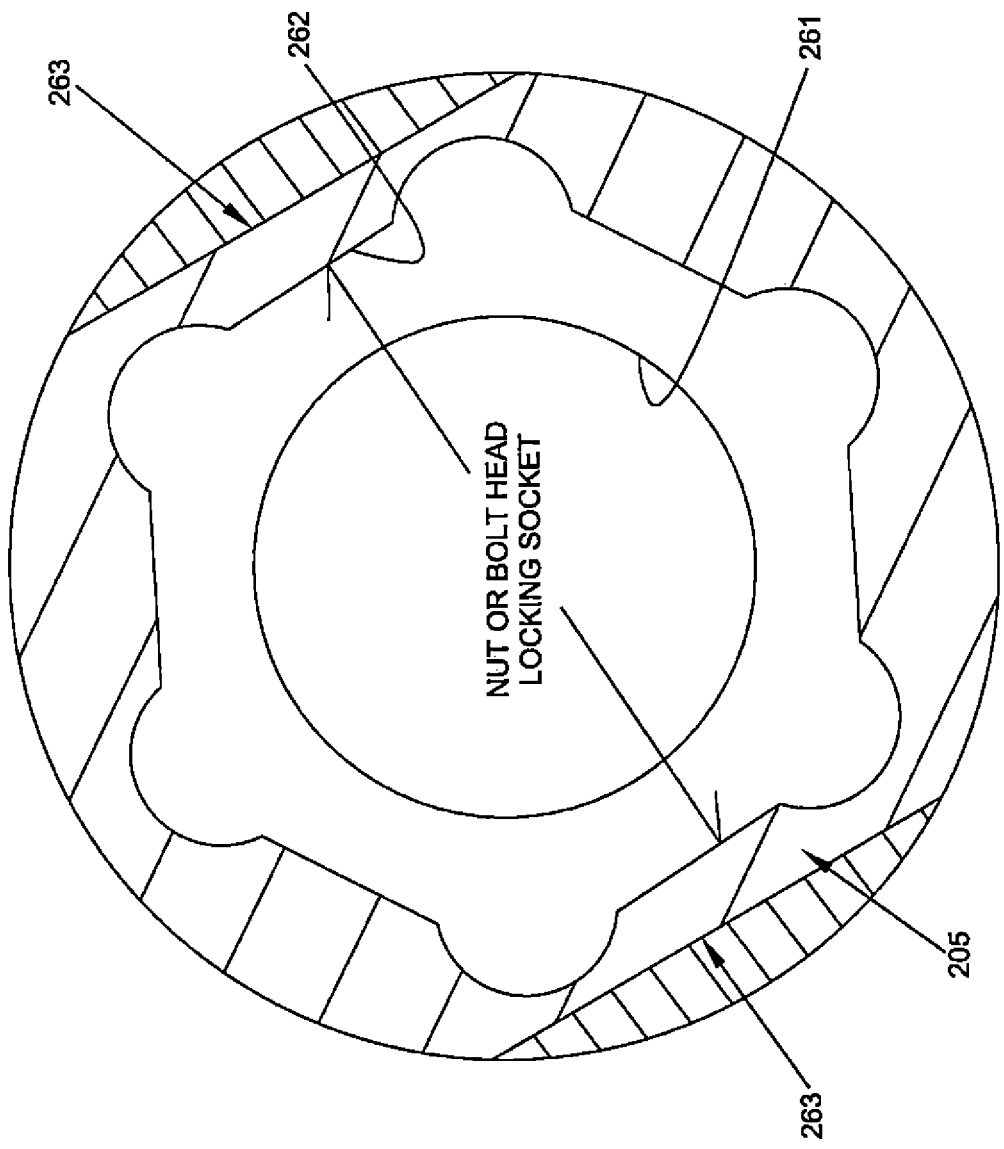
Figure 35:
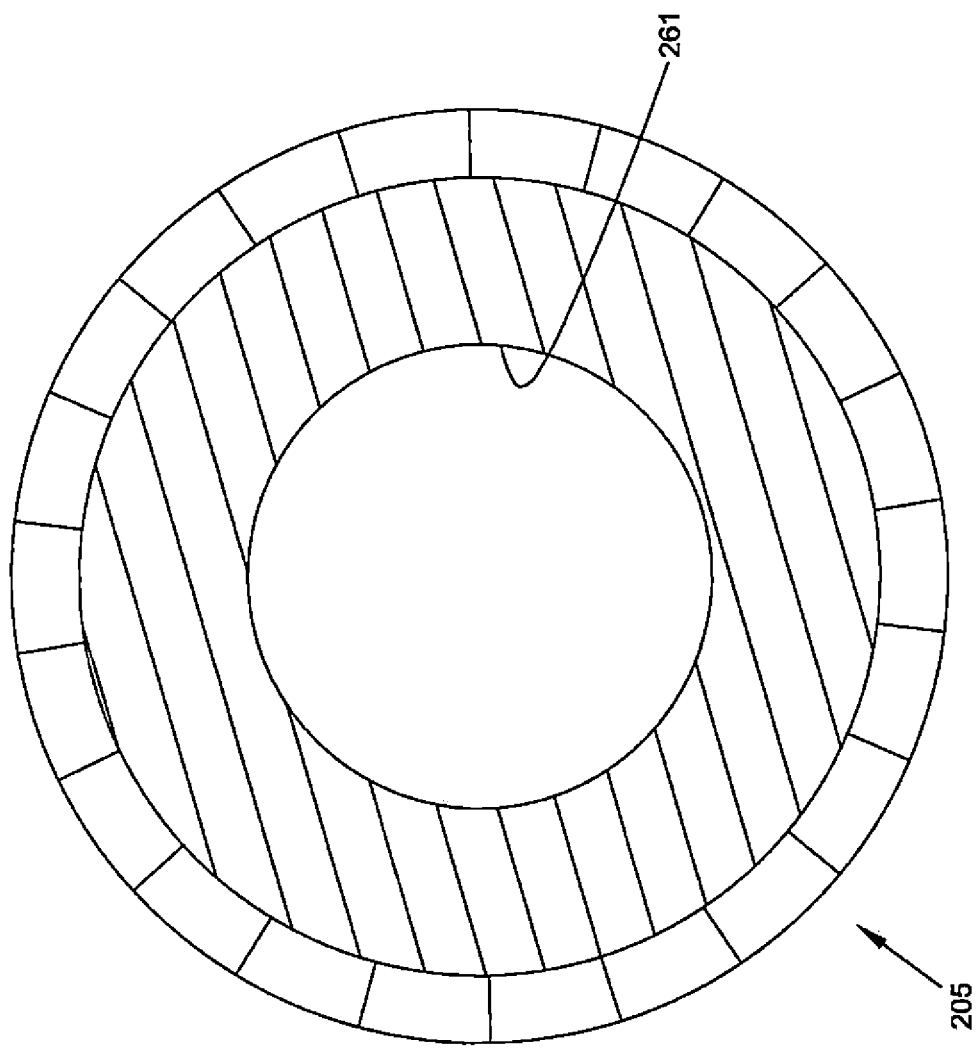
Figure 36:
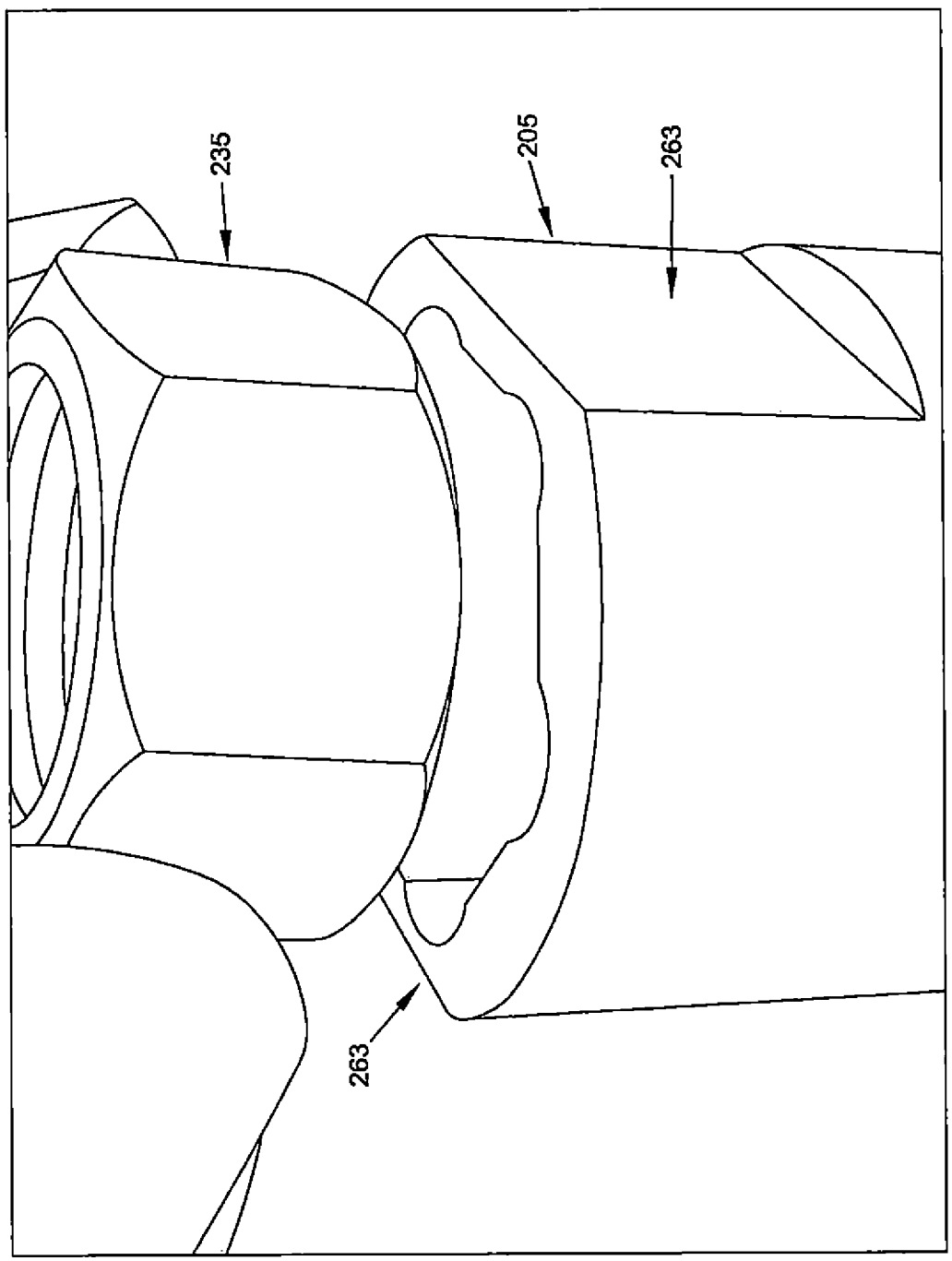
Figure 37:
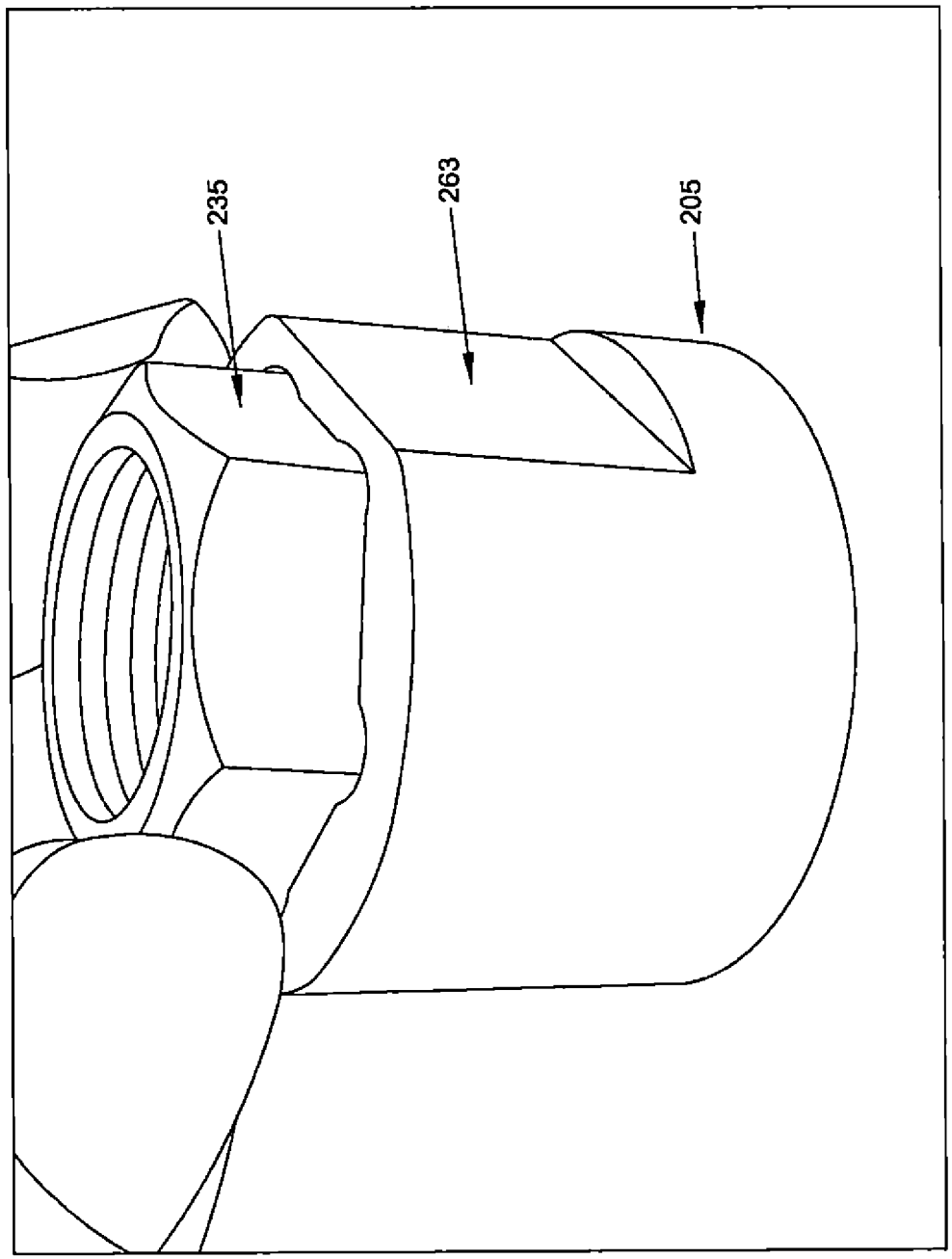
Figure 38:
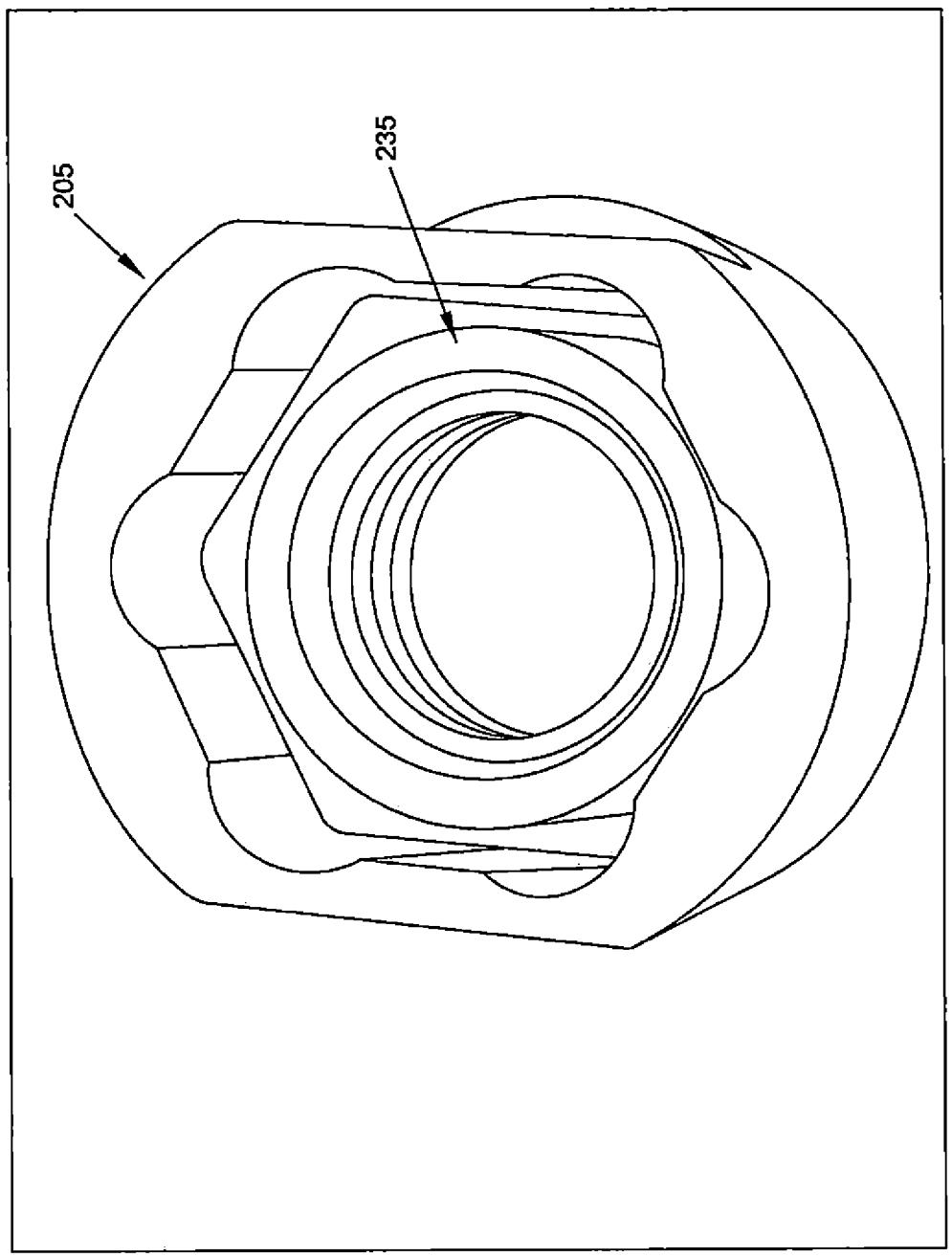

Axle hub adapter 205 may be of a length to allow for adjustment of hub adapter clamp 210 along axle hub adapter 205 so as to move scraper blade 220 inward or outward in relation to the opening disc surface (FIG. 28). Where the opening disc support arm 240 (FIG. 29) comprises an axle having a threaded stud 250, the threaded stud extends through the opening disc 10, through bearing 232, through hub 255 and through dust seal 260. Then, with nut 235 inserted into the top of axle hub adapter 205, the axle hub adapter 205/nut 235 are threaded onto the threaded stud 250, whereby to secure the assembly to the opening disc support arm 240. To this end, axle hub adapter 205 comprises an axle bore 261 for receiving threaded stud 250 and a multi-surfaced opening 262 for receiving nut 235. Flats 263 are provided on the exterior of axle hub adapter 205 for turning the axle hub adapter 205 and hence nut 235.

Alternatively, and looking now at FIGS. 39-42, where opening disc support arm 240 comprises a threaded hole 265, nut 235 is replaced by an axle bolt 235A comprising a threaded stud 235B and a head 235C. Axle bolt 235A is inserted from the distal end of the axle hub adapter 205 and down through the bore at the bottom of the axle hub adapter, through dust seal 260, through hub 255, through bearing 232, through opening disc 10 and into threaded hole 265 in opening disc support arm 240.

Preferably, shims 270 are disposed between opening disc 10 and opening disc support arm 240, so that axle hub adapter 205 tightens the inner race of bearing 232 to the frame/shims.

Opening discs 10 turning counterclockwise will tighten by turning axle hub adapter 205 counterclockwise, while opening discs 10 turning clockwise will tighten by turning the axle hub adapter 205 clockwise, thus the rotation of the opening disc will always have a self-tightening effect on the axle hub adapter 205, opening disc 10 and bearing 232.

The hub adapter clamp 210 (FIGS. 27, 28 and 43-47) is machined so as to achieve a close fit about the circumference of axle hub adapter 205, whereby to mount hub adapter clamp 210 to axle hub adapter 205 and hence to the axle of the opening disc (or, alternatively, the axle of a guide wheel). Significantly, hub adapter clamp 210 can be positioned at substantially any radial position on axle hub adapter 205, so that the universal scraper 200 can be disposed at substantially any radial position relative to opening disc 10.

Figure 43:
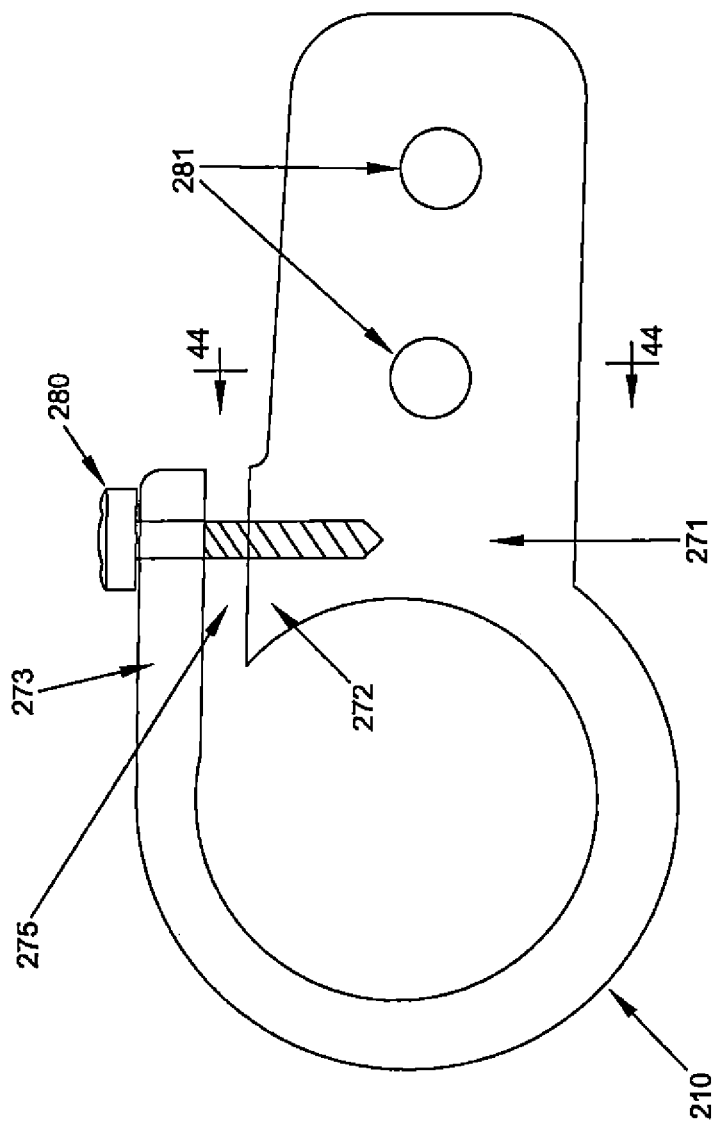
Figure 44:
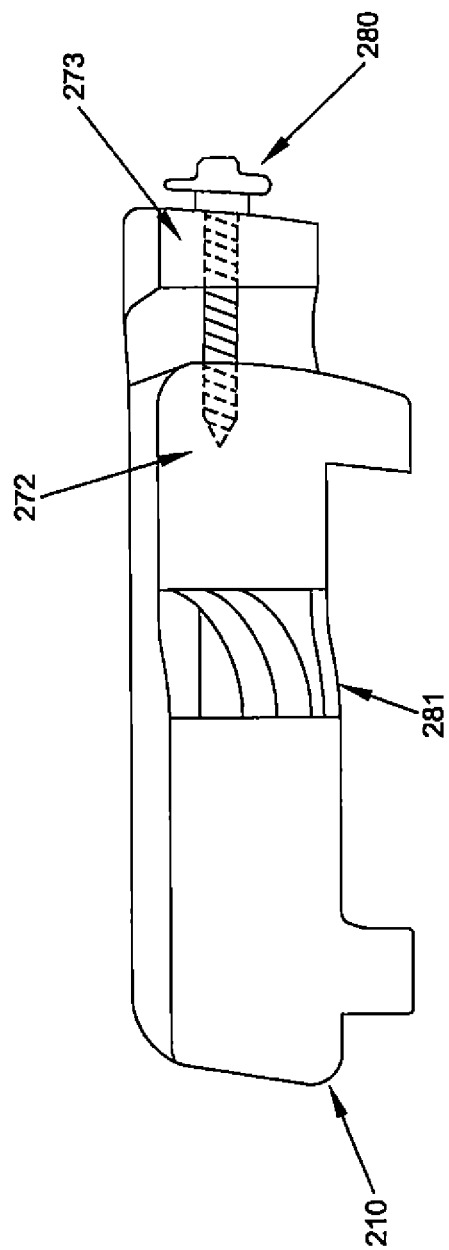
Figure 45:
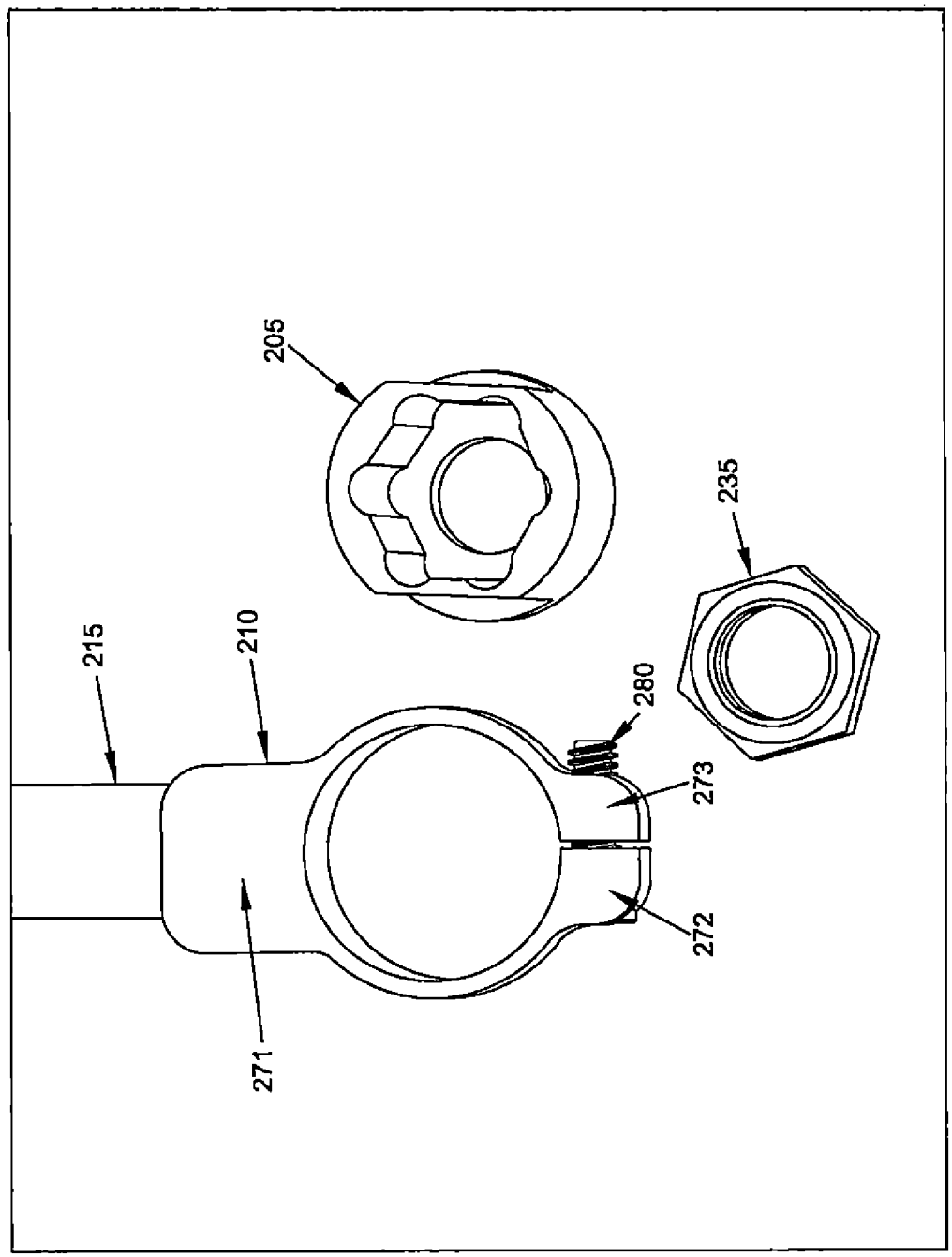
Figure 46:
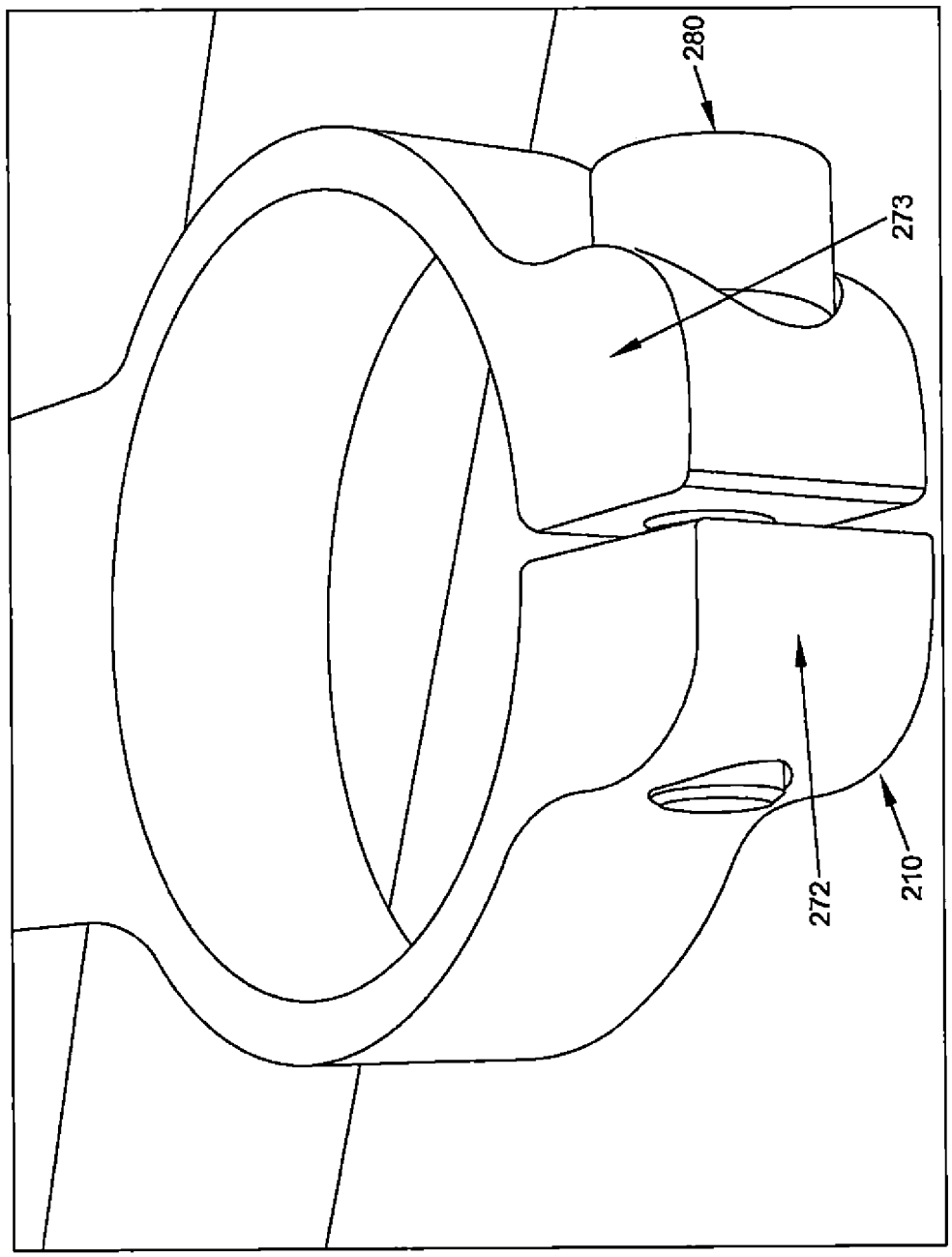
Figure 47:
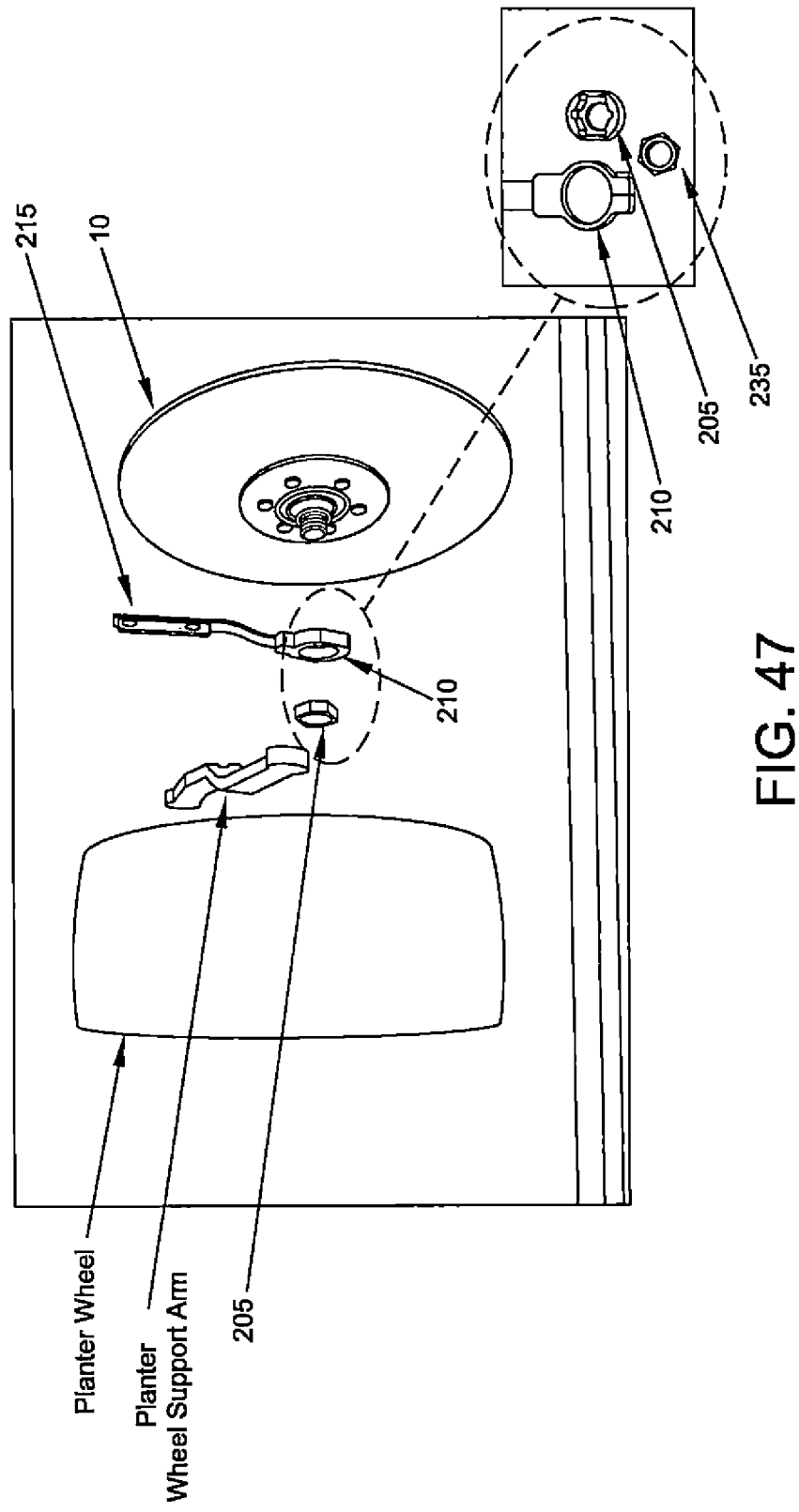
Figure 48:
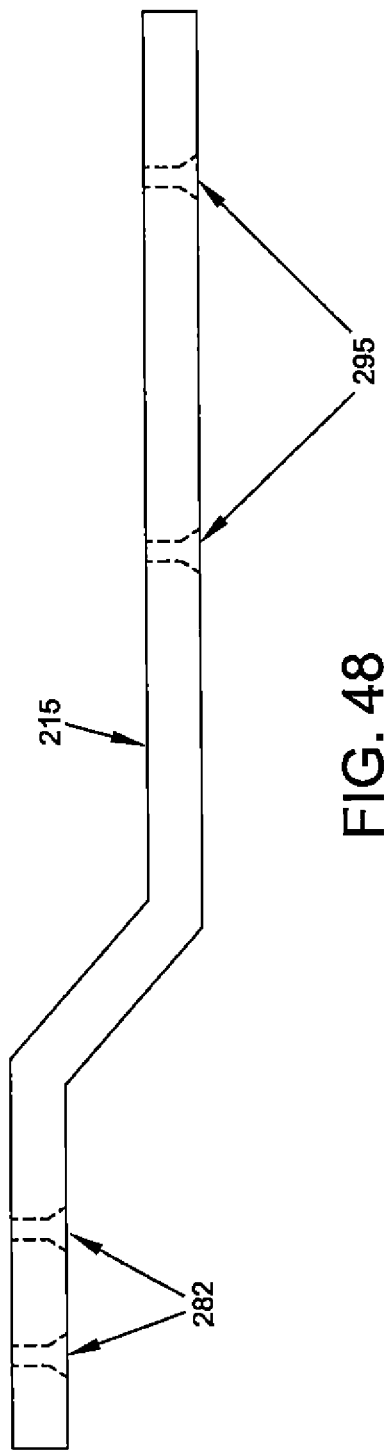
Figure 49:
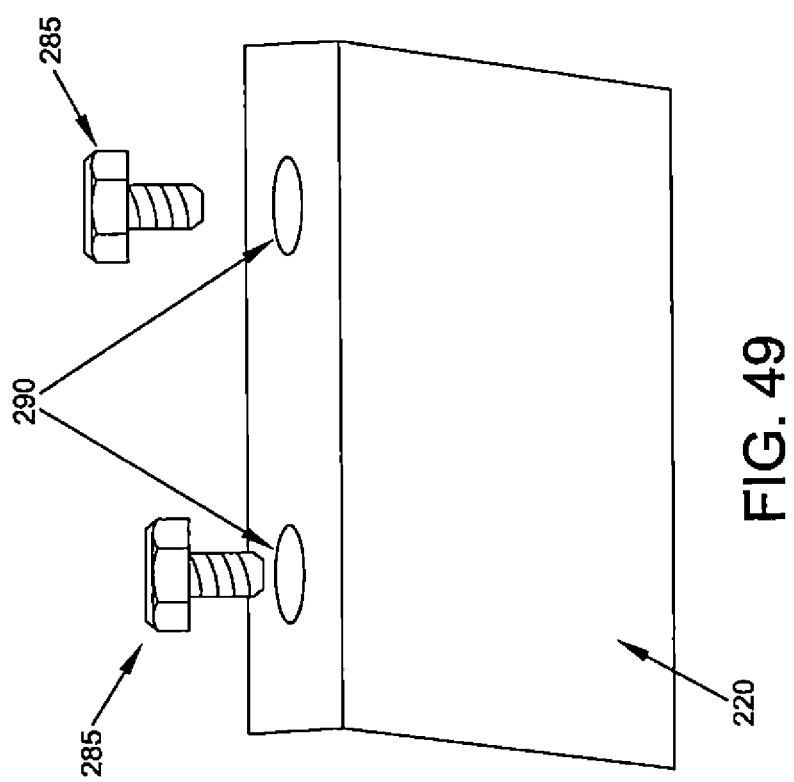
Figure 50:
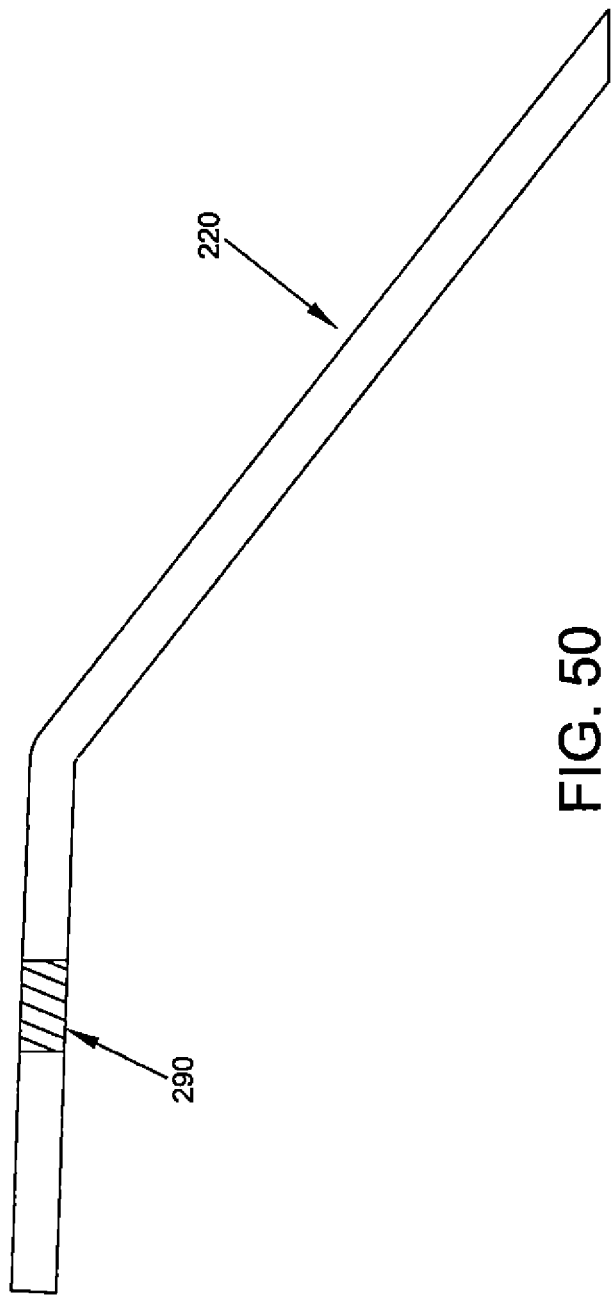
Figure 51:
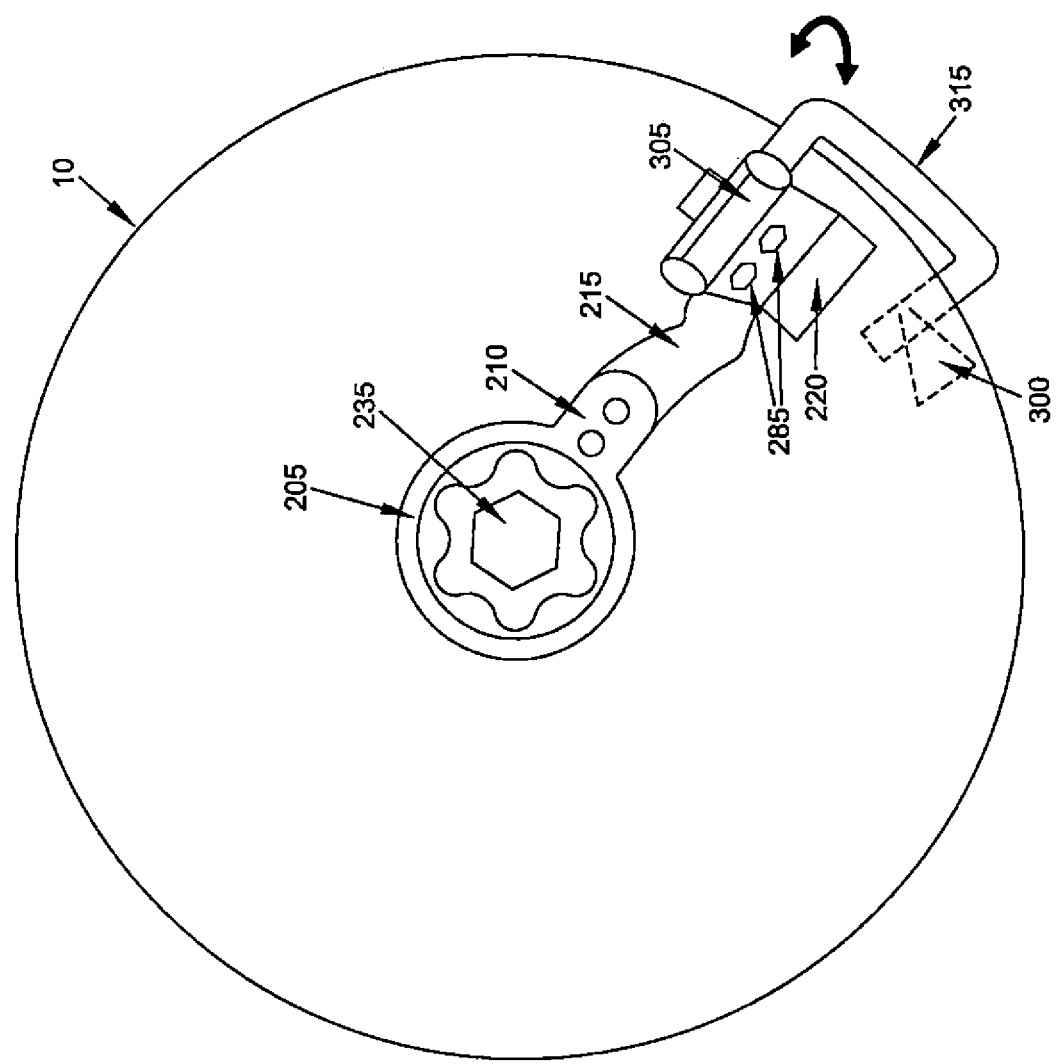
FIGS. 51-55 are schematic views showing the novel universal scraper with an associated rear surface scraper.
Figure 52:
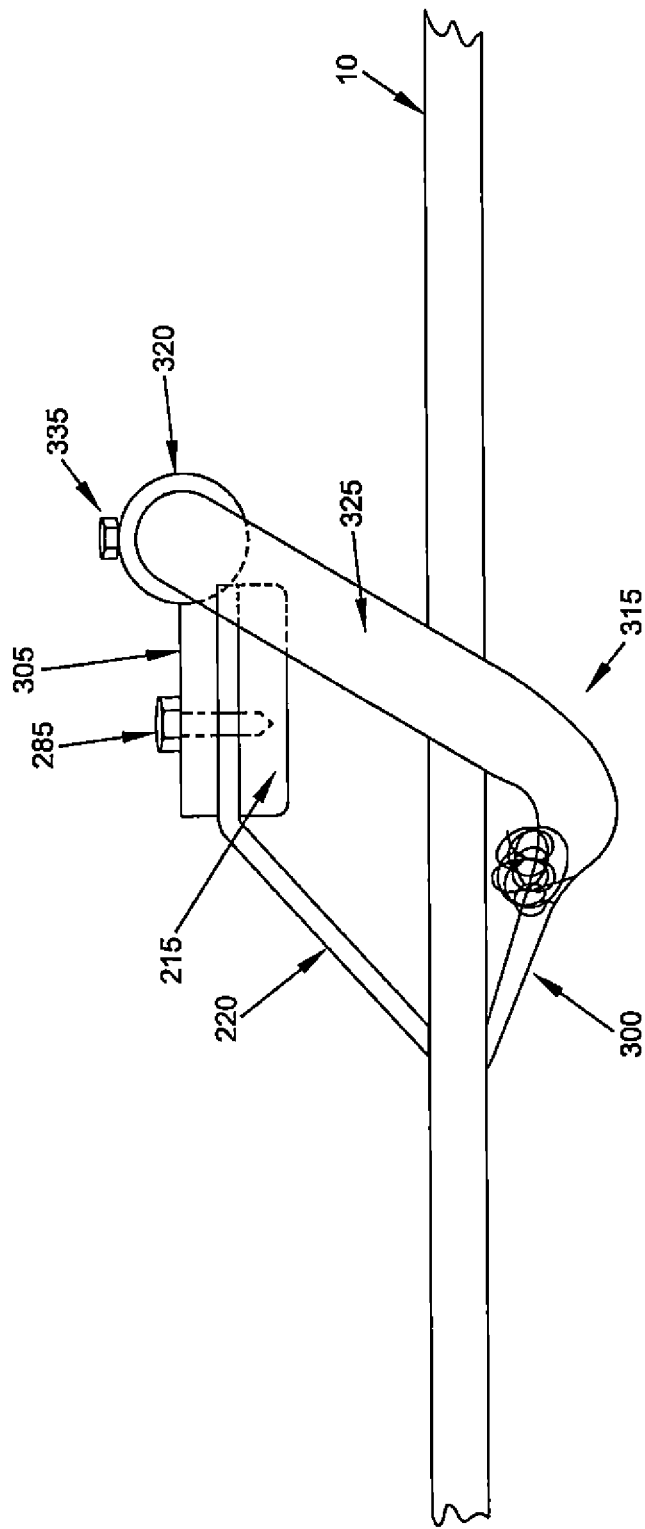
Figure 53:
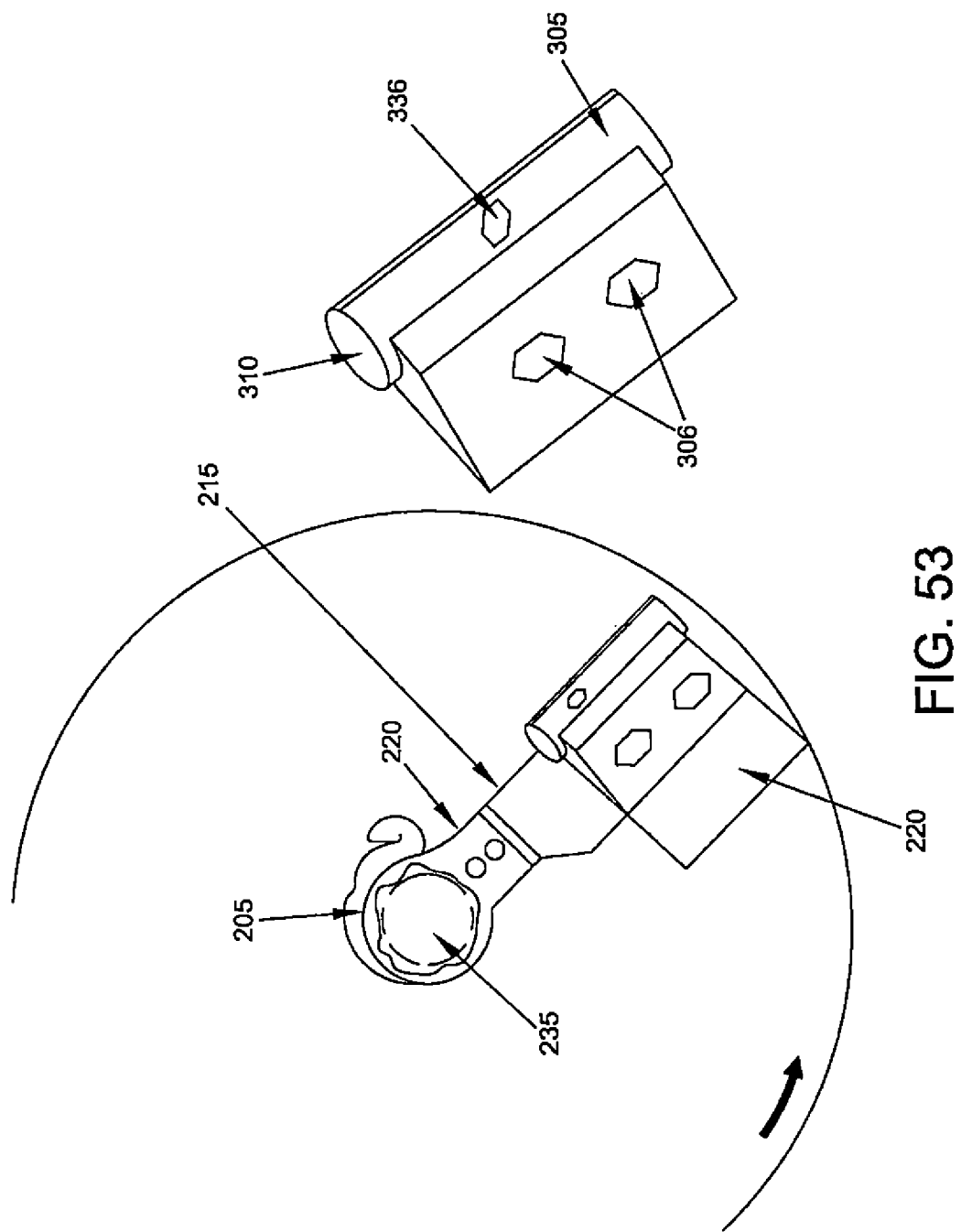
Figure 54:
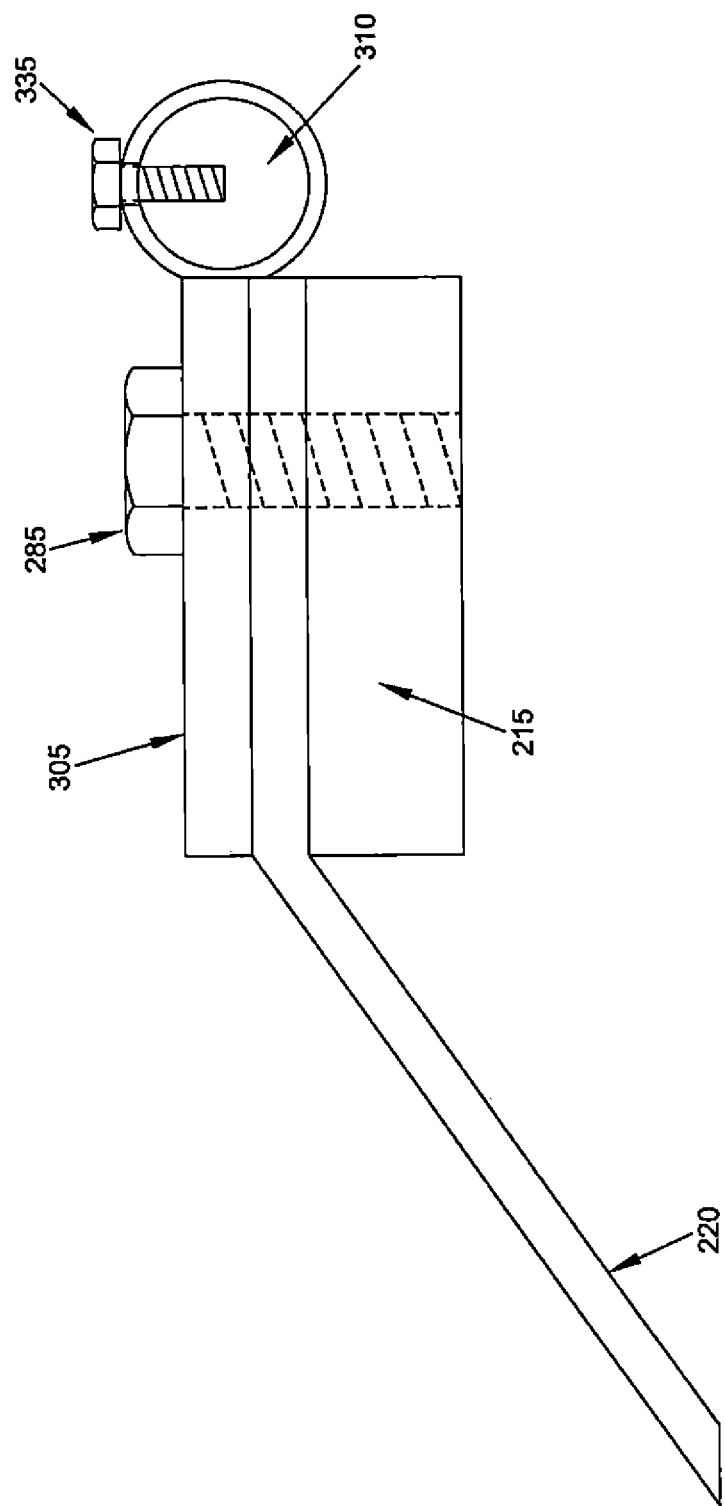
Figure 55:
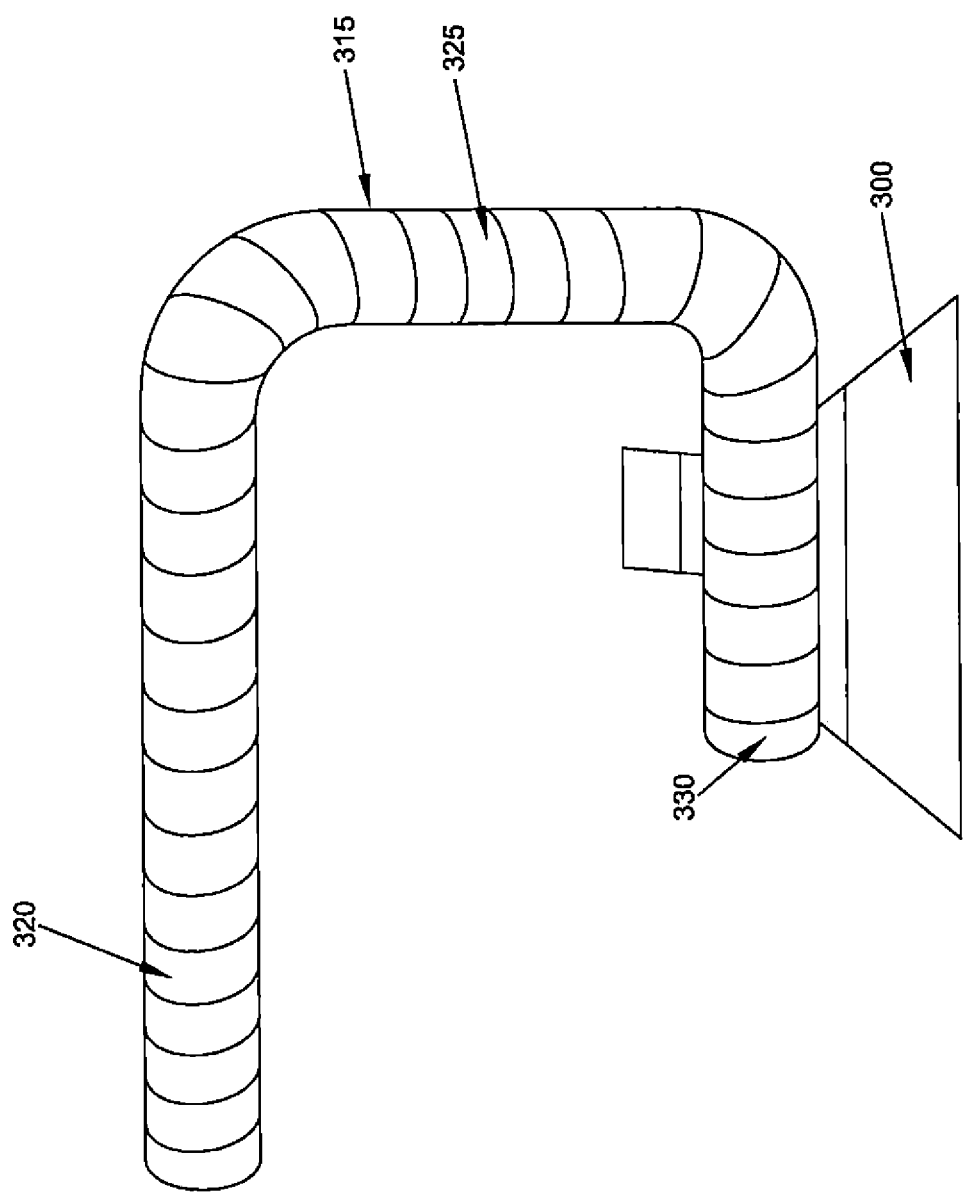

Hub adapter clamp 210 fastens to axle hub adapter using a clamping action. To this end, the proximal portion 271 of hub adapter clamp 210 is split so as to create a pair of segments 272, 273 separated by a narrow gap 275. A bolt 280 spans the narrow gap 275 and allows segments 272 to be drawn together, whereby to clamp hub adapter clamp 210 to axle hub adapter 205. In other words, bolt 280 may be used to tighten segments 272, 273 together in order to secure hub adapter clamp 210 in the desired position on axle hub adapter 205, i.e., at any point around the 360 degree circumference of the axle hub adapter. It will be appreciated that hub adapter clamp 210 may be formed in a variety of configurations. By way of example, one such configuration is shown in FIGS. 43 and 44; another such configuration is shown in FIGS. 45-47. Alternatively, other arrangements may be used to mount scraper arm 215 to axle hub adapter 205, however, hub adapter clamp 210 is preferred since it provides infinitely adjustable position settings. Hub adapter clamp 210 includes threaded holes 281.

Scraper arm 215 (FIGS. 27, 28 and 48) is secured to hub adapter clamp 210, e.g., via threaded holes 281 in hub adapter clamp 210 and threaded holes 282 in scraper arm 215. In one form of the invention, scraper arm 215 has a fixed length and is provided in a variety of sizes, so as to allow for use with larger or smaller diameter discs, etc. In another form of the invention, scraper arm 215 has an adjustable length so that a single scraper arm construction can be used with larger or smaller diameter discs.

Scraper blade 220 (FIGS. 27, 28, 49 and 50) is secured to scraper arm 215 with bolts 285 which pass through holes 290 in scraper blade 220 and are received in holes 295 in scraper arm 215. In one preferred form of the invention, holes 290 in scraper blade 220 may comprise elongated slots so as to allow the scraper blade to be moved inward, toward the hub, as the opening disc wears to smaller diameters. The scraper blade 220 may be made of spring steel with some flexibility so as to allow the scraper blade to flex against the surface of the rotating disc.

It will be appreciated that variations may be made to the foregoing constructions, such as providing a spring scraper arm with tensioning similar to the spring tensioning of windshield wiper arms, or providing a solid arm, or a spring steel arm, or a thin high carbon steel arm, as well as providing scraper blades with spring tensioning and/or different types of fasteners.

Figure 39:
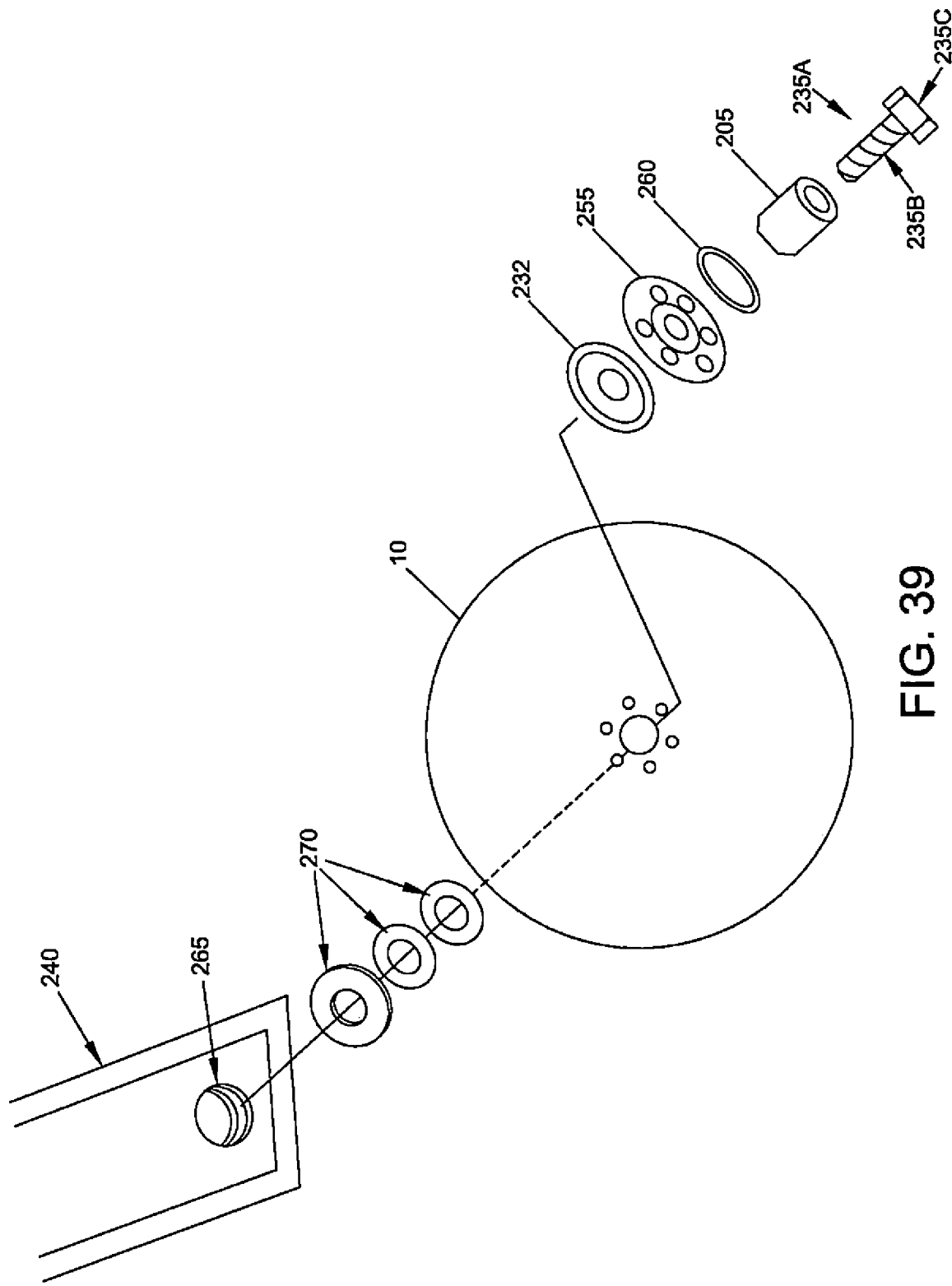
Figure 40:
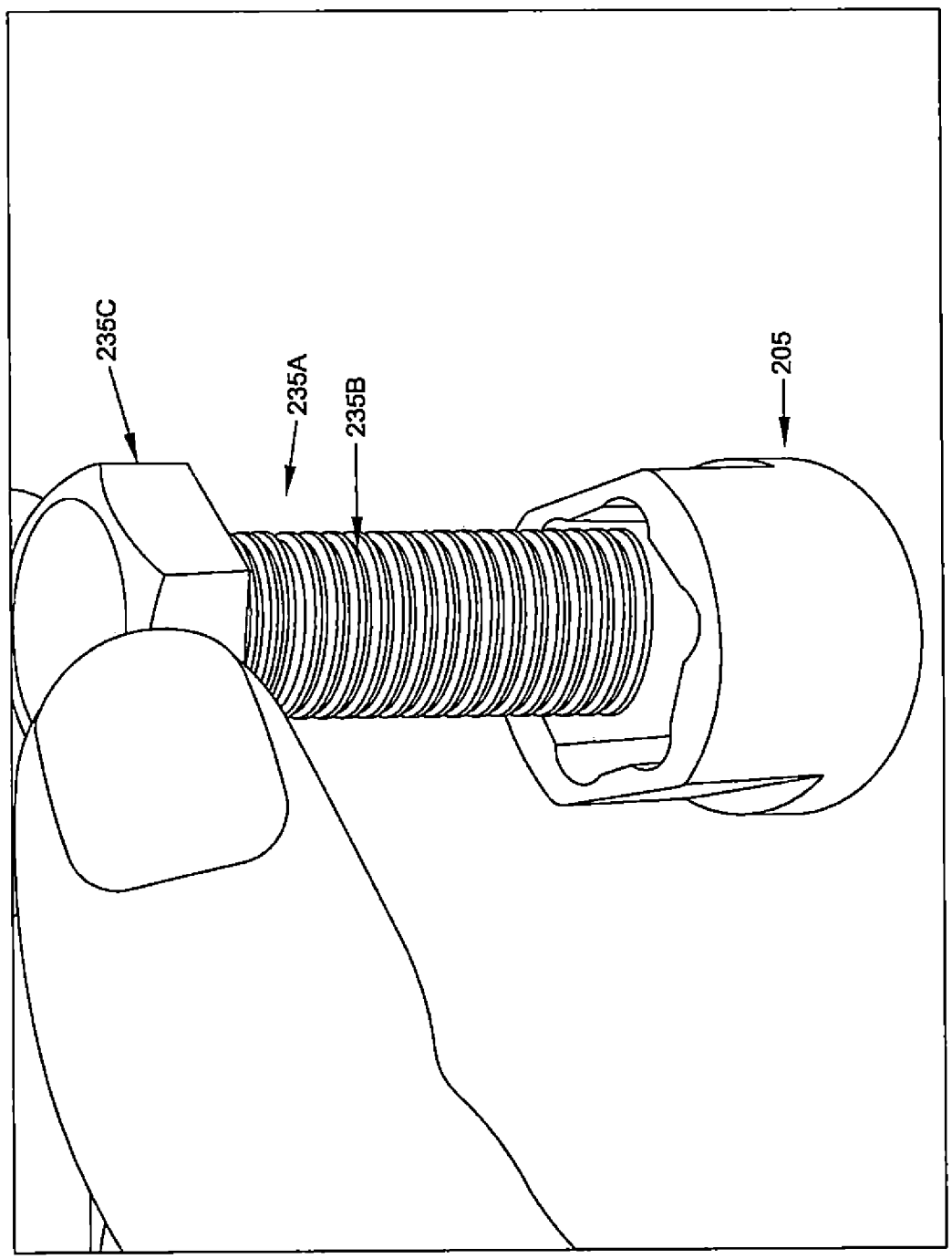
Figure 41:
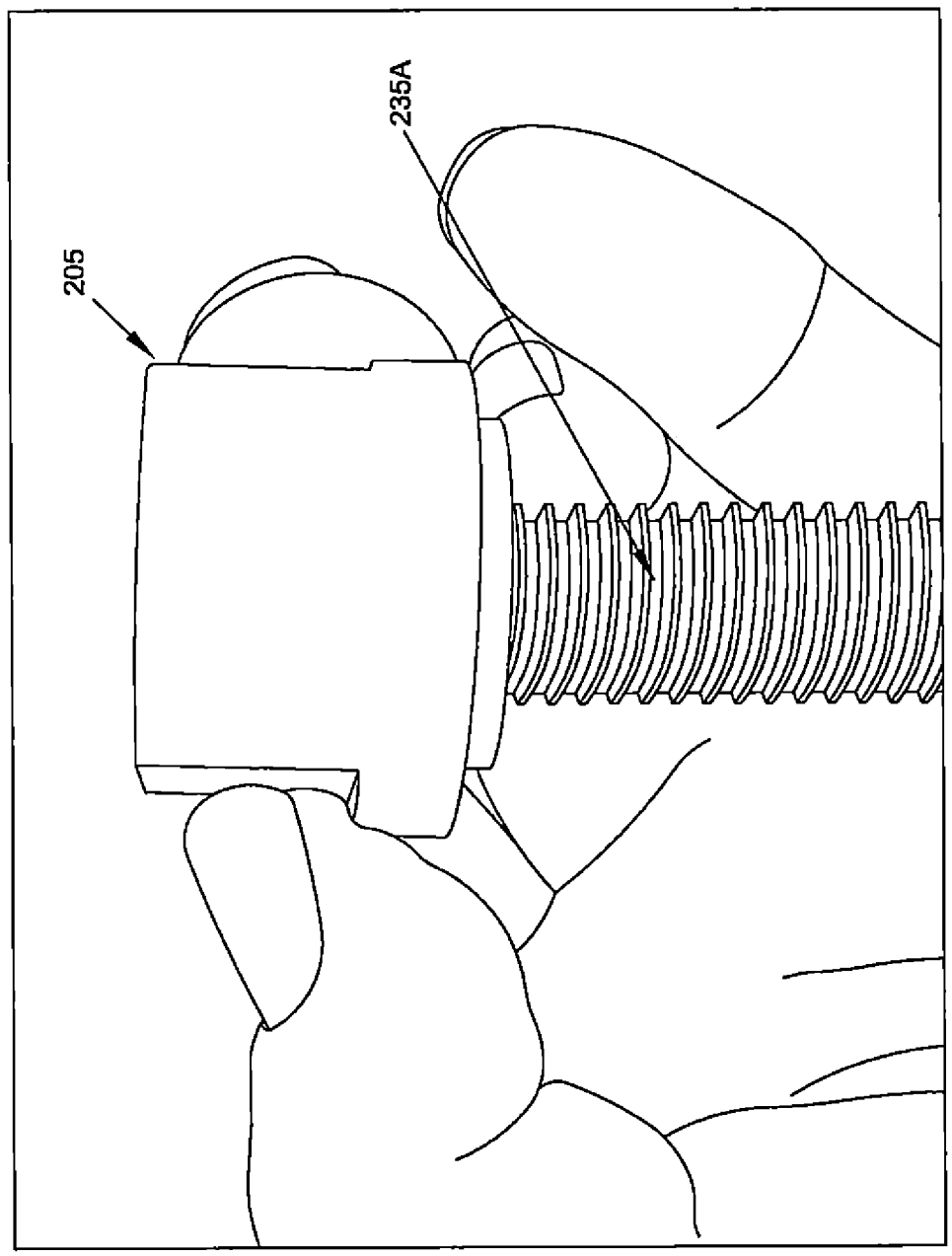
Figure 42:
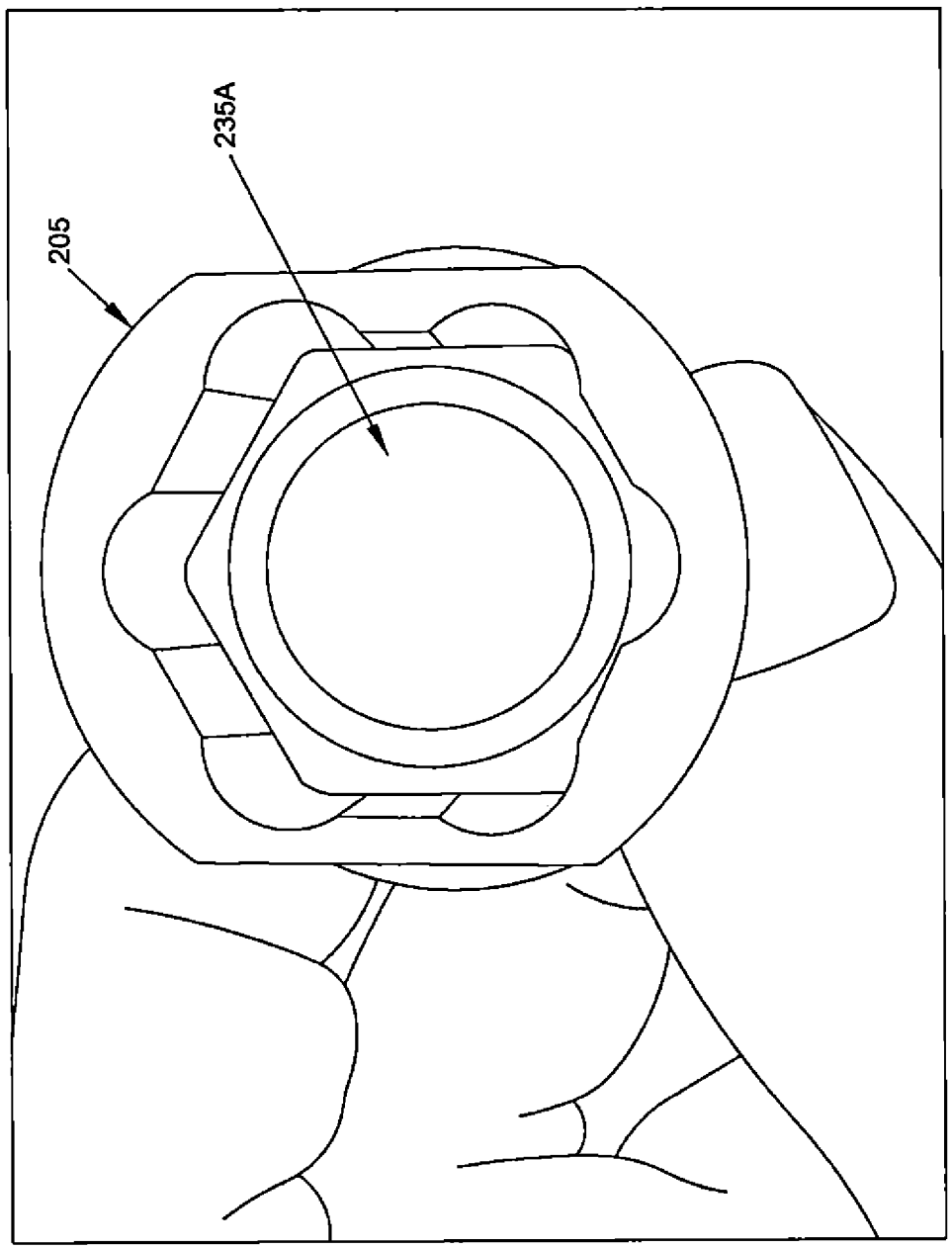

The axle hub adapter 205 used in the present invention allows the universal scraper to be installed on the axle of major brand planters, regardless of whether the planter uses an axle formed by a frame-mounted threaded stud (FIG. 29) or an axle formed by an axle bolt received by the frame (FIG. 39). This is a significant advantage in the art.

Another advantage over prior art constructions is the elimination of the need for left side scraper arms and right side scraper arms, inasmuch as the same universal scraper can be used for both left side applications and right side applications.

And another advantage over prior art constructions is the elimination of the need for left side scraper blades and right side scraper blades, inasmuch as identical scraper blades can be used with the universal scraper for both left side applications and right side applications.

In addition, the present invention has all interchangeable parts, regardless of whether scraping against a counterclockwise rotation or a clockwise rotation, and regardless of scraping against the left side or right side of an opening disc, etc.

And axle hub adapters using the principles of the present invention can be designed to fit axles with bearings such as tapered roller wheel bearings without departing from the spirit of this invention.

Currently, there also exist frame-mounted scrapers which scrape the back face of the opening disc surface, however, such back face frame-mounted scrapers suffer from many of the same disadvantages as the front face scrapers discussed above. Significantly, the present invention provides a scraper arm that can also serve as an attachment point for a second scraper arm that crosses over to the back side of the opening disc, where a second scraper scrapes the outer perimeter of the inboard (or back face) of the opening disc.

More particularly, and looking now at FIGS. 51-55, the distal end of scraper arm 215 can serve the dual purpose of (i) supporting front surface scraper blade 220, and (ii) supporting a rear surface scraper blade 300. In one preferred form of the invention, this is accomplished by attaching a bracket 305 to the free end of scraper arm 215. By way of example but not limitation, this may be done by passing screws 285 through holes 306 in bracket 305 and then through holes 290 in scraper blade 220 and then into holes 295 in scraper arm 215. Bracket 305 comprises a bore 310 which allows a second scraper arm 315 to be inserted into bore 310. Second scraper arm 315 is preferably in the form of a J or a U, with a first segment 320, a second segment 325 and a third segment 330. First segment 320 is intended to be inserted into bore 310 of bracket 305, second segment 325 is intended to span the thickness of opening disc 10, and third segment 330 is intended to support rear surface scraper blade 300. The tension of the rear surface scraper blade 300 can be adjusted by rotating first segment 320 within bore 310 so as to move third segment 330 closer to the opening disc surface. Second scraper arm 315 may be locked into the desired position by a set screw 335 which passes through a hole 336 or other locking mechanism. The rear surface scraper blade 300 may be placed at a radial surface position fore or aft of the front scraper position. The radial distance between the front and rear scraper blade contact points is dependent upon the arm length of the disc cross-over section of the scraper, i.e., second portion 325, as well as the sizings of other components, e.g., rear surface scraper blade 300.

A two-edged scraper blade 300 would allow the scraper blade to be used to scrape the back surface of either the left or right opening disc.

One advantage gained from using the new scraper system on equipment comprising double disc furrow openers is that of being able to position the left side disc to be scraped at a different radial location than the scraper of the right side disc. On one side of the row unit, a scraper blade could be easily positioned so as to scrape further forward of the opening disc center line, while the opposite opening disc could be set farther back on the trailing edge behind the opening disc center line. This configuration would prevent the sum of all scrapings from falling to the same trailing edge of both left and right opposing gauge wheel rim perimeters. As a result, this reduces the total quantity of scraped materials having to clear the exit point at any given time, thereby reducing the possibility of clogging.

Another advantage of the new scraper system is that it is able to release more of the scraped material forward of the opening disc hub, thereby allowing the material to use momentum to keep soil particles dispersed rather than falling rearward where they tend to tumble together, forming ever larger masses.

In addition, on single disc opener seed planters, fertilizer furrow placement arrangements and "no till" ground opening discs, it is often difficult to find a suitable place on the frame for mounting scrapers, thus mounting to the disc hub presents a significantly better option.

The universal scraper of the present invention gains considerable additional advantage when used with a gauge wheel with openings in the side wall of the wheel which allow soil to pass through, inasmuch as the scraper can be placed in a position to best use scraped material momentum to be directed by the scraper blade out through the revolving openings, thereby ensuring the best combination for double disc opener planters as well as single disc planters and drills, fertilizer disc opener coulters and "no till" ground opening discs.

Hub-Mounted Scraper Assembly with
Resiliently-Mounted Scraper Blade

Figure 57:
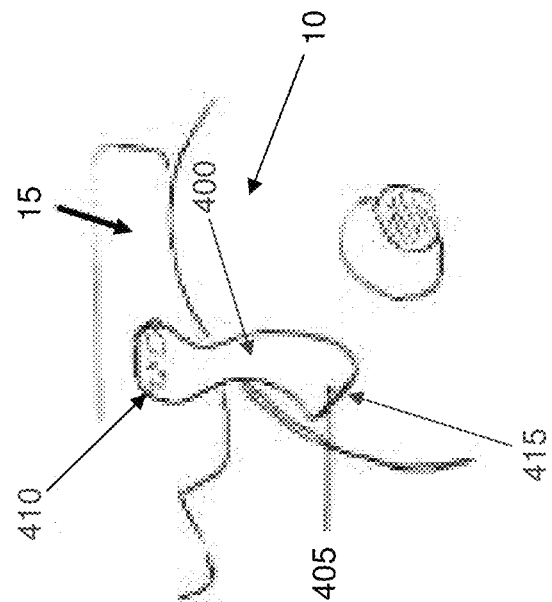
FIGS. 56 and 57 are schematic views showing frame-mounted scraper arms for scraping the surface of an opening disc.
Figure 56:
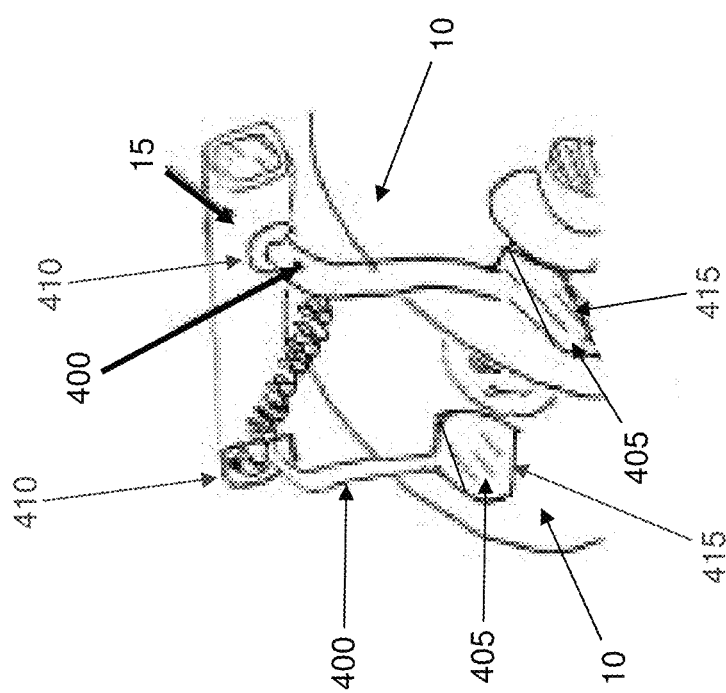
Figure 58:
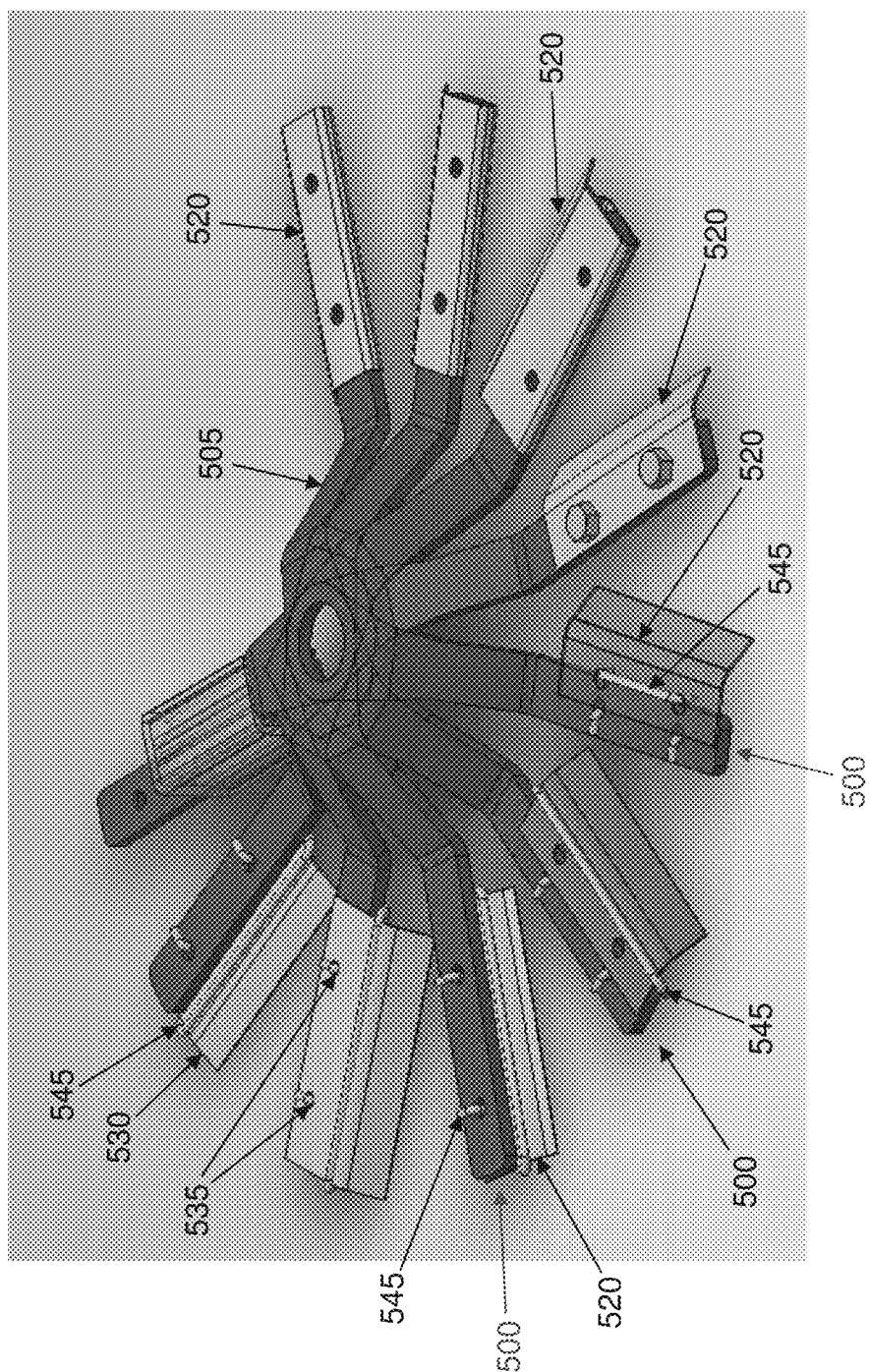
FIG. 58 is a schematic view showing various configurations of hub-mounted scraper arms and scraper blades formed in accordance with the present invention.

Looking now at FIGS. 56 and 57, ground opening disc scrapers traditionally comprise a frame-mounted scraper arm 400 having a ground opening disc scraper blade (or edge) 405 which is either mounted to the distal end of frame-mounted scraper arm 400 (FIG. 56) or formed integral with the distal end of frame-mounted scraper arm 400 (FIG. 57). Ground opening disc scrapers are typically attached to the frame (e.g., planter frame 15) of the structure (e.g., the frame of a farm implement) carrying the ground opening disc in a position and manner determined by the manufacturer. See FIGS. 56 and 57 which show a frame-mounted scraper arm 400 attached to a planter frame 15.

Where frame-mounted scraper arm 400 is mounted to a planter frame 15 (e.g., as shown in FIGS. 56 and 57), a relatively long frame-mounted scraper arm 400 must be provided in order for the frame-mounted scraper arm 400 to span the distance between the planter frame 15 and the surface of the ground opening disc which is to be scraped by scraper blade (or edge) 405. Frame-mounted scraper arm 400 must be configured such that tension holds scraper blade (or edge) 405 in contact with the surface of the ground opening disc (e.g., opening disc 10) which is to be scraped. The force required to hold scraper blade (or edge) 405 in contact with the ground opening disc is typically provided by spring tensioning (see FIG. 56) or by the use of a resilient tensioning arm (see FIG. 57). It should be appreciated that frame-mounted scraper arm 400 generally comprises a relatively long "lever arm", with the length of the lever arm approximately equaling the distance between (i) the point of attachment 410 of frame-mounted scraper arm 400 to planter frame 15, and (ii) the point 415 where scraper blade (or edge) 405 contacts opening disc 10. As the length of the lever arm increases (i.e., as the distance between point 410 and point 415 increases), a larger amount of tensioning force is required to ensure that scraper blade (or edge) 405 contacts the surface of opening disc 10 with sufficient force (i.e., pressure) to allow the scraper blade (or edge) 405 to remove dirt, mud and debris from the surface of the opening disc. Significantly, the longer that the frame-mounted scraper arm 400 is, the greater the tendency of the scraper blade (or edge) 405 to be forced away from the surface of opening disc 10 due to the tendency of dirt, mud and debris to "work" their way beneath scraper blade (or edge) 405, especially in damper, stickier soil conditions. Over time, this increasing build-up of dirt, mud and debris under scraper blade (or edge) 405 can force the scraper blade away from the surface of opening disc 10, thereby undermining the ability of the scraper blade (or edge) 405 to remove dirt, mud and debris from the opening disc. When scraper blade (or edge) 405 is pushed away from the surface of opening disc 10, the amount of soil and debris under the scraper blade (i.e., between the scraper blade and the opening disc surface) builds up quickly, and may even begin to accumulate under the distal end of frame-mounted scraper arm 400 (as well as under scraper blade (or edge) 405). Such build-up of soil and debris can prevent proper rotation of opening disc 10, or may even prevent rotation of the opening disc altogether. To prevent this from occurring, a new approach is needed to ensure that the scraper blade is held against opening disc 10 in a manner which prevents soil and debris from building up beneath the scraper blade, and which allows the scraper blade to clear soil and debris from the opening disc while maintaining proper tension at the end of a long "lever arm", e.g., the lever arm established between the point 410 where scraper arm 400 is mounted to frame 15 and the point 415 where scraper blade (or edge) 405 contacts opening disc 10.

Accordingly, an object of the present invention is to provide an opening disc scraper that is a significant improvement over prior art frame-mounted scrapers, including prior art scrapers utilizing long lever arm configurations and including prior art scrapers comprising components which can catch or entrap soil, mud and debris after the soil, mud and debris have been scraped from the opening disc.

In one form of the invention, the present invention addresses the aforementioned problems associated with frame-mounted scraper arms through the provision and use of a novel scraper assembly comprising a hub-mounted scraper arm having a scraper blade resiliently mounted to the distal end of the scraper arm.

More particularly, in one preferred form of the invention, and looking now at FIGS. 58-62, there is provided a novel scraper assembly 500. Scraper assembly 500 generally comprises a scraper arm 505 having a proximal end 510 configured for mounting to the hub 511 of an opening disc 10 and a distal end 515 having a scraper blade 520 resiliently (i.e., yieldably) mounted thereto, as will hereinafter be discussed in greater detail. In one preferred form of the invention, scraper arm 505 has a stepped profile, with a transition zone 521 disposed between proximal end 510 and distal end 515. If desired, scraper arm 505 may be rigid or flexible. In one preferred form of the invention, scraper arm 505 is substantially rigid, particularly with respect to twisting along its longitudinal axis (i.e., scraper arm 505 preferably does not twist along its longitudinal axis).

Figure 61:
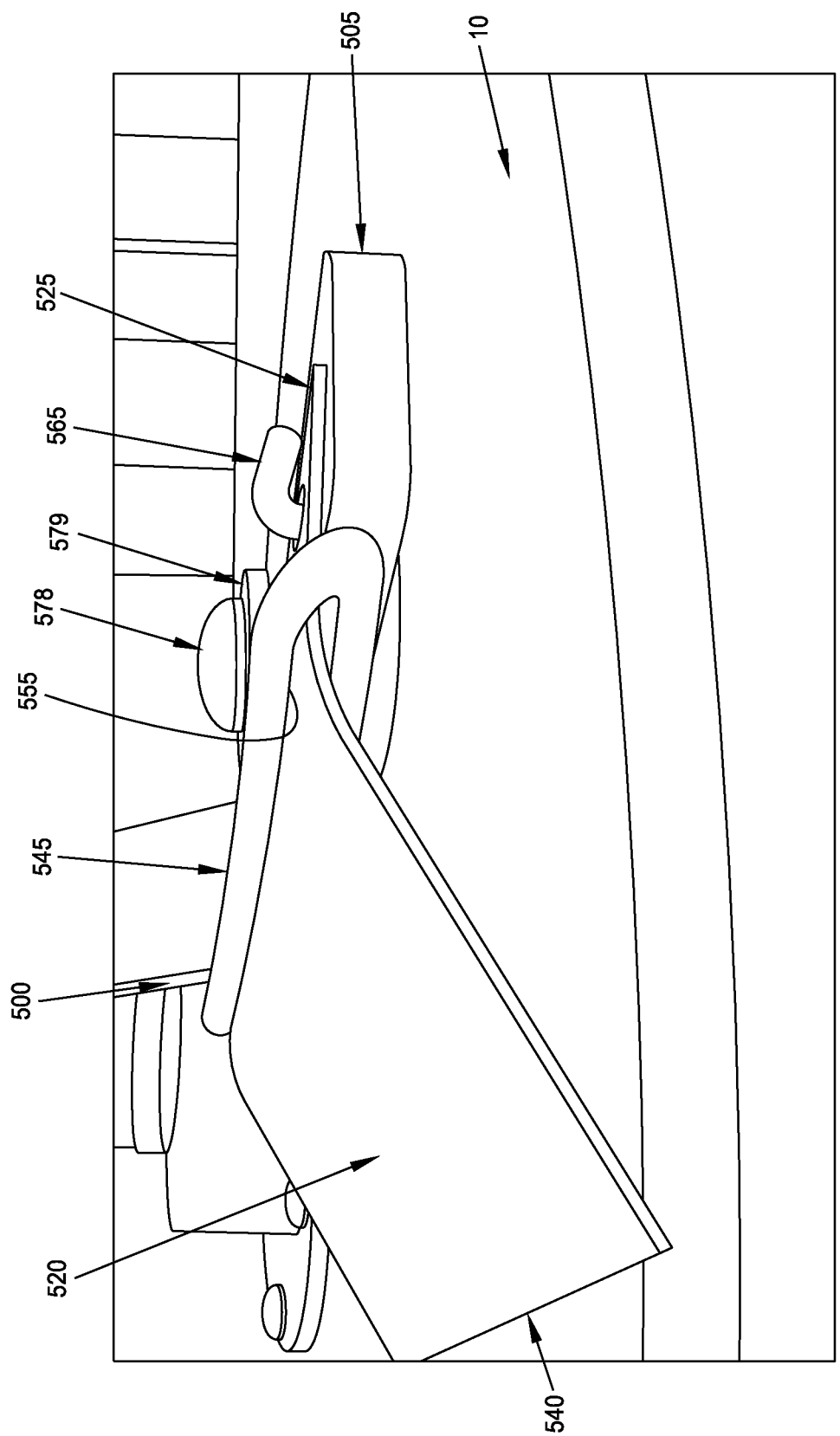

Scraper blade 520 generally comprises a substantially flat proximal portion 525 and a distal portion 530 which is bent away from the plane of proximal portion 525 (see FIG. 61). If desired, proximal portion 525 may comprise one or more through-holes 535 for facilitating mounting of scraper blade 520 to scraper arm 505, as will hereinafter be discussed. Distal portion 530 of scraper blade 520 comprises an edge 540 for scraping soil, mud and debris from the surface of an opening disc 10, as will hereinafter be discussed in greater detail. If desired, scraper blade 520 may be rigid or flexible. In one preferred form of the invention, scraper blade 520 is relatively stiff and resists bending, so that resilient tensioning clip 545 provides substantially all of the flexion ho the yieldable mount of scraper blade 520 to scraper arm 505 (i.e., all of the flexion of edge 540 relative to scraper arm 505). And in one preferred form of the invention, scraper blade 520 is sufficiently stiff that it resists twisting in the dimension parallel to the longitudinal axis of scraper arm 505 (i.e., scraper blade 520 resists twisting along the radius of opening disc 10), so that resilient tensioning clip 545 provides substantially all of the twisting (relative to the longitudinal axis of scraper arm 505—"radial pivoting") in the yieldable mount of scraper blade 520 to scraper arm 505.

In one preferred form of the present invention, scraper blade 520 is mounted to distal end 515 of scraper arm 505 by means of a resilient tensioning clip 545. More particularly, resilient tensioning clip 545 (FIG. 62) generally comprises an elongated flexible body 550 which is bent so as to define an elongated opening 555. Elongated body 550 terminates in a pair of ends 560, 565 which are spaced apart from one another and sized to be received in a pair of counterpart holes 570, 575 (FIG. 59) formed in the distal end 515 of scraper arm 505, as will hereinafter be discussed. More particularly, to mount scraper blade 520 to scraper arm 505, proximal portion 525 of scraper blade 520 is inserted into elongated opening 555 of resilient tensioning clip 545 until proximal portion 530 of scraper blade 520 engages the ends 560, 565 of resilient tensioning clip 545. While maintaining proximal portion 525 of scraper blade 520 within elongated opening 555 of resilient tensioning clip 545, ends 560, 565 of resilient tensioning clip 545 are inserted into counterpart holes 570, 575 formed in scraper arm 505, such that proximal portion 525 of scraper blade 520 is yieldably mounted to scraper arm 505. When scraper blade 520 is yieldably mounted to scraper arm 505 in this manner (i.e., by means of resilient tensioning clip 545), sufficient force is exerted on distal portion 530 of scraper blade 520 to hold edge 540 of scraper blade 520 in contact with the desired scraping surface (e.g., the surface of opening disc 10) under adequate tension.

As noted above, scraper arm 505 may be rigid or flexible, scraper blade 520 may be rigid or flexible, and tensioning clip 545 is resilient. When both scraper arm 505 and scraper blade 520 are rigid, the flexing of scraper blade 520 away from the face of opening disc 10 is accommodated entirely by resilient tensioning clip 545. Where scraper arm 505 and/or scraper blade 520 is/are flexible, the flexing of scraper blade 520 away from the face of opening disc 10 is accommodated by resilient tensioning clip 545 and by one or both of scraper arm 505 and scraper blade 520. In a preferred form of the invention, scraper arm 505 is rigid, scraper blade 520 is modestly flexible, and the majority of the flexing of scraper blade 520 away from the face of opening disc 10 is accommodated by resilient tensioning clip 545.

Significantly, mounting scraper blade 520 to scraper arm 505 by means of resilient tensioning clip 545 allows scraper blade 520 to "flex" or "give" (i.e., by resilient deformation of tensioning clip 545) when edge 540 of scraper blade 520 encounters an obstruction (e.g., debris), thereby reducing the likelihood of scraper blade breakage and prolonging useful life of the scraper blade and the scraper arm. It should also be appreciated that resilient tensioning clip 545 facilitates simple mounting and removal of scraper blade 520 to/from scraper arm 505, without the need for additional hardware or specialized tools.

Figure 59:
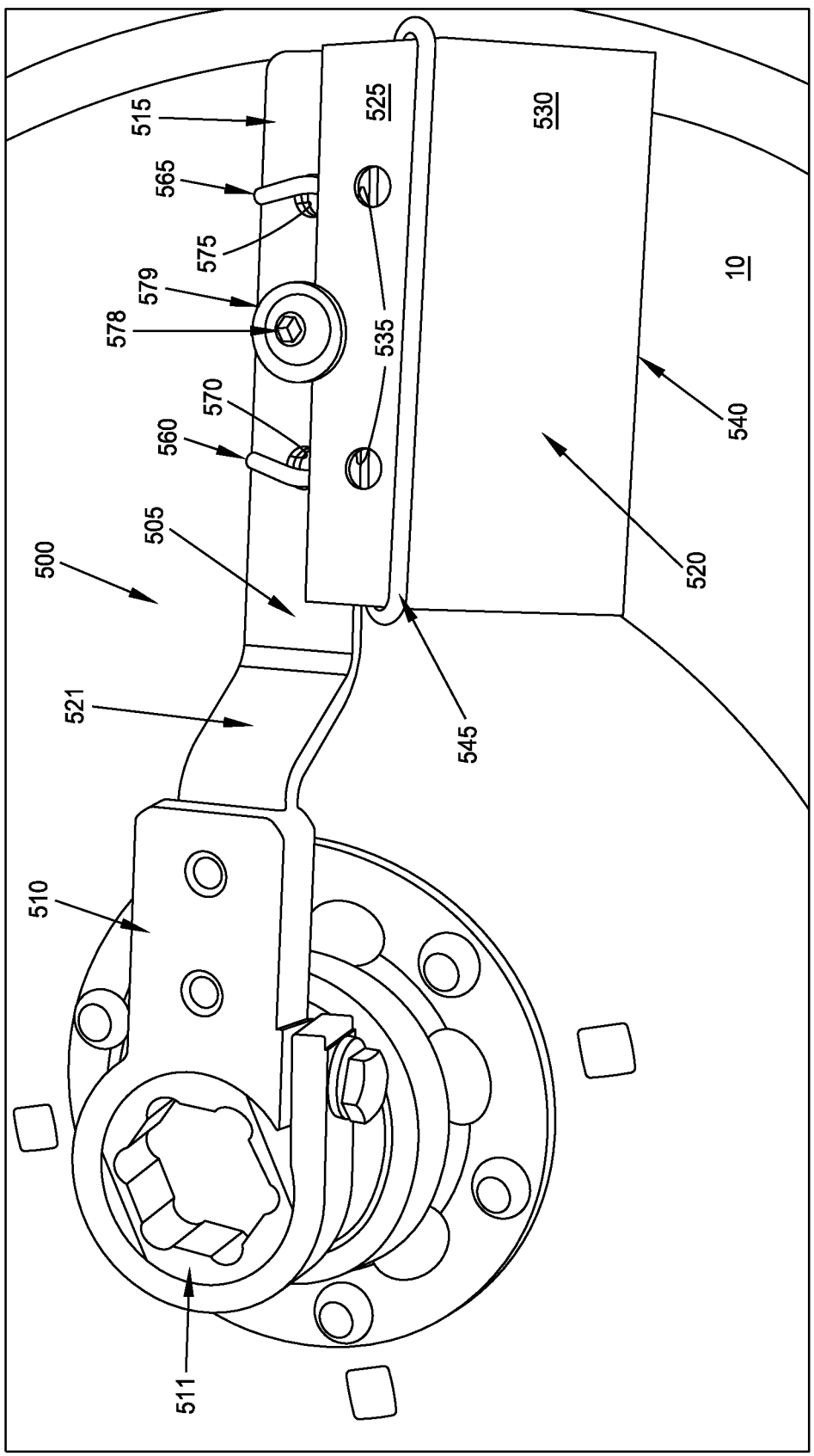
Figure 62A:
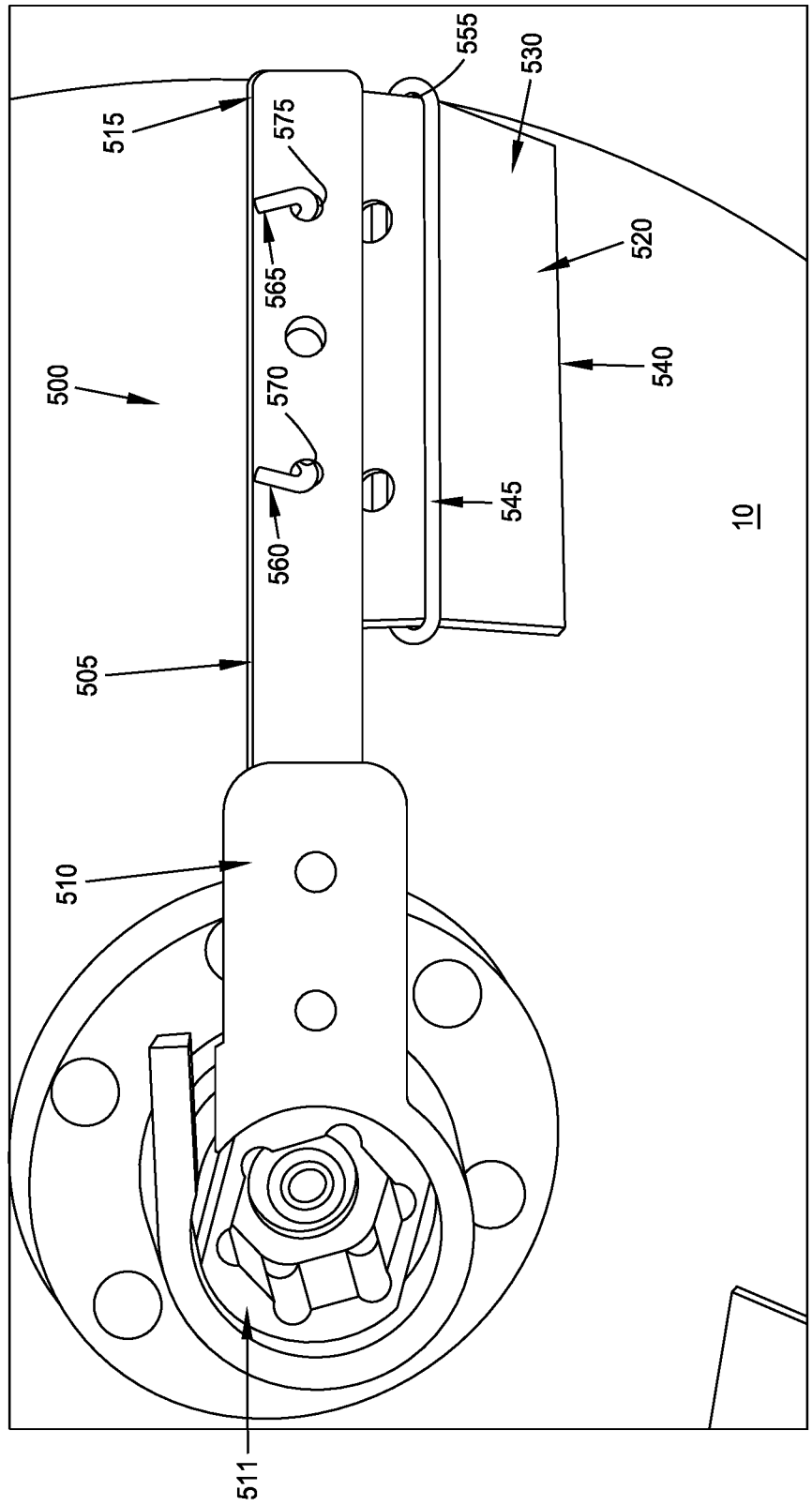
FIGS. 62A and 62B are schematic views showing an alternative configuration for mounting a scraper blade to a scraper arm by means of the novel resilient tensioning clip of FIG. 62.
Figure 62B:
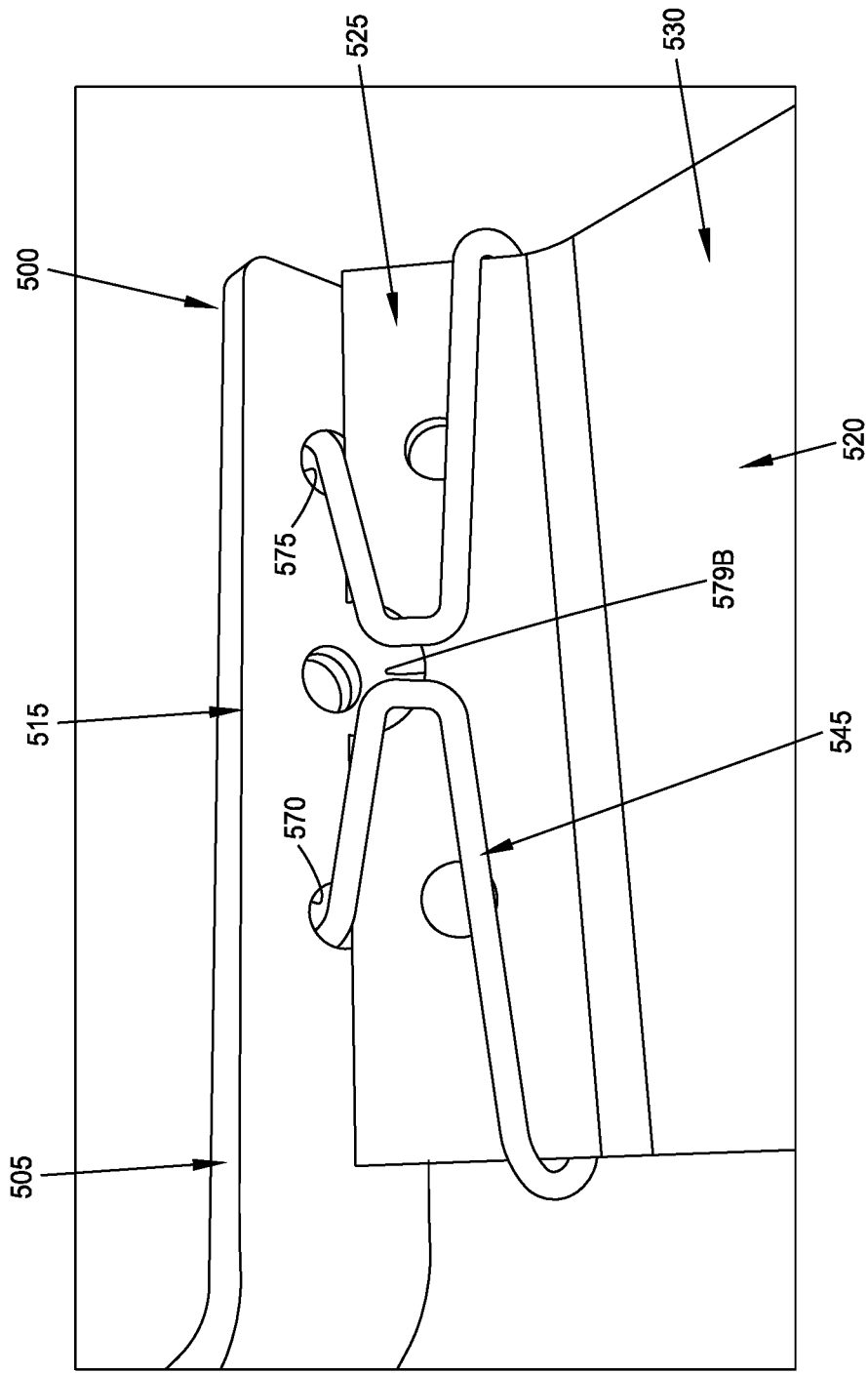

See also FIGS. 62A and 62B, which shows that proximal portion 525 of scraper blade 520 can be mounted to the inside surface of scraper arm 505, rather than to the outside surface of scraper blade 505 (as shown in FIG. 59).

Figure 59A:
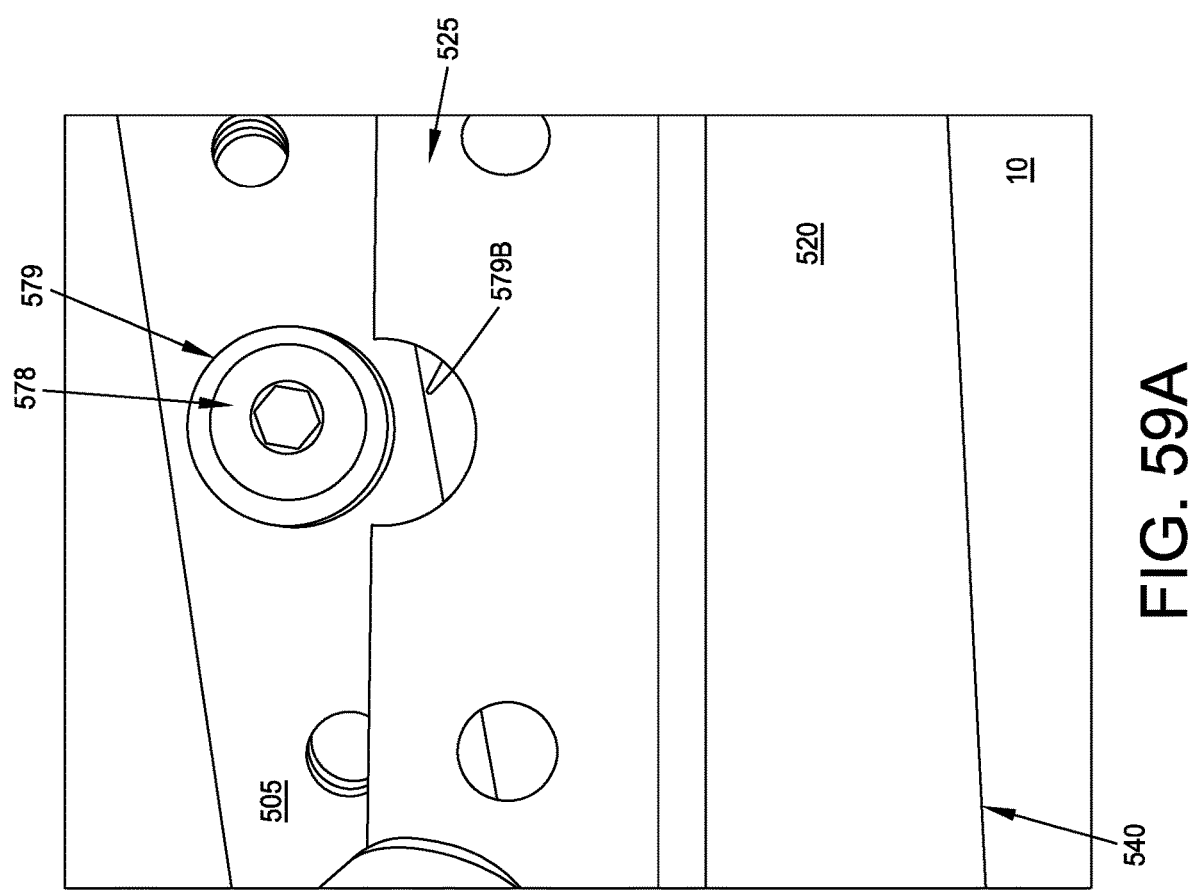
Figure 60:
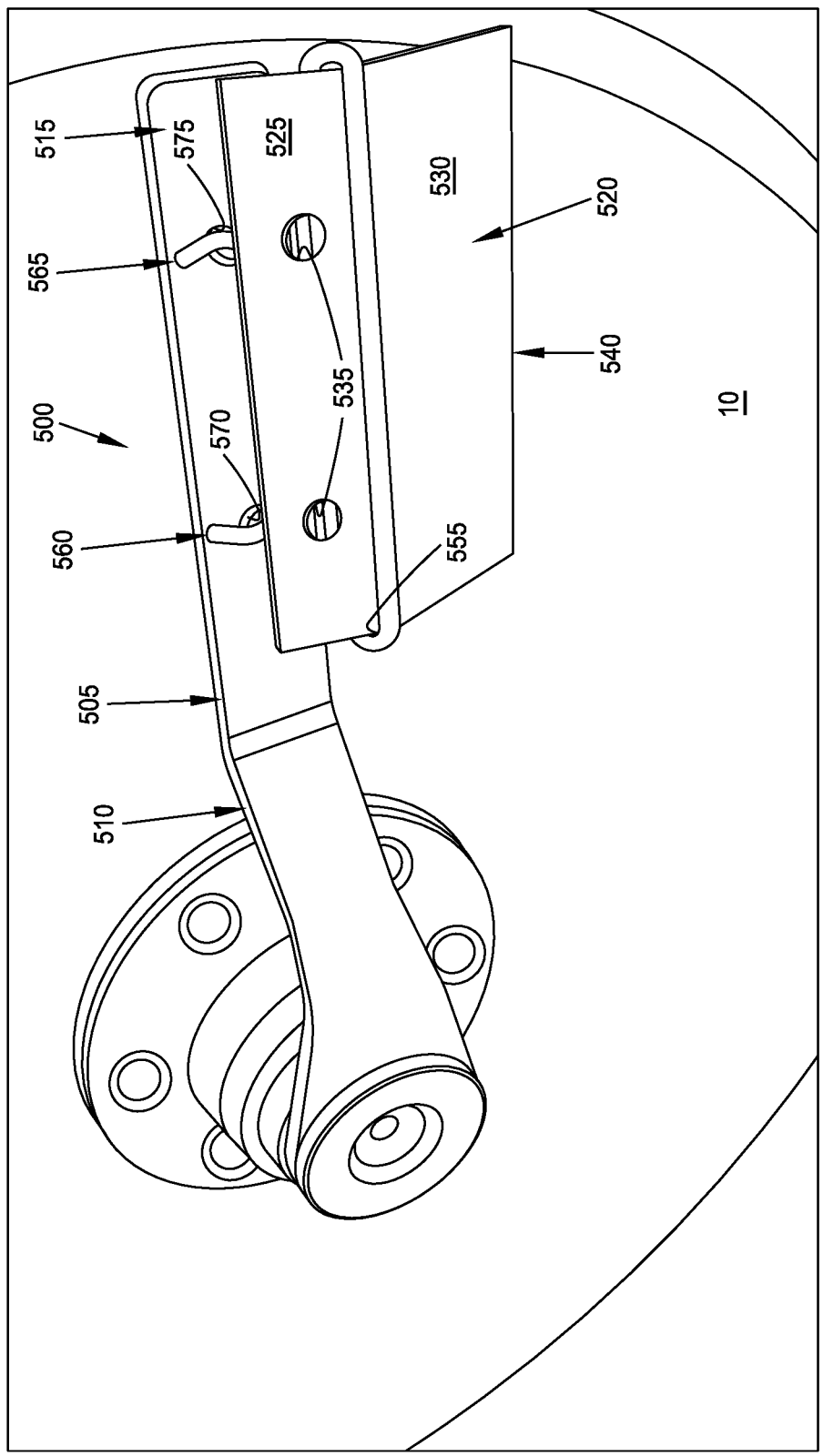
Figure 66:
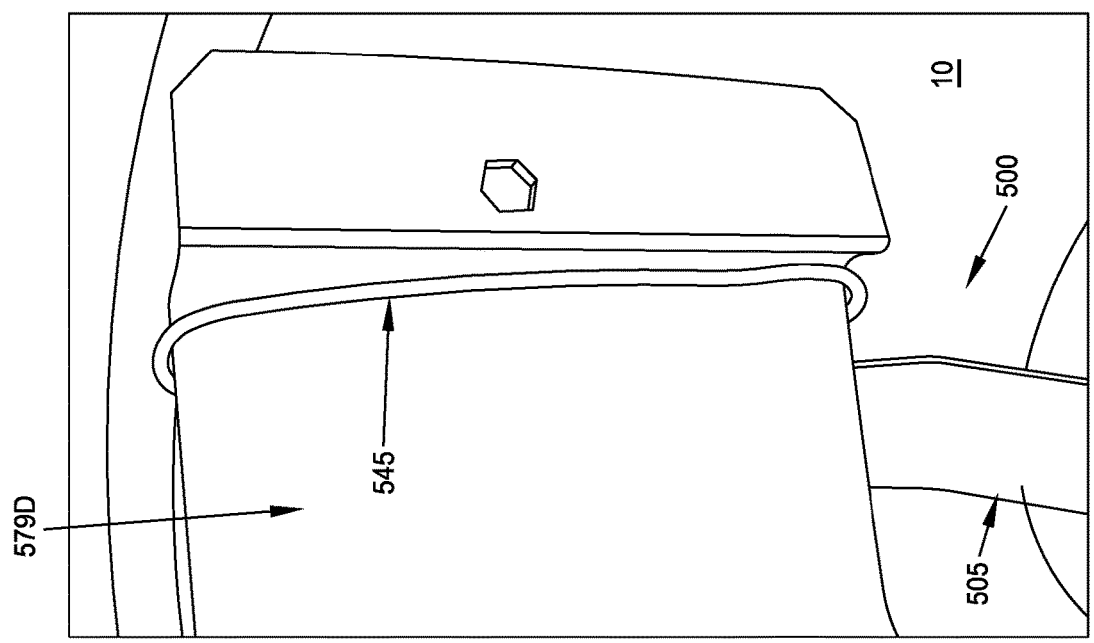
Figure 66A:
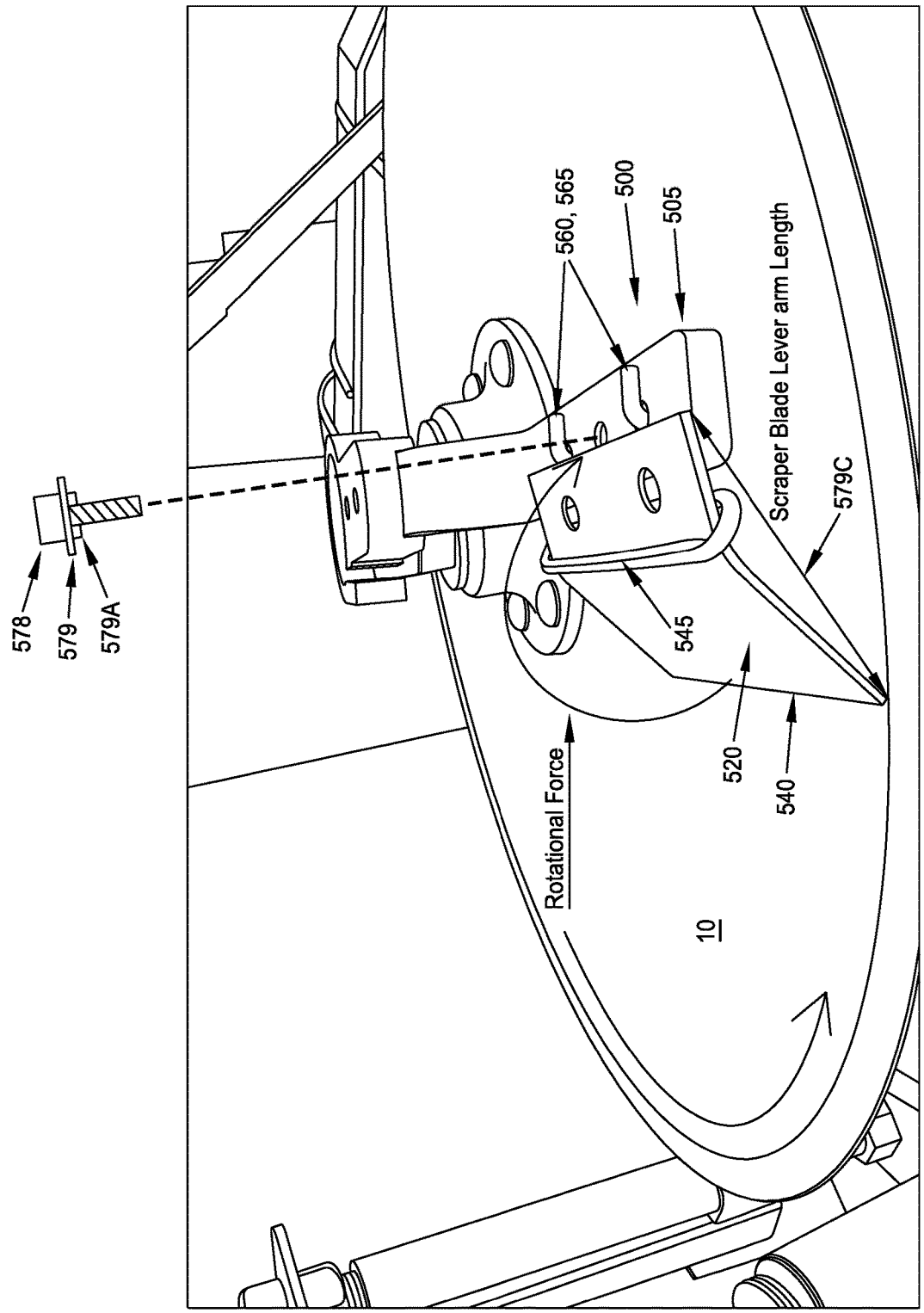
FIG. 66A is a schematic view showing further details of the hub-mounted scraper shown in FIGS. 59, 60 and 61.

It should be appreciated that, if desired, a bolt 578 may be provided for restricting proximal movement of scraper blade 520 relative to scraper arm 505. More particularly, bolt 578 acts as a stop which is engaged by proximal portion 525 of scraper blade 520, whereby to limit proximal movement of scraper blade 520 relative to scraper arm 505. Bolt 578 may include a washer 579. Bolt 578 is received in a threaded hole formed in the distal end 515 of scraper arm 505. The head of bolt 578 (and washer 579, where one is provided) is spaced from the top surface of the proximal portion 525 of scraper blade 520, whereby to allow scraper blade 520 to pivot (under the resiliency of tensioning clip 545) relative to distal end 515 of scraper arm 505 (i.e., to pivot about the longitudinal axis of scraper arm 520). See FIGS. 59 and 66A. In one preferred form of the invention, and looking now at FIGS. 59A and 59B, a shim 579A may be disposed between scraper arm 505 and washer 579, and a notch 579B may be provided in proximal portion 525 of scraper blade 520.

1. Use of the Resilient Tensioning Clip in Conjunction with a Hub-Mounted Scraper Arm It should be appreciated that mounting scraper assembly 500 so that scraper arm 505 extends out from the axle of a ground opening disc, and resiliently mounting scraper blade 520 to scraper arm 505 using resilient tensioning clip 545, provides a number of advantages over the prior art. By way of example but not limitation, one advantage of such a hub-mounted configuration is that scraper arm 505 (and hence scraper blade 520) can be mounted at any scraping position relative to opening disc 10 that the operator chooses (e.g., scraper arm 505 may be mounted at a "three o'clock" position, a "nine o'clock" position or any other position relative to the opening disc).

Another advantage of the present invention is the ease of attaching scraper assembly 500 to the hub 511 of opening disc 10 (see FIGS. 59, 60, 61 and 62A) so that scraper assembly 500 will maintain a blade contact pressure sufficient to scrape the opening disc with edge 540 of scraper blade 520 more efficiently, while imposing less pressure on edge 540, which is due to the short "lever arm" supporting edge 540 of scraper blade 520. More particularly, by mounting scraper arm 505 to the hub of an opening disc, and by forming scraper arm 505 as a plate structure so as to behave substantially rigid along its length, the "lever arm" supporting edge 540 is effectively the length of scraper blade 520, i.e., the length 579C shown in FIG. 66A. The short "lever arm" of the present invention (i.e., the length 579C shown in FIG. 66A) is much shorter than the long lever arm which is necessary with a frame-mounted scraper arm (i.e., the length extending between point 410 and point 415 in FIGS. 56 and 57).

In accordance with the present invention, and still looking at FIGS. 58-62, the force required to maintain contact of scraper blade 520 against opening disc 10 is provided by the use of the aformentioned resilient tensioning clip 545, as discussed above and as will hereinafter be discussed below.

Still another advantage of the present invention is that scraper assembly 500 may be used with both clockwise-rotating ground opening discs as well as counterclockwise-rotating ground opening discs.

And an advantage of mounting scraper blade 520 to scraper arm 505 using resilient tensioning clip 545 is that scraper blade 520 does not need to be fastened to scraper arm 505 by bolts or other similar fasteners.

Figure 65:
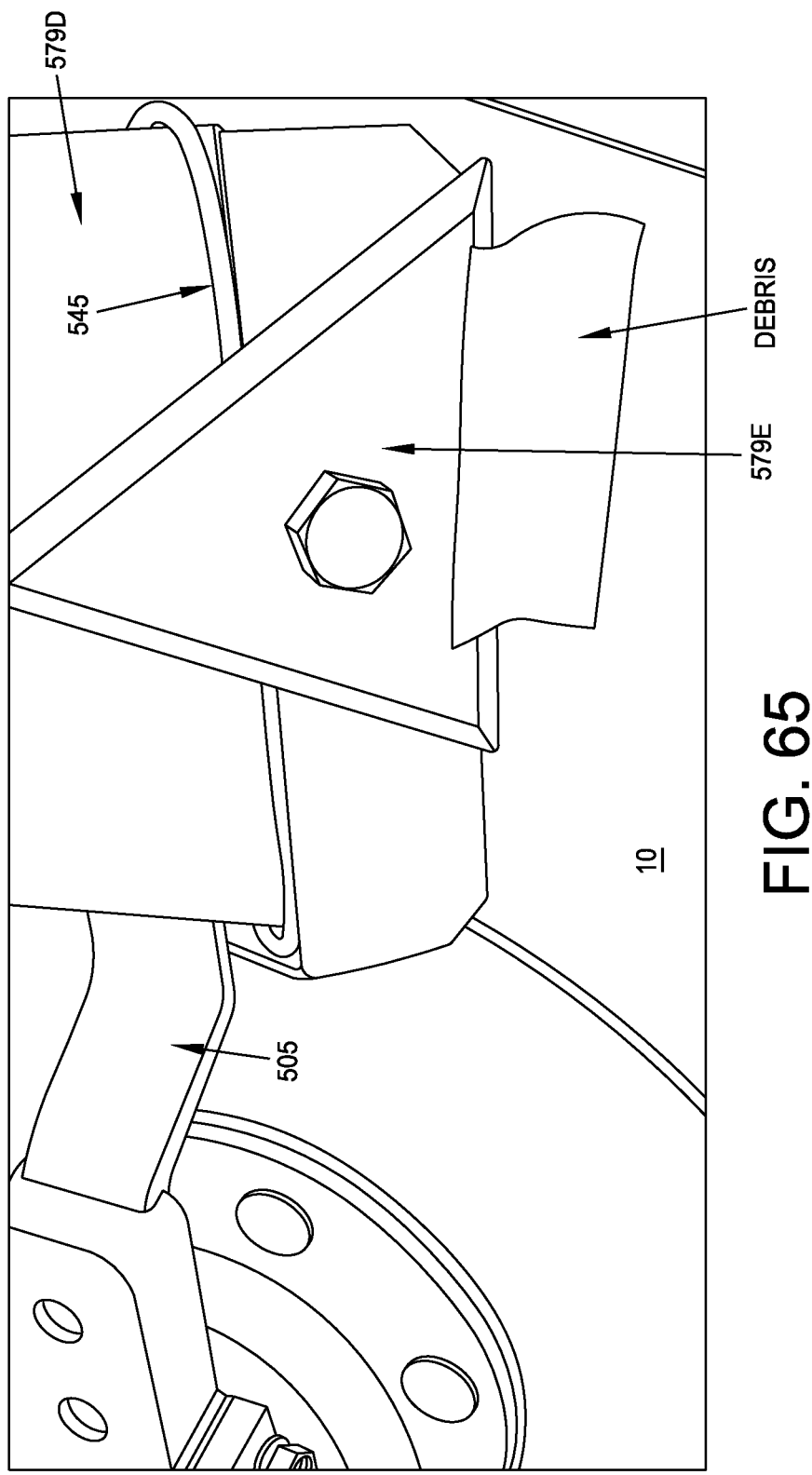
FIGS. 65 and 66 are schematic views showing how a blade holder may be secured to the scraper arm and used to mount a scraper blade to the scraper arm.

Another advantage of mounting scraper blade 520 to scraper arm 505 using resilient tensioning clip 545 is that the resilient tensioning clip allows scraper arm 505 to easily accommodate a large number of different blades and blade holders (see below) having various configurations. See, for example, FIGS. 58, 59, 63 and 68, which show alternative configurations for scraper blade 520. See also, for example, FIGS. 65 and 66, which show resilient tensioning clip 545 securing a blade holder 579D to scraper arm 505, where blade holder 579D supports a scraper blade 579E in contact with opening disc 10. Note that where a blade holder is used to secure a scraper blade to scraper arm 505, various configurations of blade holder and scraper blade can be used, e.g., a planar blade holder and a stepped or angled scraper blade (e.g., a scraper blade such as scraper blade 520), a stepped or angled blade holder and a planar scraper blade (e.g., a scraper blade such as scraper blade 579E), etc.

Figure 63:
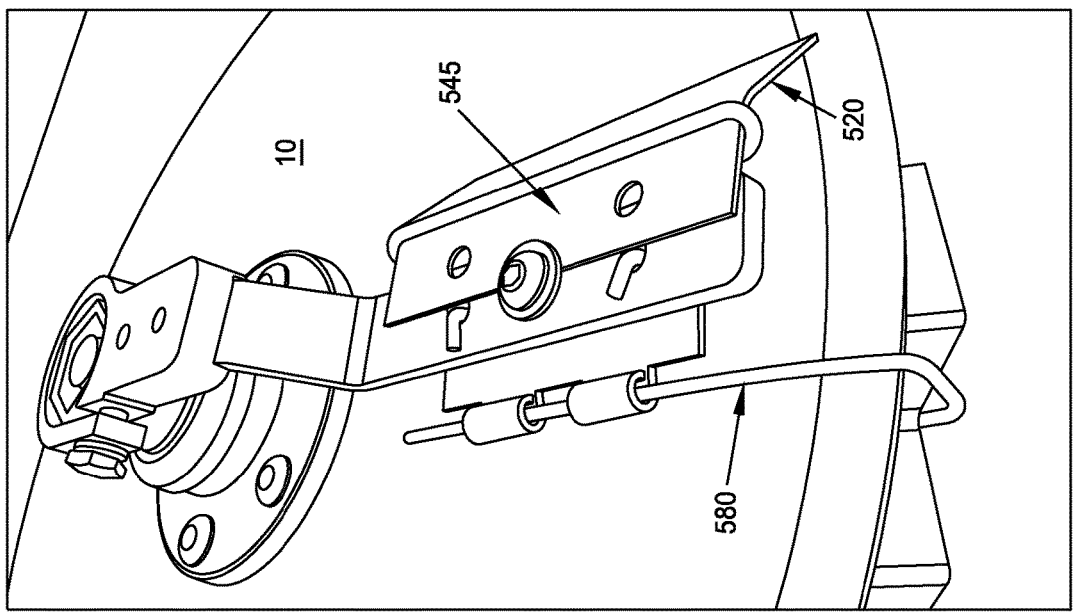
FIGS. 63 and 64 are schematic views of a distal scraper blade extension formed in accordance with the present invention which allows simultaneous scraping of both the front and back sides of a ground opening disc.
Figure 64:
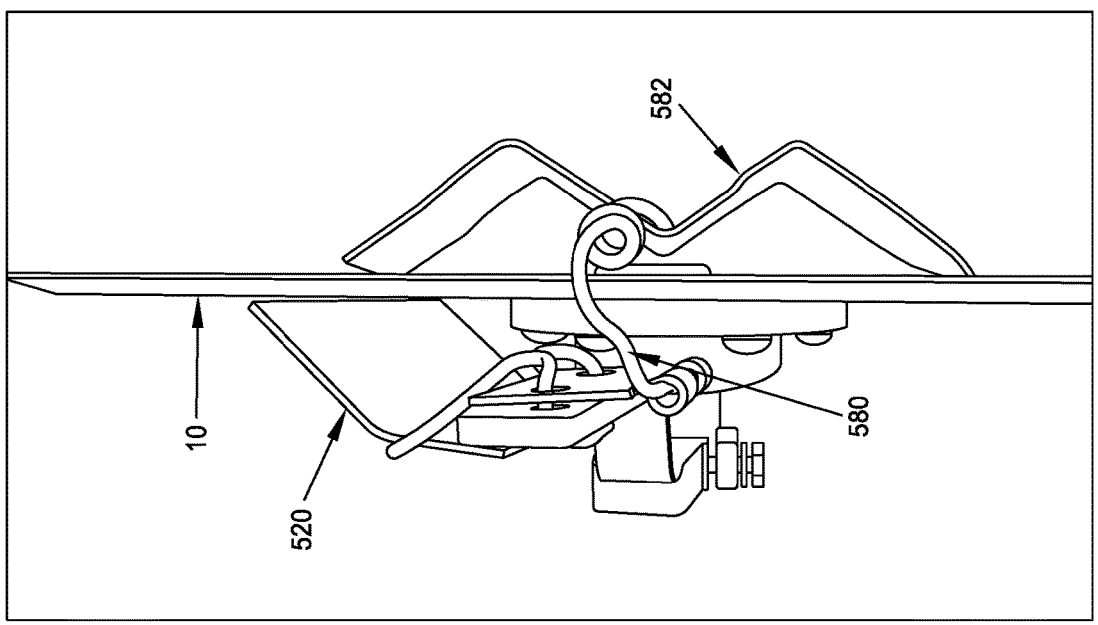

In another form of the present invention, and looking now at FIGS. 63 and 64, if desired, scraper blade 520 may comprise an extension 580 which extends to the opposite side of opening disc 10 so as to allow simultaneous scraping of both the front and back sides of the ground opening disc, i.e., via the aforementioned scraper blade 520 (which scrapes the front surface of opening disc 10) and by a supplemental scraper blade 582 (which scrapes the rear surface of opening disc 10).

It should also be appreciated that the scraper blades of the present invention provide a very clean "ramp material ejection angle", which facilitates the release of material (e.g., dirt, mud and debris) scraped from the ground opening disc by scraper blade 520. By way of example but not limitation, and looking now at FIGS. 59 and 66A, edge 540 of scraper blade 520 may act as a quick-release short bevel ramp that facilitates unimpeded release of scraped material from both the ground opening disc and from scraper blade 520.

2. The Resilient Tensioning Clip Allows for Greater Blade Flex and Fewer Broken Blades and Better Opening Disc Function It should also be appreciated that mounting scraper blade 520 to scraper arm 505 using resilient tensioning clip 545 allows the scraper blade to follow the surface of opening disc 10 when scraper blade 520 flexes relative to scraper arm 505 (e.g., when it encounters large unyielding debris such as rocks), and also allows scraper blade 520 to accommodate "disc warp" or other disc irregularities and/or surface abnormalities. This is accomplished by configuring resilient tensioning clip 545 such that when scraper blade 520 encounters a certain level of resistance, resilient tensioning clip 545 flexes in order to allow edge 540 of scraper blade 520 to temporarily disengage from the face of opening disc 10. When the resistance is removed (e.g., when the debris passes under scraper blade 520), resilient tensioning clip 545 returns scraper blade 520 to its original position so as to re-engage edge 540 of scraper blade 520 with the surface of opening disc 10. See FIG. 66A.

In addition, the configuration of resilient tensioning clip 545, which has a body 550 extending inwardly from each end of the scraper blade, provides torsional support to the scraper blade, i.e., in the manner shown in FIGS. 66B and 66C. More particularly, the configuration of resilient tensioning clip 545 allows scraper blade 520 to "radially pivot" relative to the longitudinal axis of scraper arm 505 (i.e., to "radially pivot" along the radius of opening disc 10) when scraper blade 520 encounters large unyielding debris such as rocks.

If desired, scraper blade 520 may or may not be formed out of a resilient material. Where scraper blade 520 is formed of a resilient material, scraper assembly 500 is preferably configured so that resilient tensioning clip 545 flexes before scraper blade 520 flexes, so that when debris causes edge 540 of scraper blade 520 to temporarily disengage from the face of opening disc 10, resilient tensioning clip 545 will provide the largest aspect of component flexing. In one preferred form of the invention, scraper blade 520 is formed out of a relatively stiff material so that scraper blade 520 exhibits minimal flexing, so that resilient tensioning clip 545 provides substantially all of the flexion in the yieldable mount of scraper blade 520 to scraper arm 505 (i.e., flexion of edge 540 relative to scraper arm 505).

Significantly, many prior art scraper assemblies comprise protrusions or blade-tensioning obstacles which tend to catch and entrap the dirt, mud and/or debris scraped from the opening disc. Such obstructions can lead to the accumulation of dirt, mud and/or debris on the opening disc, or between the opening disc and the scraper arm and/or scraper blade, which can slow or prevent the opening disc from rotating as intended.

3. The Resilient Tensioning Clip Eliminates the Need for Other Connecting Apparatus that can Impair Proper Operation of the Opening Disc It is also desirable to keep an unobstructed pathway beneath edge 540 of scraper blade 520, inasmuch as any fine material working its way under the scraper blade should be able to pass under the scraper blade and move out from under the scraper blade with the rotation of opening disc 10. Many prior art scraper assemblies have obstructions located under the scraper blade which can entrap material and allow such material to build up to troublesome proportions, thereby potentially impairing proper rotation of the opening disc.

4. Use of the Resilient Tensioning Clip in Conjunction with a Hub-Mounted Scraper Arm Generates Sufficient Force for Effective Scraping of the Ground Opening Disc As discussed above, in one preferred form of the present invention, and looking now at FIG. 59, scraper assembly 500 is preferably mounted onto a non-rotating disc hub 511 of an opening disc axle, such that scraper assembly 500 remains rotationally stationary relative to opening disc 10 when the ground opening disc is rotated. Thus, scraper arm 505 radially traverses across the surface of opening disc 10, from non-rotating disc hub 511 radially outward toward the outer circumference of the opening disc. This configuration, in conjunction with resilient tensioning clip 545, provides a substantially shorter lever arm to support edge 540 of scraper blade 520, thereby reducing the amount of force needed to ensure sufficient contact between edge 540 of scraper blade 520 and the opening disc. Proximal portion 525 of scraper blade 520 is mounted to distal end 515 of scraper arm 505 (e.g., using the aforementioned resilient tensioning clip 545 in the manner discussed above), and edge 540 of scraper blade 520 is disposed against opening disc 10, such that when the opening disc is rotated, edge 540 of scraper blade 520 directs material (e.g., dirt, mud and debris) disposed on opening disc 10 along the outboard side of scraper blade 520 (e.g., in FIG. 59, the ground opening disc rotates counterclockwise, and dirt, mud and debris is directed off of the ground opening disc and along the outboard side of scraper blade 520).

The present invention also provides a scraper blade 520 which is configured to better withstand a lifting force (i.e., a force directed outboard from the face of the ground opening disc such that edge 540 of scraper blade 520 is pushed away from the surface of opening disc 10). More particularly, with the present invention, the unsupported length of scraper blade 520 (i.e., the distance between edge 540 and proximal portion 525 of scraper blade 520 where it joins scraper arm 505) is relatively short, and hence resists a lifting force trying to push edge 540 away from the surface of opening disc 10. See the relatively short lever arm length 579C in FIG. 66A. This is in contrast to the longer lever arms of traditional frame-mounted arms and scraper blades (FIGS. 56 and 57), which are susceptible to such lifting forces due to their longer unsupported lengths. Thus, with the shorter lever arm lengths of the present invention, much less force is required to hold edge 540 firmly in contact with the surface of the opening disc than is required with traditional, longer frame-mounted scraper arm lengths and/or scraper blades, e.g., the frame-mounted scraper arms shown in FIGS. 56 and 57.

In general, the scraper edge-to-ground opening disc contact efficiency is greatly improved by use of a short "lever arm" (i.e., lever arm 579C shown in FIG. 66A) and the use of resilient tensioning clip 545 in order to hold edge 540 of scraper blade 520 in contact with the ground opening disc surface. Significantly, the use of a resilient tensioning clip 545 to yieldably mount scraper blade 520 to scraper arm 505 allows scraper blade 520 to "give" to some extent when the blade encounters a substantial obstacle (e.g., a rock or an abnormality) disposed on the face of the ground opening disc. Resilient tensioning clip 545 "gives" by allowing resilient flexing, whereby to allow edge 540 of scraping blade 520 to briefly move away from the ground opening disc before again being forced against the opening disc as resilient tensioning clip 545 returns to its non-flexation state. In essence, with the present invention, resilient tensioning clip 545 yieldably mounts the scraper blade to the scraper arm, yieldably biasing the scraper blade against the opening disc. A further advantage of using resilient tensioning clip 545 is that resilient tensioning clip 545 can be used to mount scraper blade 520 to scraper arm 505 with little or no additional hardware.

5. Use of Springs to Improve Scraper Performance

In another preferred form of the present invention, one or more torsion springs (e.g., torsion springs similar to those used in mousetraps) may be mounted to one or both sides (i.e., to the inboard side and/or the outboard side) of scraper blade 520 so as to provide sufficient force to scraper blade 520 to keep edge 540 of scraper blade 520 in contact with opening disc 10 while still allowing the scraper blade to yield (i.e., "give") when the scraper blade encounters a rigid object or an obstruction disposed on the face of the opening disc.

Figure 67:
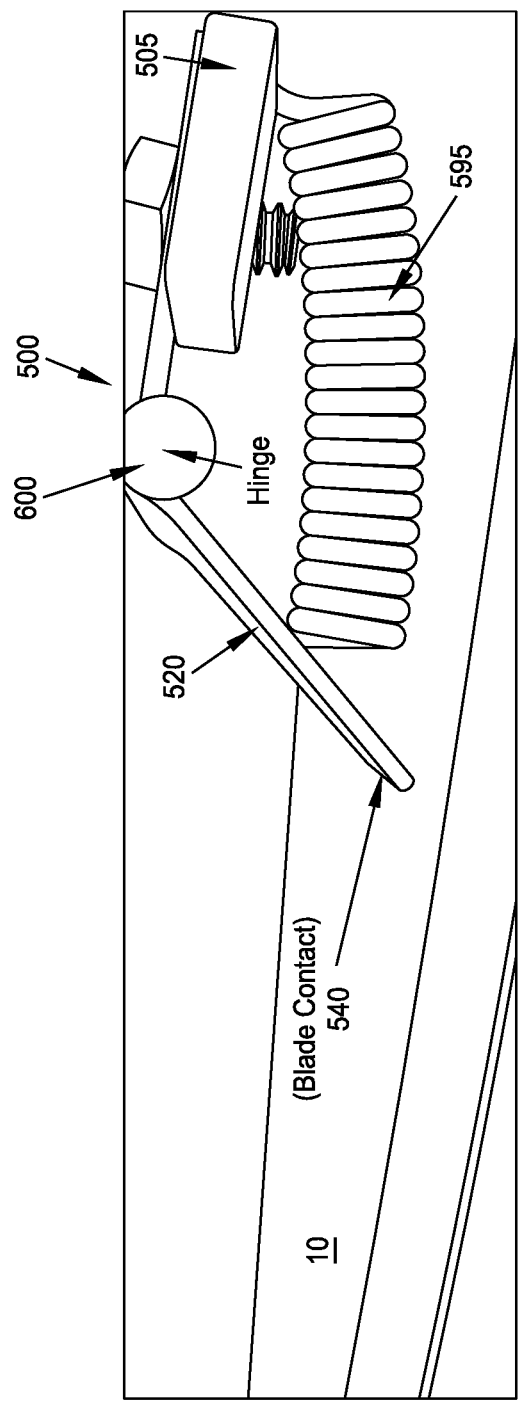
FIG. 67 is a schematic view of another novel scraper blade formed in accordance with the present invention.
Figure 68:
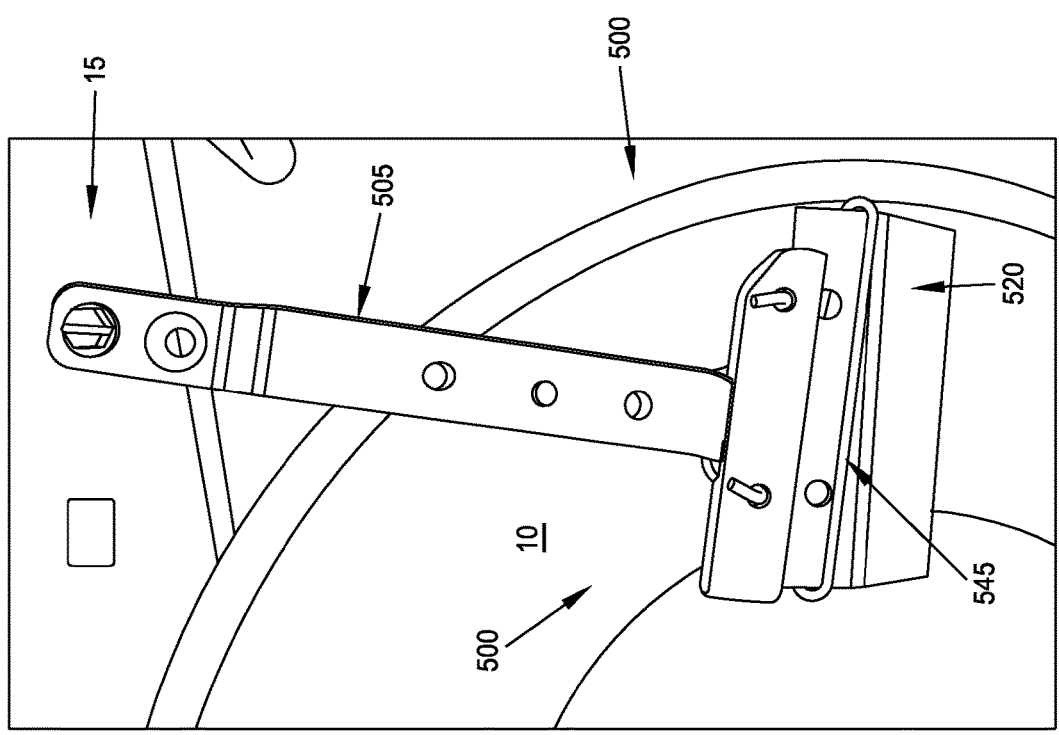
FIGS. 68 and 69 are schematic views showing frame-mounted scrapers, wherein the frame-mounted scraper of FIG. 68 utilizes a resilient tensioning clip.

In still another preferred form of the present invention, and looking now at FIG. 67, one or more tension springs 595 may be mounted to one or both sides (i.e., to the inboard side and/or the outboard side) of scraper blade 520. And, if desired, the length of scraper blade 520 may be shortened by using a "hinged" scraper blade 520 comprising a hinge 600 disposed intermediate proximal portion 525 and distal portion 530 of scraper blade 520, such that distal portion 530 can pivot on hinge 600 relative to proximal portion 525. With this form of the invention, one or more tension springs 595 may be provided as "cross under" spring tensioner(s) (or as a series of spring tensioners). And it should also be appreciated that the provision of hinge 600 can allow a variety of different hinge pin configurations including, but not limited to, a hinge pin extending outward in length (not shown) so as to provide a location to add an opening disc "cross over" attachment (e.g., such as the cross-over blade configuration shown in FIGS. 63 and 64) in order to contact the opposite surface of opening disc 10, whereby the attachment will provide scraping of the opposing planar surface of the opening disc. With such a configuration, the two-opposing-surface scrapers assist each other in improved blade contact, and improved (i.e., increased) surface contact tension, due to the complementary opposing tensions of the two-opposing-surface scrapers. Inboard-directed torque provided by resilient tensioning clip 545 can further improve contact of scraper blade 520 with opening disc 10.

It should be appreciated that, if desired, resilient tensioning clip 545 can comprise configurations other than those shown, including different cross-sections (e.g., it could be made from flattened spring steel stock instead of round spring steel stock).

6. The Resilient Tensioning Clip may be Used with Opening Discs Having Individual Axles or with Opening Discs Mounted to a Common Gang for Multiple Discs The blade tensioner used in the preferred form of the present invention (i.e., resilient tensioning clip 545) may be most efficient when it is used with a radially-extending, multi-positional locking scraper arm 505 which is adjustable, circumferentially, about the axle axis in order to direct soil being scraped from opening disc 10 in the most advantageous direction.

On ground opening discs arranged on a common axle (i.e., a common gang) for attaching multiple scraper assemblies 500, resilient tensioning clip 545 may be used to attach scraper blade 520 to the distal ends 515 of the individual scraper arms 505. This configuration results in a disc blade-following, counter-rotational end piece similar to that described above, which would also do a more efficient job of accommodating surface inconsistencies (such as disc warp) formed on the opening disc 10 or mitigating the effect of bent blades. One such mounting could be accomplished by drilling two holes at the distal end of the scraper arm 400 shown in FIG. 56 that would be the same in configuration as the holes 570, 575 formed in the axle-mounted scraper arms 505 (FIGS. 58-60) so that the resilient tensioning clip 545 can be used to hold the blade to the scraper arm. See FIG. 68.

Figure 69:
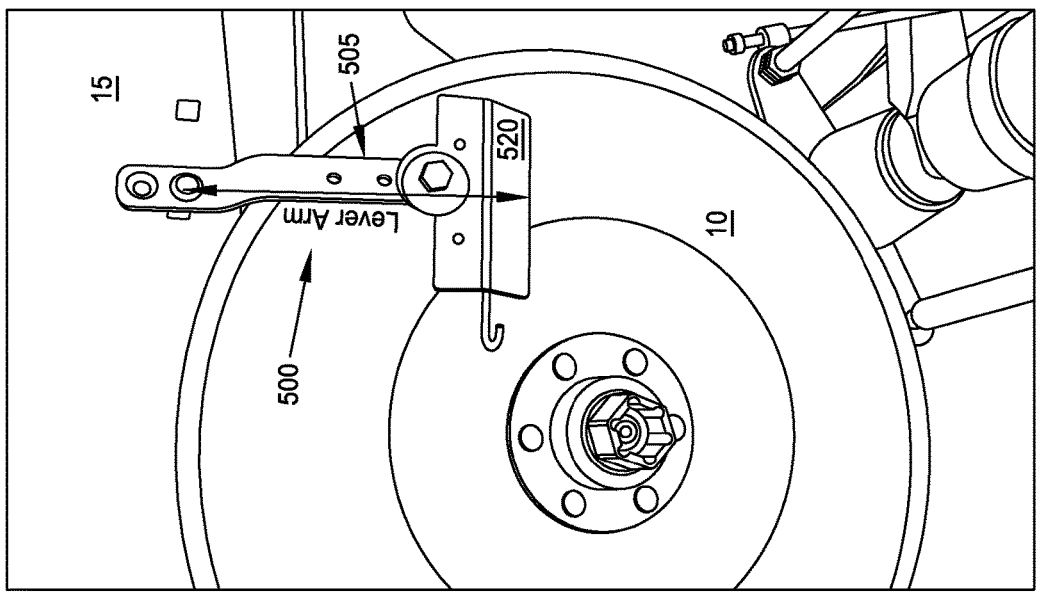

Other possibilities such as a scraper blade bolted to the scraper arm some resilience and position memory, and a resilient memory-position scraper arm, and a spring-tensioned scraper arm, are also within the scope of the present invention. See FIGS. 58 and 69 for examples of a scraper blade bolted to a scraper arm.

7. Advantages of the Present Invention

The present invention requires less pressure on the blade attachment arm, combined with the advantage of more efficient scraping, which will result in far fewer bent or broken scraper attachment arms.

Furthermore, the present invention, when mounted on a circumferentially-adjustable position scraper arm, will allow the operator to adjust the scraping position to direct scraped soil to the most suitable "landing zone".

In addition, the present invention requires less tension than longer lever arm, frame-mounted scrapers.

And the present invention enables potentially improved disc scraping upon initial installation, and especially as wear occurs during use. More particularly, the present invention relies less on the characteristics of the support arm to provide blade tension on the opening disc. It is, therefore, adaptable to a wide range of support arm configurations. Support arms can be shorter, lighter, positioned differently, and/or less precisely positioned. The present invention can eliminate the need for springs on the scraper arm and/or spring properties of the arm material.

The resilient tensioning clip 545 incorporates a dual torsion rod-type tensioning beneath scraper arm 505 (see FIGS. 59, 60, 61, 62, 62A, 62B, 66B and 66C) which operates much like independent suspension arms, allowing edge 540 to receive very consistent torsion resistance on the radially-outboard blade surface and radially-inboard blade surface, simultaneously. In this respect it will be appreciated that resilient tensioning clip 545 owes much of its tensioning properties to a "torsion bar" effect. For example, in FIG. 66B, it can be seen that when lifting upward on the left side of scraper blade 520 while pushing downward on the right side of scraper blade 520, a rotational twist or torque is countered by the length of resilient tensioning clip 545. For further example, in FIG. 66C, it can be seen that when pushing down on the left side of scraper blade 520 while pushing upward on the right side of scraper blade 520, a rotational twist or torque is countered by the length of resilient tensioning clip 545. Thus, the resilient tensioning clip 545 provides a combination of (i) torsion bar resilience in the straight lengths of the resilient tensioning clip, combined with (ii) the tight radius bends of the resilient tensioning clip which provide great resistance to changing shape, so as to keep the resilient tensioning clip automatically returning to a neutral unflexed position. This group of forces allows scraper blade 520 to be positioned with a modest amount of flex and still pivot in any axis and automatically return to its original position.

8. Additional Features of the Present Invention

The present invention provides a scraper assembly having scraper blade tensioning means, such as a resilient tensioning clip 545 shown in FIGS. 58, 59, 60-62, 62A, 62B, 63, 66A, 66B and 66C; a torsion spring; and a tension spring such as is shown in FIG. 67.

9. Novel Frame-Mounted Scraper

It should also be appreciated that, if desired, scraper assembly 500, incorporating the aforementioned scraper blade 520 and resilient tensioning clip 545, may be mounted to frame 15 rather than to the hub 511 of an opening disc. See, for example, FIG. 68.

10. Use of the Novel Scraper Assembly with Opening Discs Which may or may not be Disposed Adjacent to Gauge Wheels It should be appreciated that the novel scraper assembly of the present invention may be used with opening discs which may or may not be a disposed adjacent to gauge wheels. More particularly, in one form of the invention, the novel scraper assembly may be used to scrape an opening disc which is disposed adjacent to a gauge wheel. In another form of the invention, the novel scraper assembly may be used to scrape an opening disc which is not disposed adjacent to a gauge wheel, e.g., a stand-alone opening disc secured to the frame of a farm implement, an opening disc which is disposed between two other opening discs (i.e., as part of a gang of opening discs), etc.

New Scraper Blade Construction

In the preceding sections, various scrapers are disclosed for scraping the opening disc and/or gauge wheel of a planter assembly. See, for example, (i) scraper 140 which scrapes opening disc 10 in order to prevent a buildup of soil in the gap between opening disc 10 and the gauge wheel, (ii)

universal scraper 200 which may be used with ground opening equipment (e.g., ground opening equipment using furrow opener discs used on seed planters, fertilizer attachment ground opening discs, so-called "no till" ground opening discs, etc.), and (iii) two-edged scraper blade 300 for scraping the back surface of the right or left opening disc.

Scraper blades are conventionally made of different variations of steel with different thicknesses. The thickness of the steel blade is selected by the size of the ground opening disc and the aggressiveness of ground opening down pressure necessary to get the desired ground opening disc results. In some cases, opening disc scraper blades may be fashioned out of heat-treated blued spring steel, with the edge of the scraper blade that contacts the opening disc being made of a relatively thin steel that flexes and bends so as to present a more efficient scraping edge. However, the flexible nature of spring steel (and also thicker and more mild steel) causes the spring steel to wear away during use, thereby creating a dull blade on the planter assembly that will need to be replaced in order for the planter assembly to properly function.

Prior art scraper blades have tried to solve the problem of blade wear by incorporating a solid tungsten carbide bar or strip to the edge of the scraper blade by a mechanical means of attachment. See, for example, FIG. 70 which shows a multi-part scraper having a strip or bar of tungsten carbide clamped into a slot formed in a soft metal strip retainer, and FIG. 71 which shows a thick square blade for pushing paper, wherein the blade comprises a coating of tungsten carbide disposed on the edge of the thick square blade.

Figure 70:
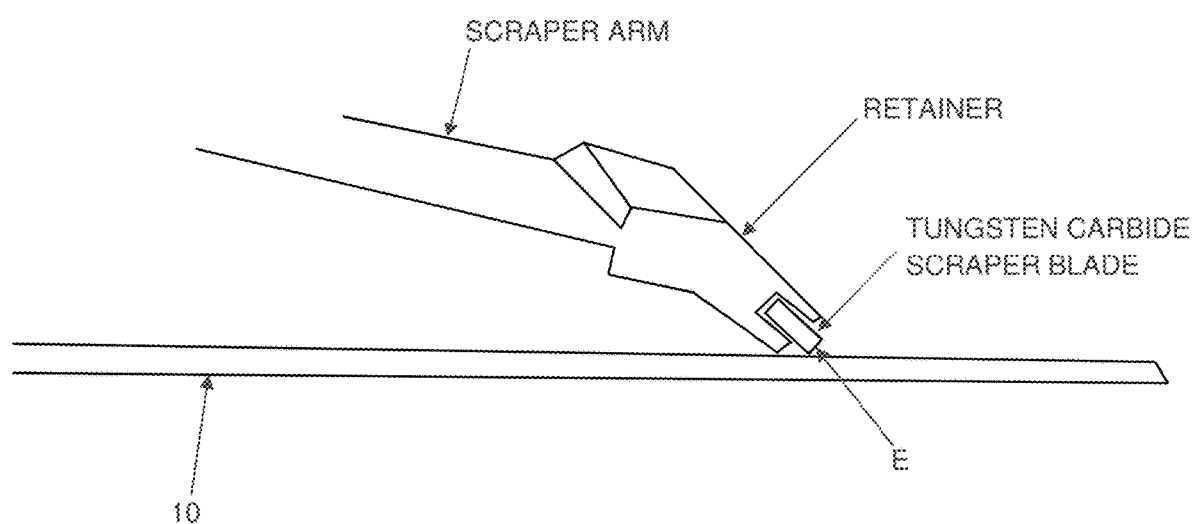
FIG. 70 is a schematic view showing a prior art scraper blade.
Figure 71:
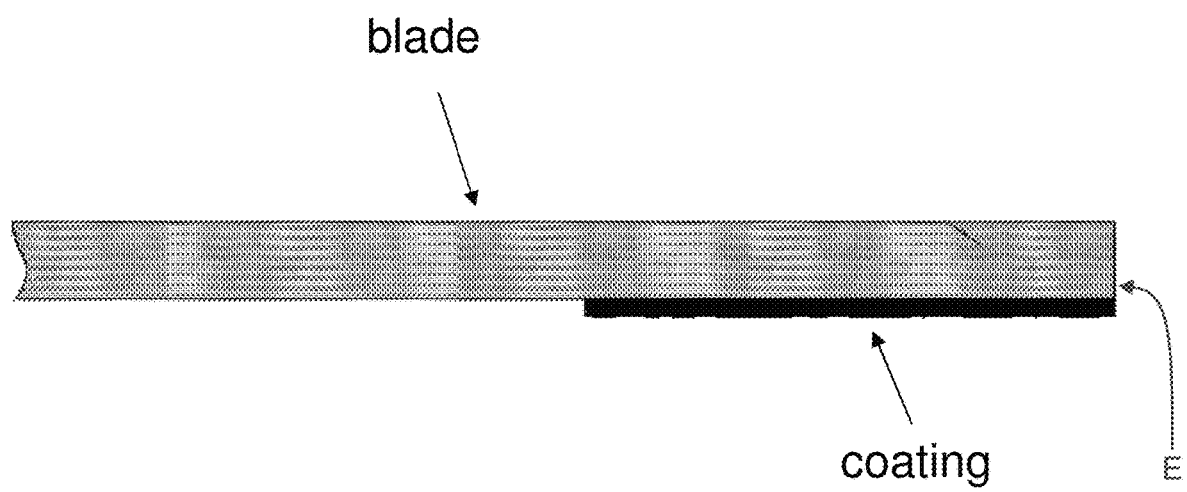
FIG. 71 is a schematic view showing a prior art scraper blade having a coating.

However, a tungsten carbide blade (as seen in FIG. 70), and a coating of tungsten carbide disposed on the edge of a thick square blade (as seen in FIG. 71), results in a blade with a blunt or dull edge E on the blade rather than a fine sharp edge. When a blunt or dull edge E is used on a scraper for removing soil or debris from ground opening equipment, the blunt or dull edge pushes the soil or debris along the opening disc, but the blunt or dull edge does not scrape or slice the soil or debris from the surface of the opening disc like a scraper blade with a fine sharp edge would scrape the soil or debris from the surface of the opening disc.

Thus, while the tungsten carbide on the blades shown in FIGS. 70 and 71 will cause the blades to wear well (due to the strength of the tungsten carbide material), the blunt or dull edge of the blades will lead to poor performance in the field since the dull edge cannot scrape or slice away the soil or debris that has accumulated on the opening disc. And, with the multi-part scraper blade shown in FIG. 70, when the scraper blade fails to remove the soil or debris on the opening disc, the scraper blade is actually pushed away from contacting the opening disc by the soil or debris that has accumulated on the opening disc, which further inhibits the ability of the scraper blade to remove the soil or debris away from the opening disc.

In addition to the foregoing, the strength of the tungsten carbide itself makes it difficult to sharpen or hone the blade to create a fine sharp edge on the scraper blade in order to create a scraper blade that will wear well and scrape well.

Thus, there is a need for a scraper blade that will wear well in order to extend the life of the scraper blade and also provide a sharp edge on the scraper blade for removing the soil and debris from the opening disc (or other ground opening equipment).

The present invention provides a novel universal scraper blade having increased wear and a sharp edge by providing a novel universal scraper blade which includes a strip or coating of material for extending the life of the blade while still providing a sharp edge on the scraper blade. The present invention provides the novel universal scraper blade by providing a strip or coating of a corrosion and wear resistant surface on a scraper blade, at a point on the scraper blade which is set back from the edge of the scraper blade, and then utilizing the normal wear experienced by a conventional scraper blade to wear the scraper blade back to the coating to create a fine sharp edge on the scraper blade.

Figure 72:
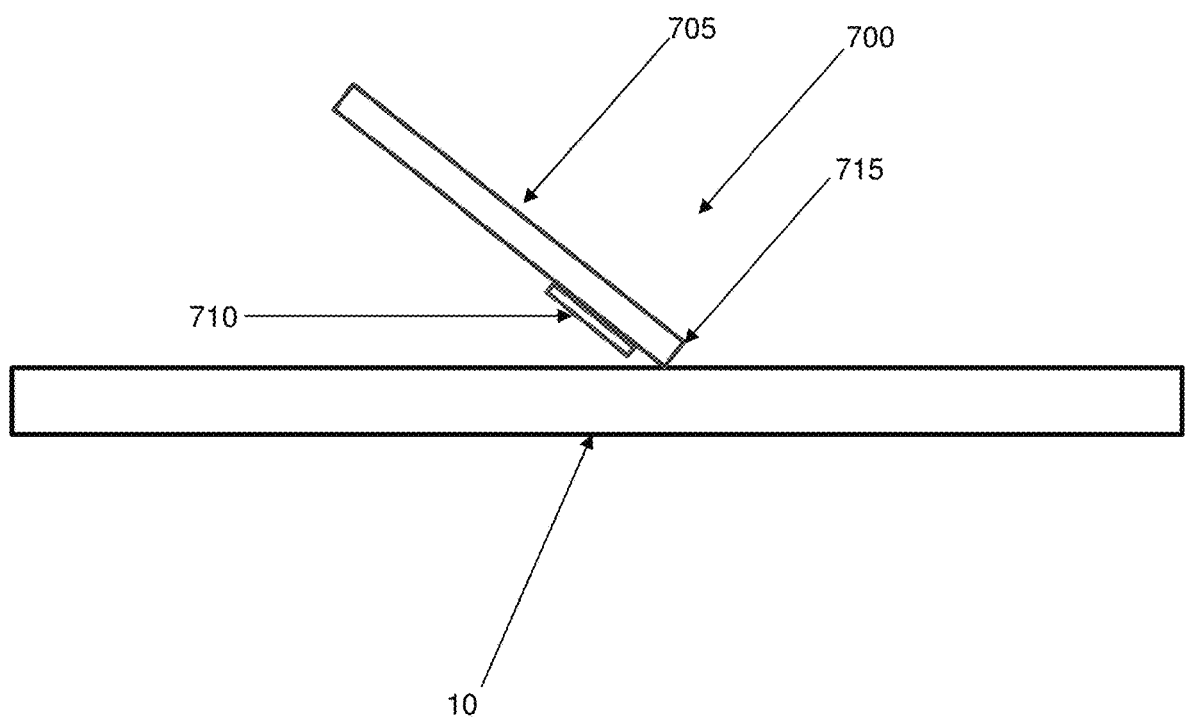
FIGS. 72 and 73 are schematic views showing a new scraper blade construction having improved performance.
Figure 73:
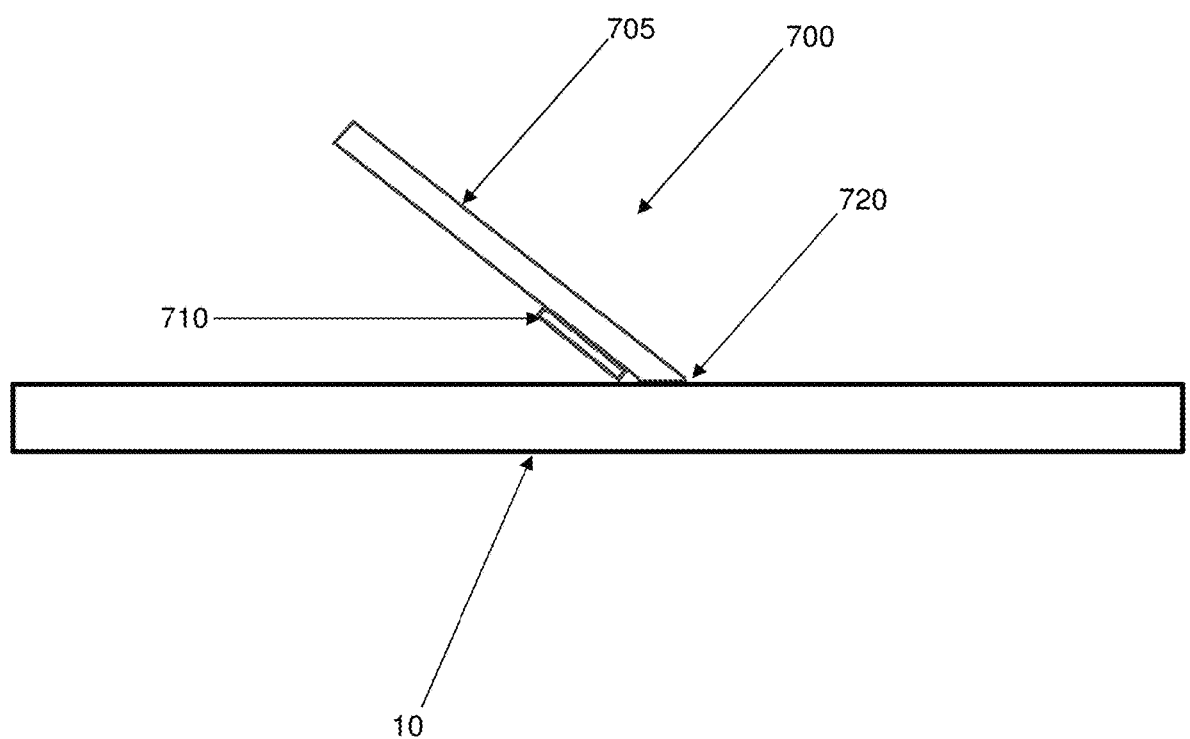

More particularly, and looking now at FIGS. 72 and 73, there is shown a novel universal scraper 700 configured to remove accumulated soil and debris from the face of an opening disc, a gauge wheel, or any other part of ground opening equipment which accumulates a build-up of soil or debris. Universal scraper 700 comprises a scraper blade 705 which is coated with a corrosion and wear resistant surface 710.

Scraper blade 705 may be formed out of mild steel, stainless steel or spring steel, or any other material which can be sharpened into a fine sharp edge for scraping soil or debris from ground opening equipment. In a preferred form of the present invention, scraper blade 705 is formed out of spring steel, and corrosion and wear resistant surface 710 comprises a coating of tungsten carbide. The spring steel has a uniform thickness which is less than, or equal to, approximately 0.090 inches (i.e., 90 thousandths of an inch), and the corrosion and wear resistant surface 710 is a strip of material which is approximately 0.010 inches to approximately 0.035 inches wide.

Like prior art scraper blades, scraper blade 705 of universal scraper 700 is coated with a corrosion and wear resistant surface 710 (e.g., tungsten carbide) in order to increase the longevity of scraper blade 705, and thus, increase the longevity of universal scraper 700.

However, instead of applying the tungsten carbide coating to the edge of the scraper blade (as shown in prior art FIG. 71), corrosion and wear resistant surface 710 is applied as a strip of material or coating on scraper blade 705, with the strip of material or coating being stepped back from edge 715 of scraper blade 705 (i.e., the edge which comes into contact with opening disc 10 or other ground opening equipment). Thus, as universal scraper 700 is used, and edge 715 of scraper blade 705 scrapes soil and debris from a surface (e.g., opening disc 10), edge 715 of scraper blade 705 wears down in order to provide a fine sharp edge 720 adjacent to corrosion and wear resistant surface 710 (FIG. 72). In essence, the present invention takes advantage of the normal wear experienced by a scraper blade by turning the wear into a means for providing the optimal configuration of a scraper blade (i.e., fine sharp edge 720). In this way, edge 715 of scraper blade 705 acts as a sacrificial region in order to provide universal scraper 700 with a desired fine sharp edge 720 for scraping soil and debris from ground opening equipment, but that also wears well because of the corrosion and wear resistant surface (e.g., the coating of tungsten carbide), thereby red cinq the likelihood of scraper blade breakage and prolonging the useful life of the scraper blade.

In one form of the invention, corrosion and wear resistant surface 710 (e.g., the tungsten carbide coating) may be applied to scraper blade 705 by spraying the corrosion and wear resistant surface (e.g., the tungsten carbide coating) onto scraper blade 705 using a high velocity oxygen fueled (HVOF) process. However, it is important to note that corrosion and wear resistant surface 710 (e.g., the tungsten carbide coating) can also be applied to the scraper blade using other methods which are well known to those skilled in the art. By way of example but not limitation, the corrosion and wear resistant surface (e.g., the tungsten carbide coating) can be applied to the scraper blade using a strong adhesive to adhere a thin strip of tungsten carbide (or similar material) to the scraper blade at a position set back from the edge of the scraper blade. And by way of further example but not limitation, corrosion and wear resistant surface 710 may be applied to scraper blade 705 by another method of coating (e.g., plasma spray coating).

In addition to the foregoing, other similar highly abrasion resistant coatings may be substituted for the tungsten carbide. More particularly, overlay coatings typically consist of a thin layer of a discrete alloy composition applied to a metal surface substrate (e.g., a scraper blade). The coating alloy can be chosen for maximum corrosion resistance, since it does not depend on the composition of the substrate (e.g., a scraper blade) to develop corrosion resistance. The overlay coatings have a typical composition represented by MCrAlX, where M stands for nickel (Ni), cobalt (Co), and occasionally iron (Fe), Cr stands for chromium, Al stands for aluminum, and X represents oxygen-reactive elements such as Zironcium (Zr), Hafnium (Hf), Silicon (Si), and Yttrium (Y). The overlay coatings may be deposited by electron-beam physical vapor deposition (EB-PVD) or by a spray process.

And in another form of the present invention, corrosion and wear resistant surface 710 may comprise a ceramic coating.

Figure 74:
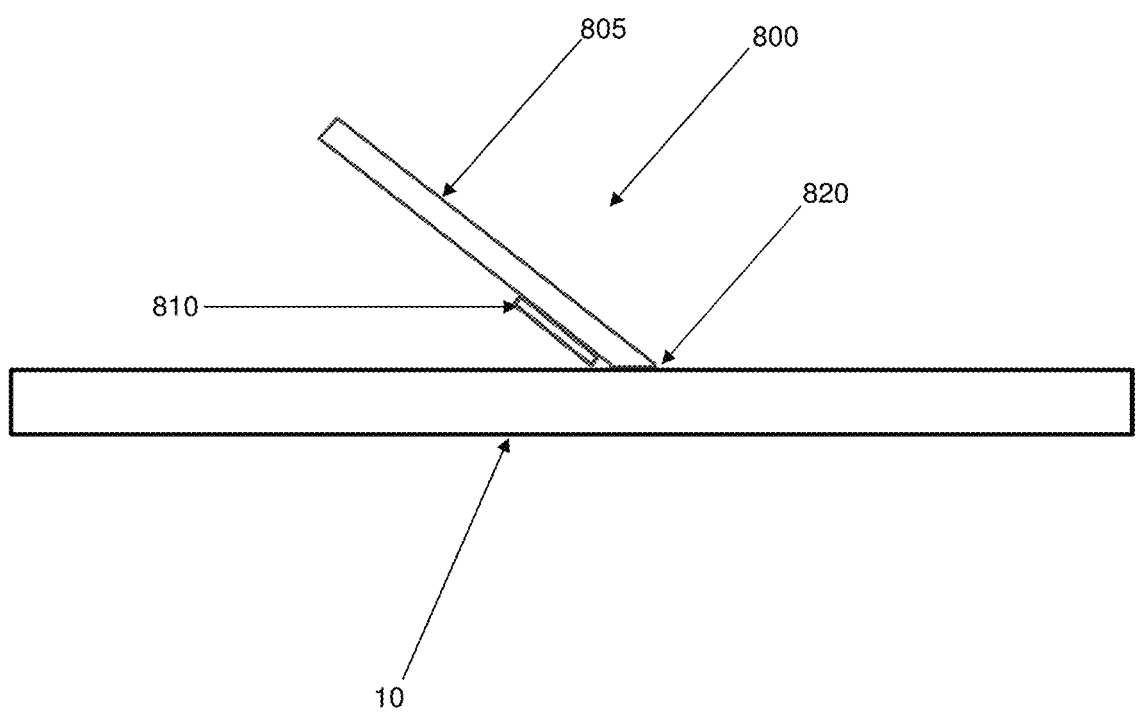
FIG. 74 is a schematic view showing another new scraper blade construction having improved performance.

In still another form of the present invention, and looking now at FIG. 74, there is shown a novel universal scraper 800 configured to remove accumulated soil and debris from the face of an opening disc, a gauge wheel, or any other part of ground opening equipment which accumulates a build-up of soil or debris. Universal scraper 800 comprises a scraper blade 805 which is coated with a corrosion and wear resistant surface 810. Scraper blade 805 of universal scraper 800 is coated with a corrosion and wear resistant surface 810 (e.g., tungsten carbide) in order to increase the longevity of scraper blade 805, and thus, increase the longevity of universal scraper 800. However, in this form of the invention, corrosion and wear resistant surface 810 is applied to a thin scraper blade which already comprises a sharp edge for scraping or removing soil or debris from the face of an opening disc, a gauge wheel, or any other part of ground opening equipment which accumulates a build-up of soil or debris.

In this way, a sharp scraping edge is provided on a scraper blade, and a corrosion and wear resistant surface is provided on the sharp scraping edge of the scraper blade in order to extend the life of the sharp scraping edge of the scraper blade, and thus extend the life of the scraper.

More particularly, in this form of the invention, scraper blade 805 may be formed out of mild steel, stainless steel or spring steel, or any other material which can be sharpened into a fine sharp edge for scraping soil or debris from ground opening equipment. In a preferred form of the present invention, scraper blade 805 has a uniform thickness which is less than, or equal to, approximately 0.090 inches (i.e., 90 thousandths of an inch), and the corrosion and wear resistant surface 810 is a strip of material which is approximately 0.010 inches to approximately 0.035 inches wide.

By way of example but not limitation, scraper blade 805 is formed out of spring steel, and corrosion and wear resistant surface 810 comprises a coating of tungsten carbide.

The corrosion and wear resistant surface 810 may be applied to thin blade 805 by spraying the corrosion and wear resistant surface (e.g., the tungsten carbide coating) onto scraper blade 805 using a high velocity oxygen fueled (HVOF) process. However, it is important to note that corrosion and wear resistant surface 810 (e.g., the tungsten carbide coating) can also be applied to the edge of a thin scraper blade using other methods which are well known to those skilled in the art. By way of example but not limitation, the corrosion and wear resistant surface (e.g., the tungsten carbide coating) can be applied to the scraper blade using a strong adhesive to adhere a thin strip of tungsten carbide (or similar material) to the scraper blade at the edge of the scraper blade. And by way of further example but not limitation, corrosion and wear resistant surface 810 may be applied to scraper blade 805 by another method of coating (e.g., plasma spray coating).

It is important to note that whether the corrosion and wear resistant surface is applied as a coating or as a strip of material adhered to the edge of the scraper blade, or set back from the edge of the scraper blade, the corrosion and wear resistant surface is secured to the scraper blade so that the scraper blade and the corrosion and wear resistant surface essentially form one component. This is in contrast to, and an improvement over, the prior art scraper shown in FIG. 70 which comprises multiple pieces. The fine sharp edge of the blade is also an improvement over the scraper shown in FIG. 71 having a thick square blade for pushing paper.

It should be appreciated that universal scraper 700 may be attached to the frame of the ground opening equipment (e.g., as shown by scraper 140 in FIG. 13 and scraper 400 in FIGS. 56 and 57) or attached to an axle of the opening disc (e.g., as shown by scraper 140 in FIG. 14), in accordance with any of the embodiments discussed above, or in other ways known in the art.

Modifications

While the present invention has been described in terms of certain exemplary preferred embodiments, it will be readily understood and appreciated by those skilled in the art that it is not so limited, and that many additions, deletions and modifications may be made to the preferred embodiments discussed herein without departing from the scope of the present invention.

What is claimed is:

1. A scraper for removing soil or debris from at least one of an opening disk and a gauge wheel on a planter assembly, the scraper comprising:
    a scraper blade having a front surface and a back surface, wherein the back surface of the scraper blade faces one of an opening disk or a gauge wheel on a planter assembly, wherein the scraper blade is formed from a first material, wherein the scraper blade comprises a scraping edge for scraping soil or debris from the opening disk or the gauge wheel on the planter assembly; and
    a wear-resistant surface disposed on the back surface of the scraper blade, wherein the wear-resistant surface is disposed on the back surface of the scraper blade in a position spaced from the scraping edge of the scraper blade.

2. A scraper according to claim 1 wherein the first material is formed out of a uniform thickness.

3. A scraper according to claim 2 wherein the thickness is less than or equal to approximately 0.09 inches.

4. A scraper according to claim 1 wherein the first material comprises spring steel.

5. A scraper according to claim 1 wherein the wear-resistant surface comprises tungsten carbide.

6. A scraper according to claim 1 wherein the wear-resistant surface is approximately 0.010 inches to approximately 0.035 inches wide.

7. A scraper according to claim 1 wherein the scraper comprises a scraper arm having a first end and a second end, wherein the first end is mounted to a support structure of a planter assembly, and the second end receives the scraper blade for engagement against one of the opening disc and the gauge wheel.

8. A scraper according to claim 7 wherein the scraper blade is formed separate from the scraper arm.

9. A scraper according to claim 8 wherein the scraper blade is mounted to the scraper arm with a tensioning clip.

10. A scraper according to claim 7 wherein the scraper blade is formed integral with the scraper arm.

11. A scraper according to claim 1 wherein the scraper blade comprises a planar structure.

12. A scraper according to claim 7 wherein the support structure comprises one from the group consisting of the opening disc, the gauge wheel, an axle supporting the opening disc and an axle supporting the gauge wheel.

13. A method for forming a sharp edge on a wear-resistant scraper blade, the method comprising:
  providing a scraper comprising:
    a scraper blade having a front surface and a back surface, wherein the back surface of the scraper blade faces an opening disk or a gauge wheel on a planter assembly, wherein the scraper blade is formed from a first material, wherein the scraper blade comprises a scraping edge for scraping soil or debris from the opening disk or the gauge wheel on the planter assembly; and
    a wear-resistant surface disposed on the back surface of the scraper blade, wherein the wear-resistant surface is disposed on the back surface of the scraper blade in a position spaced from the scraping edge of the scraper blade; and
  wearing down the first material to sharpen the scraping edge.

14. A method according to claim 13 wherein the first material is formed out of a uniform thickness.

15. A method according to claim 14 wherein the thickness is less than or equal to approximately 0.09 inches.

16. A method according to claim 13 wherein the first material comprises spring steel.

17. A method according to claim 13 wherein the the wear-resistant surface comprises tungsten carbide.

18. A method according to claim 13 wherein the wear-resistant surface is approximately 0.010 inches to approximately 0.05 inches wide.

19. A method according to claim 13 wherein the wear-resistant surface is disposed on the scraper blade by spraying the wear-resistant surface onto the scraper blade.

20. A method according to claim 13 wherein the wear-resistant surface is a strip of material and the strip of material is disposed on the scraper blade with an adhesive.

21. A scraper for removing soil or debris from at least one of an opening disk and a gauge wheel on a planter assembly, the scraper comprising:
  a scraper blade having a front surface and a back surface, wherein the back surface of the scraper blade faces one of an opening disk or a gauge wheel on a planter assembly, wherein the scraper blade is formed from a first material, wherein the scraper blade comprises a scraping edge for scraping soil or debris from the opening disk or the gauge wheel on the planter assembly, wherein the scraper blade comprises a uniform thickness of less than or equal to approximately 0.09 inches; and
  a wear-resistant surface disposed on the back surface of the scraper blade, wherein the wear-resistant surface is disposed on the back surface of the scraper blade in a position spaced from the scraping edge of the scraper blade.

* * * * *